United States Patent
Salerno

(10) Patent No.: US 7,953,632 B2
(45) Date of Patent: May 31, 2011

(54) METHOD AND APPARATUS FOR MANAGING FOOD PRODUCTS IN QUICK SERVE RESTAURANTS

(76) Inventor: Mark Salerno, Huntington, NY (US)

( * ) Notice: Subject to any disclaimer, the term of this patent is extended or adjusted under 35 U.S.C. 154(b) by 0 days.

(21) Appl. No.: 12/455,945

(22) Filed: Jun. 9, 2009

(65) Prior Publication Data
US 2010/0049578 A1 Feb. 25, 2010

Related U.S. Application Data

(60) Provisional application No. 61/131,482, filed on Jun. 9, 2008.

(51) Int. Cl.
*G06Q 30/00* (2006.01)
(52) U.S. Cl. .......... 705/15; 705/9; 705/11; 705/16; 340/540; 700/90; 99/325; 219/714
(58) Field of Classification Search .......... 705/15–16; 700/87, 90, 95, 117, 211; 99/325; 219/714
See application file for complete search history.

(56) References Cited

U.S. PATENT DOCUMENTS

| 5,710,409 | A * | 1/1998 | Schwarzbacker et al. ..... 219/506 |
| 6,249,710 | B1 * | 6/2001 | Drucker et al. ................ 700/15 |
| 7,092,988 | B1 * | 8/2006 | Bogatin et al. ............... 709/203 |
| 7,232,062 | B1 | 6/2007 | Salerno ........................ 235/383 |
| 2005/0251450 | A1 * | 11/2005 | Koether et al. ................ 705/15 |

* cited by examiner

*Primary Examiner* — Vanel Frenel
(74) *Attorney, Agent, or Firm* — Gerald T. Bodner

(57) ABSTRACT

A product management system for quick serve restaurants that displays to the staff what to cook on a main control unit 1 is programmed with a sales forecast through the office computer 14. The main control unit communicates to the product hold timers 3, 4, 5 to calculate when product is used and when products are cooked. The main control unit 1 monitors each instruction request, and if it is not followed, the main control unit 1 stores an error and sends the error to the manager unit 6 and grade display unit 8. A slave unit 10 displays cook information at an alternate cook station.

30 Claims, 42 Drawing Sheets

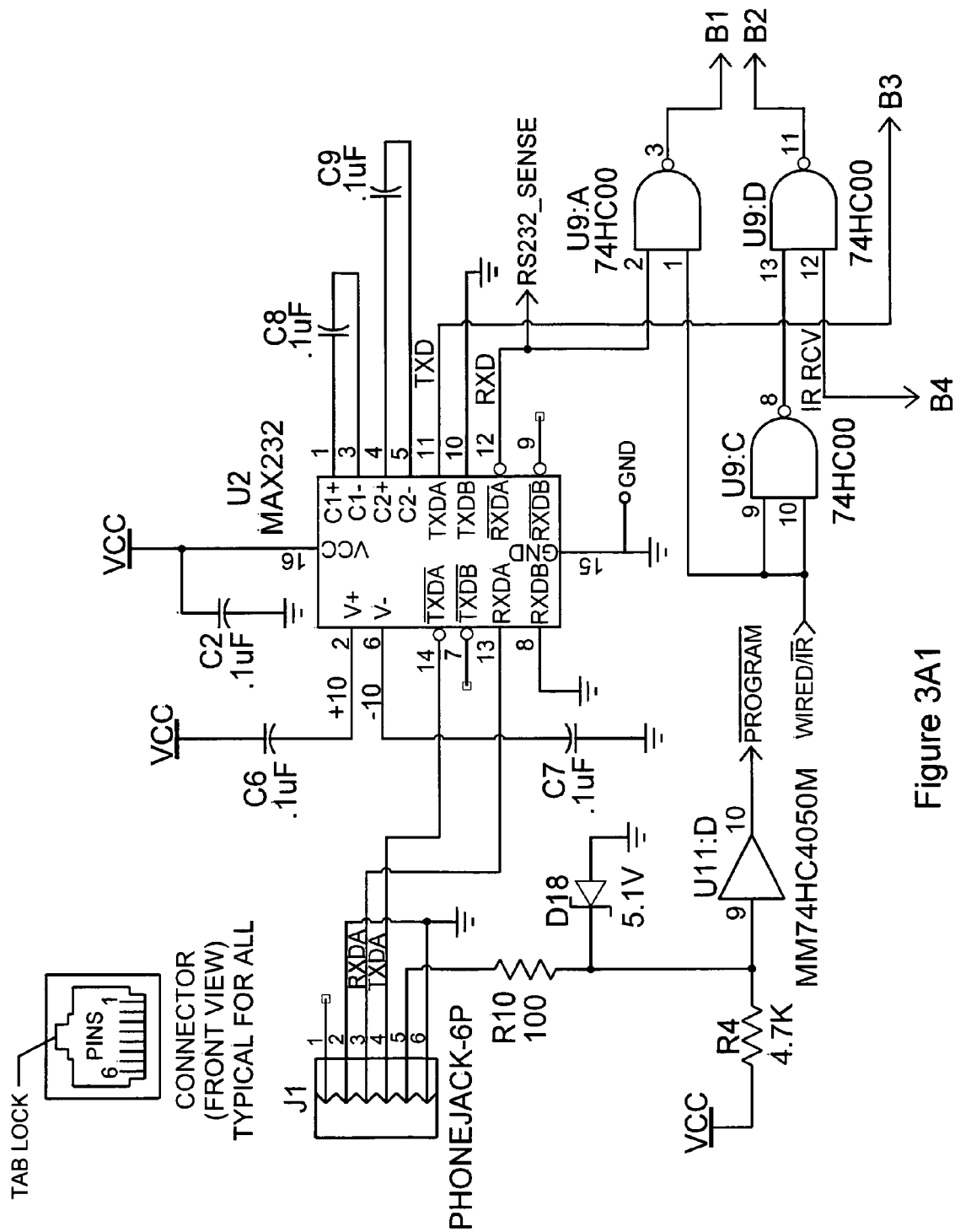
Figure 3A1

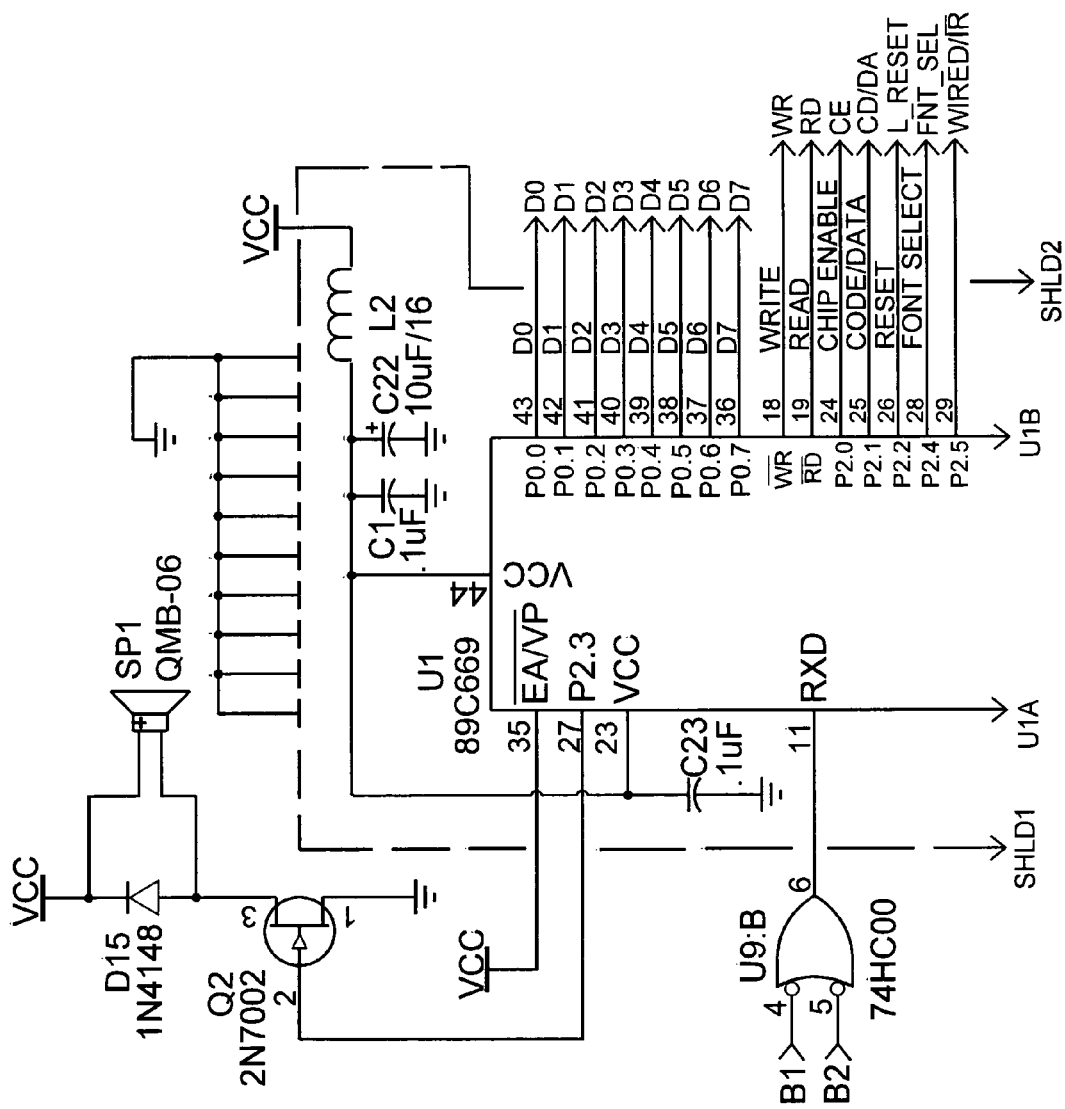
Figure 3A2

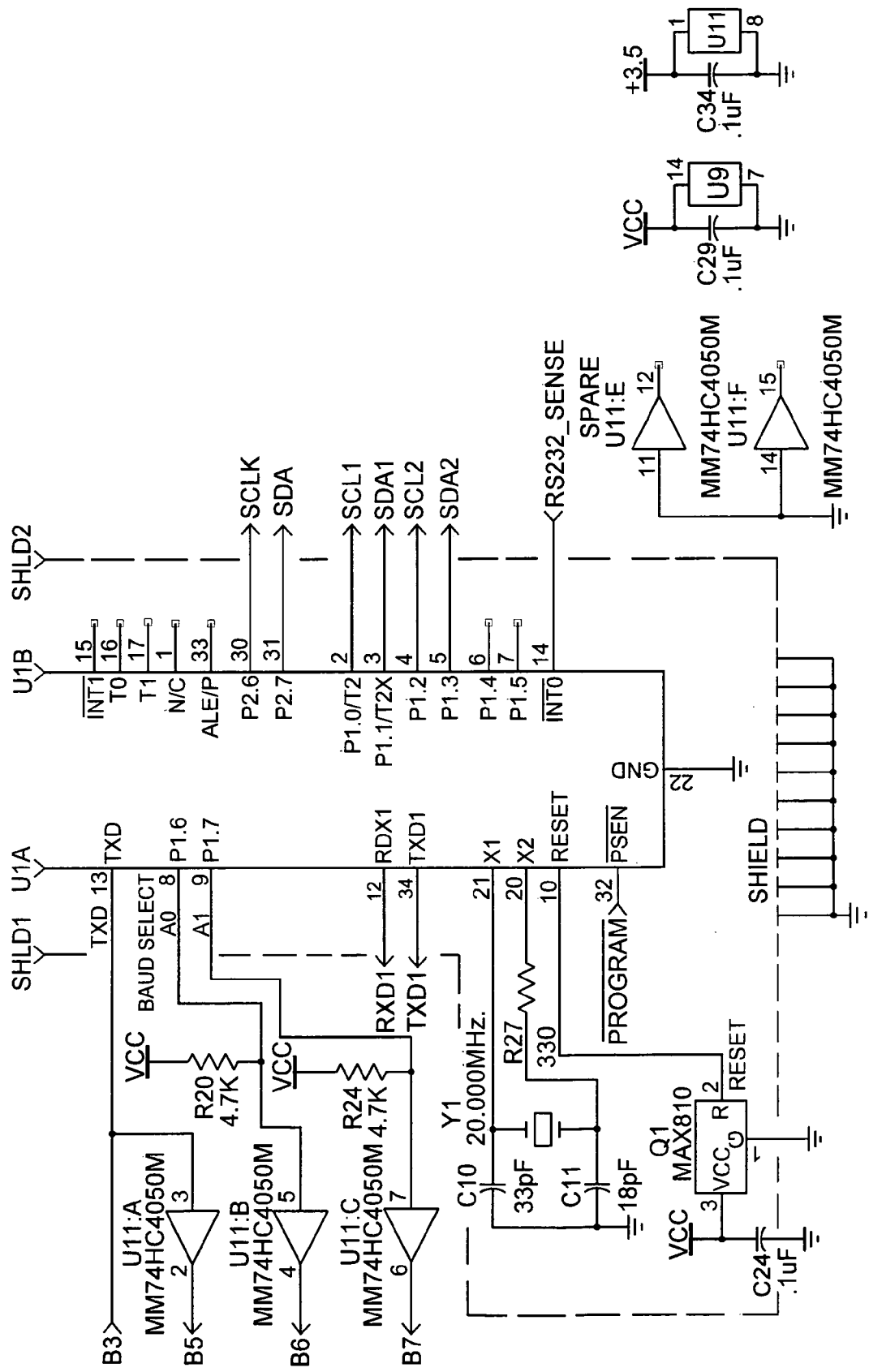
Figure 3A3

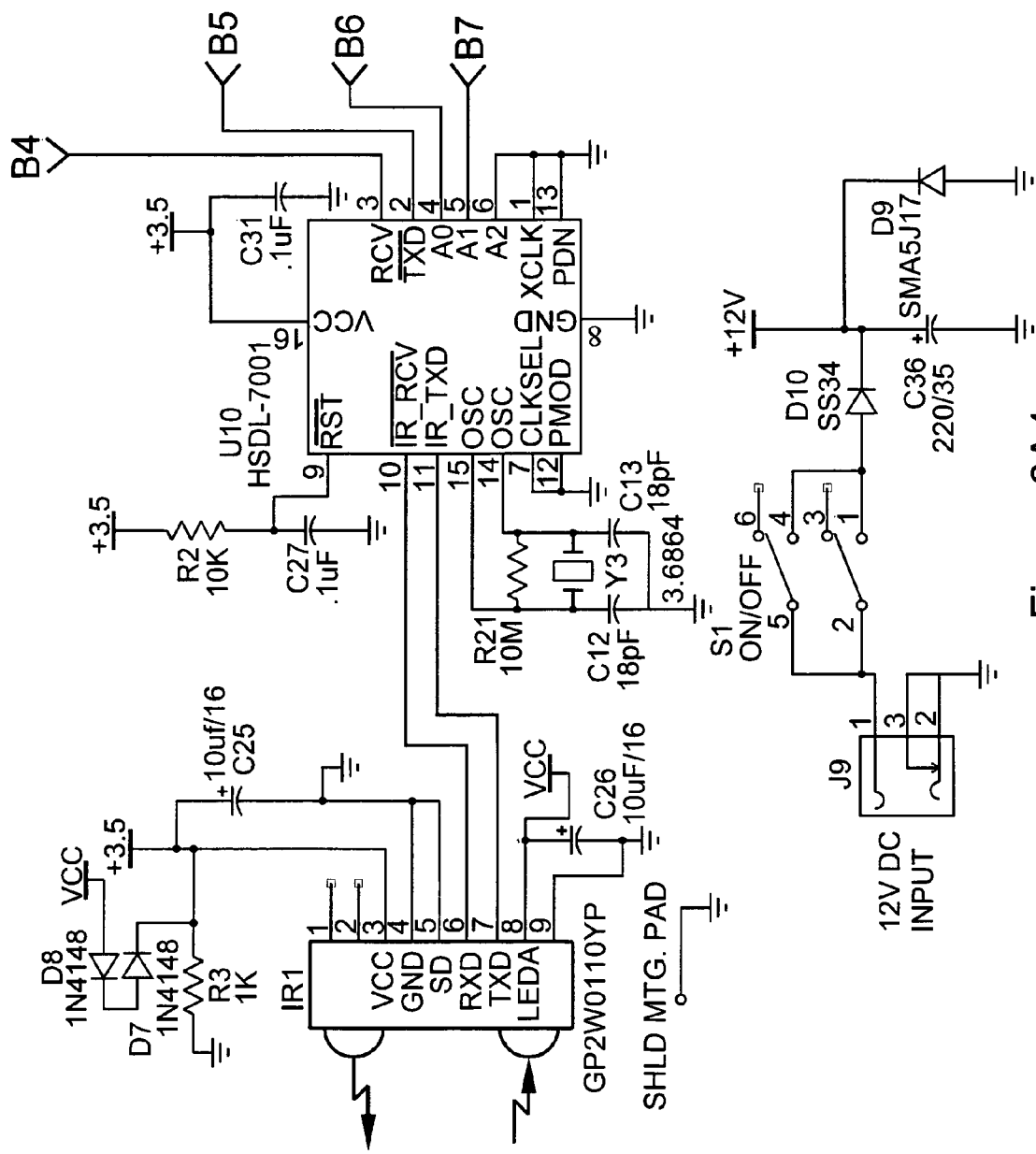
Figure 3A4

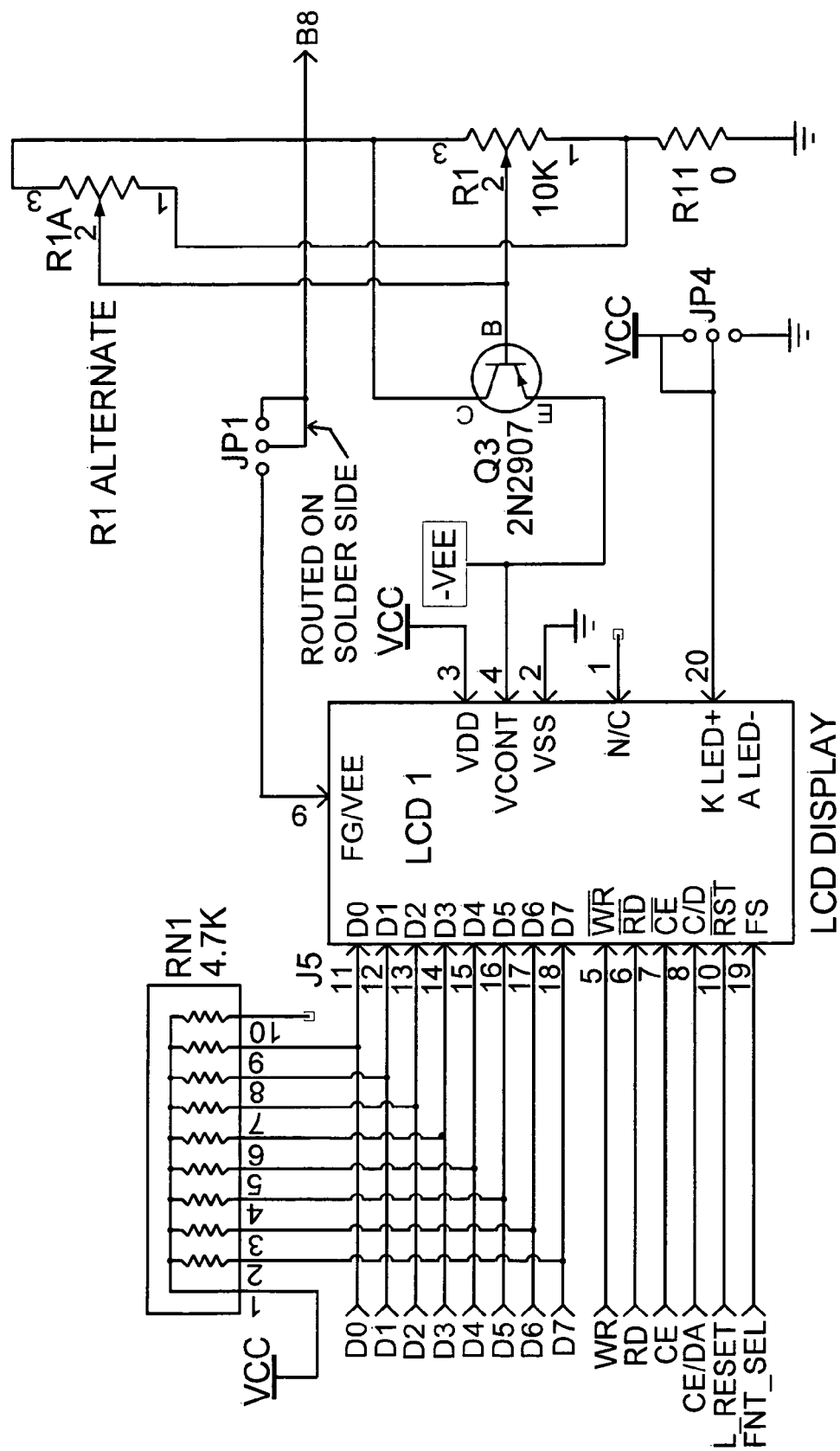
Figure 3B1

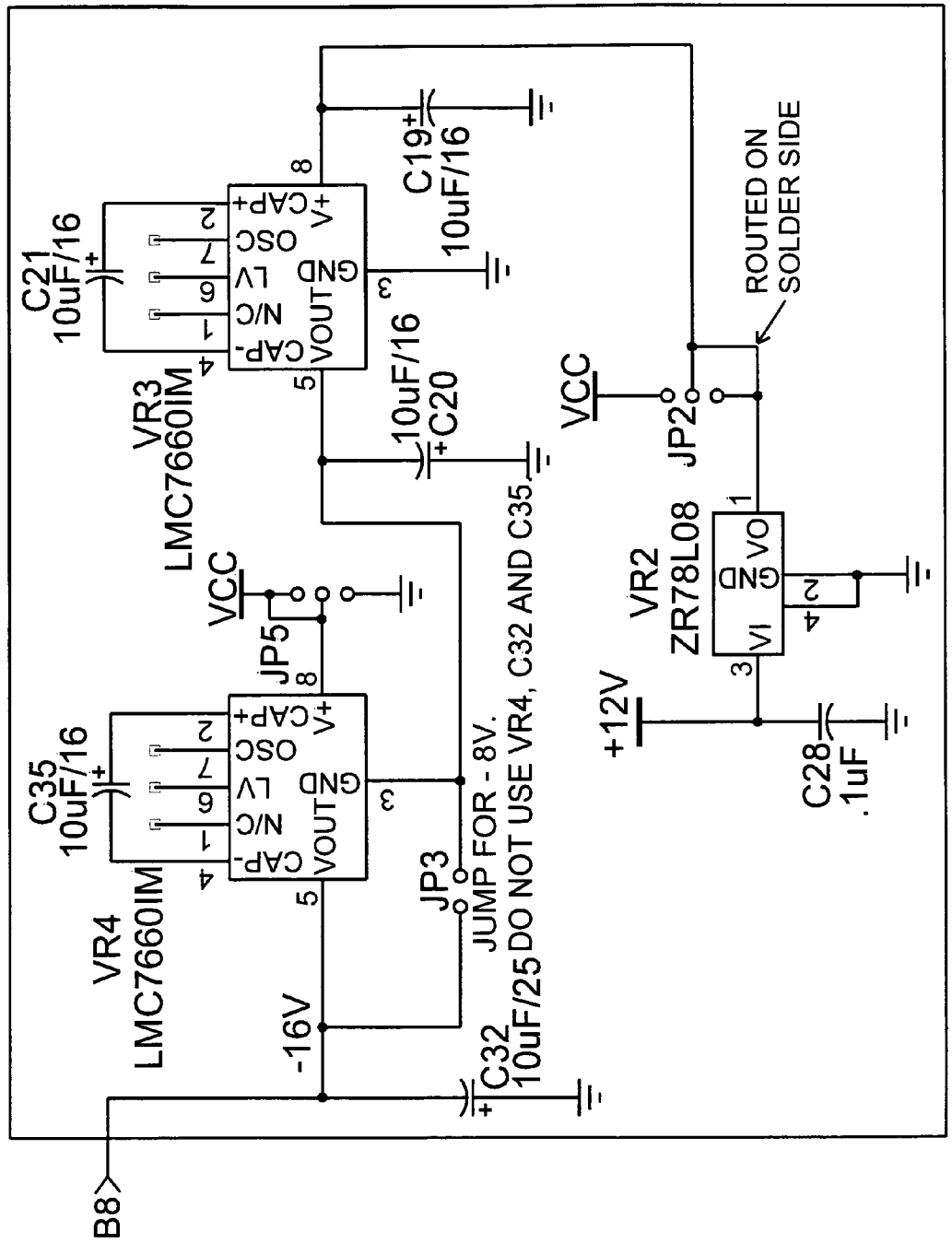
Figure 3B2

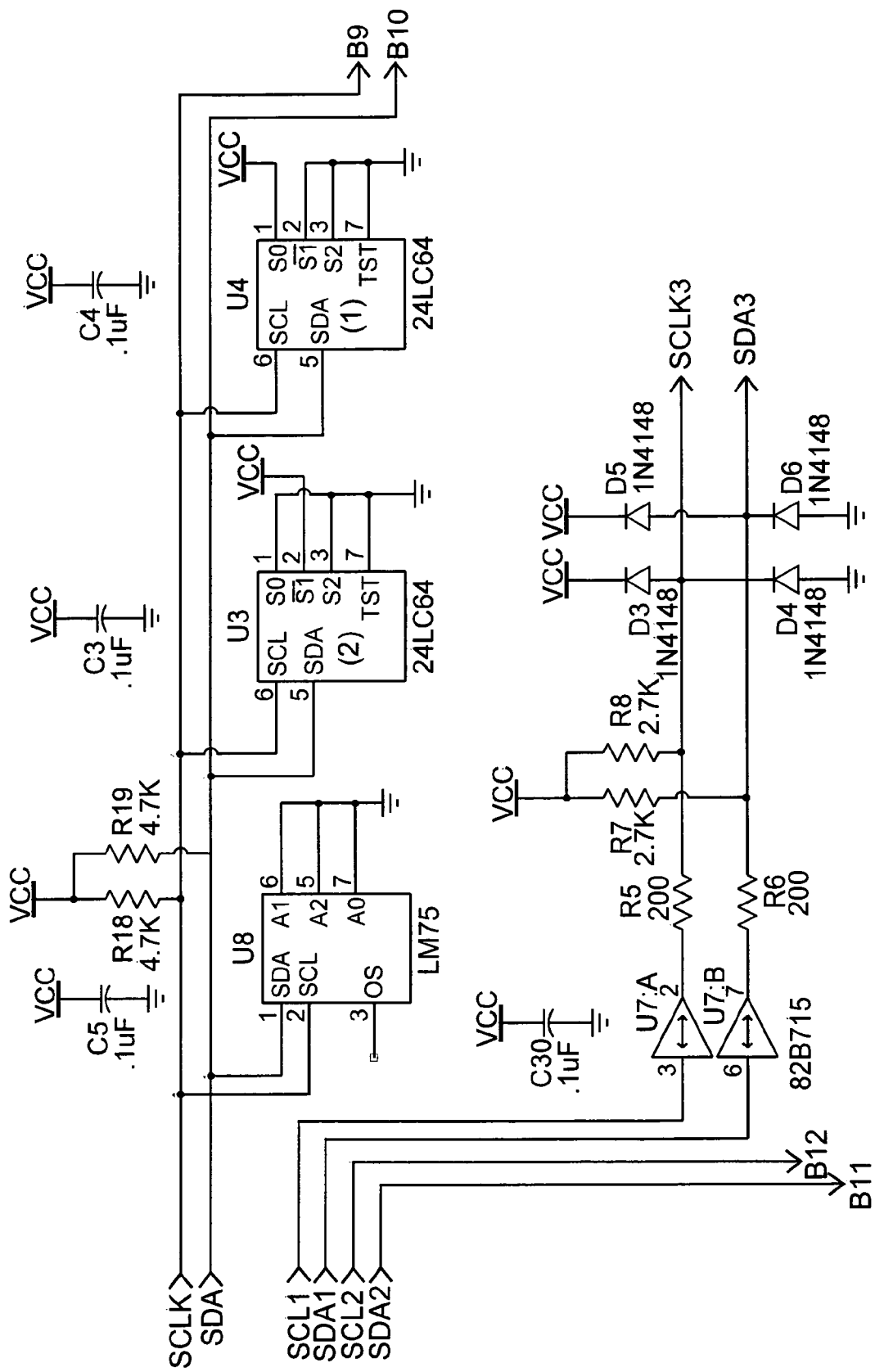
Figure 3B3

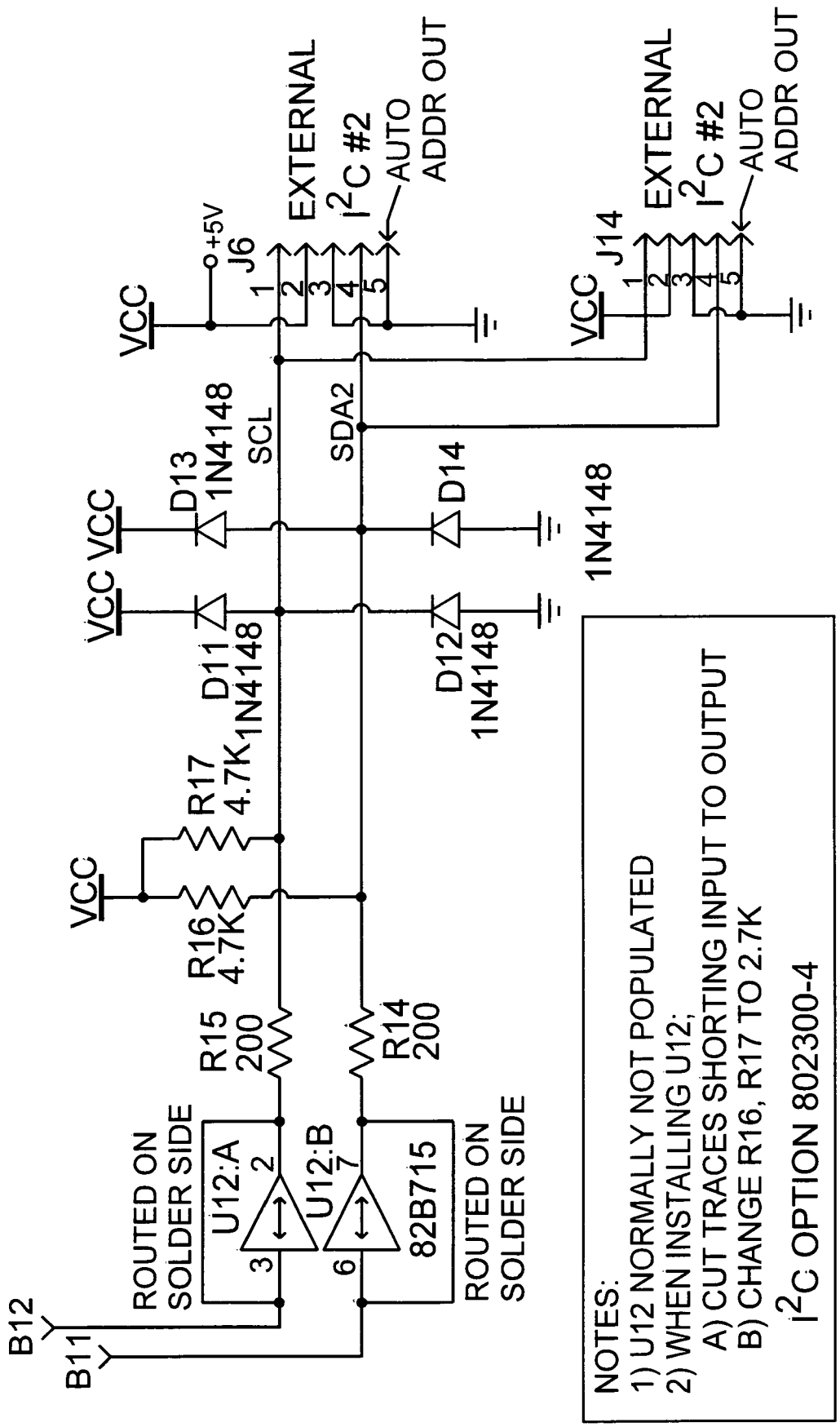
Figure 3B4

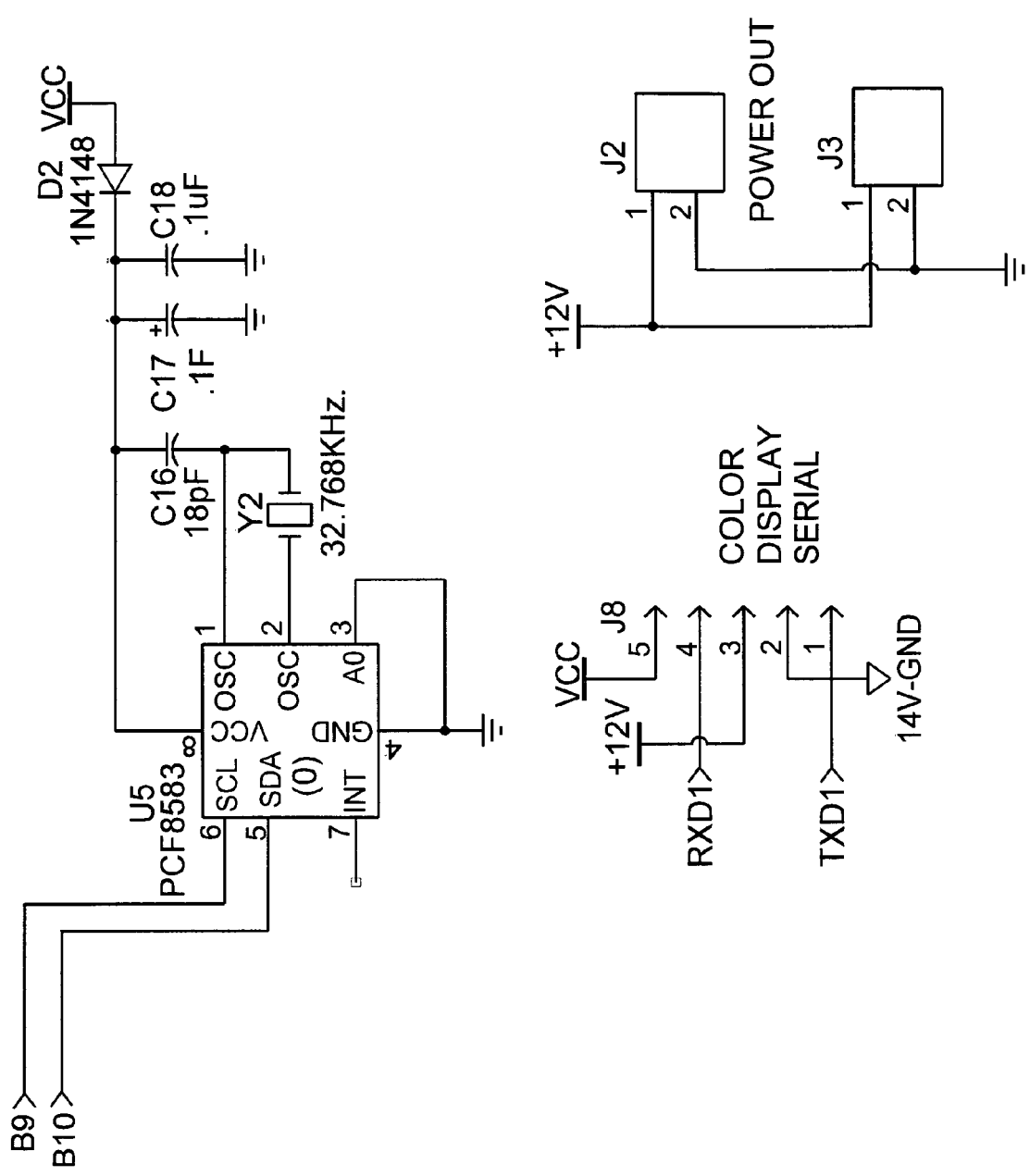
Figure 3B5

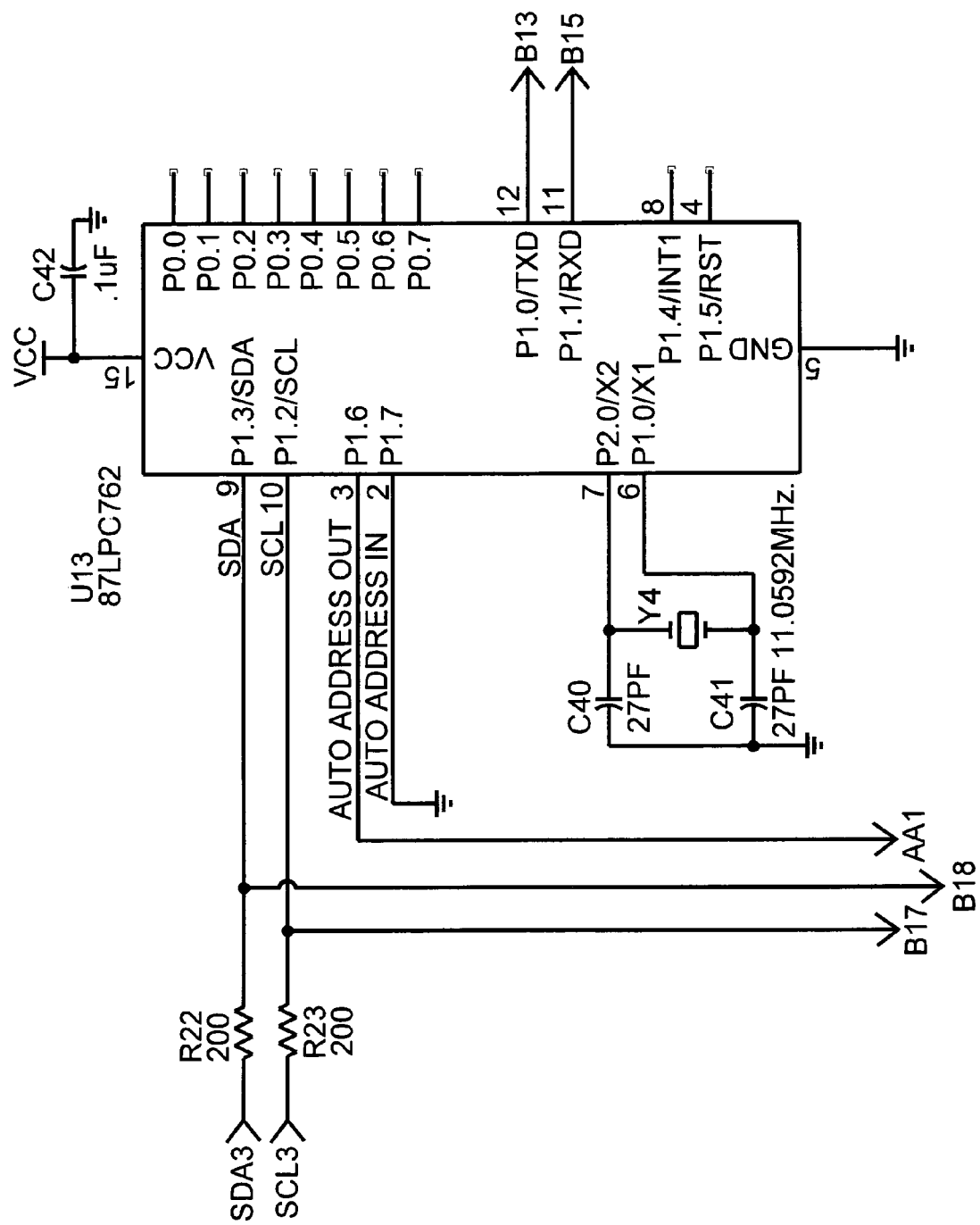
Figure 3D1

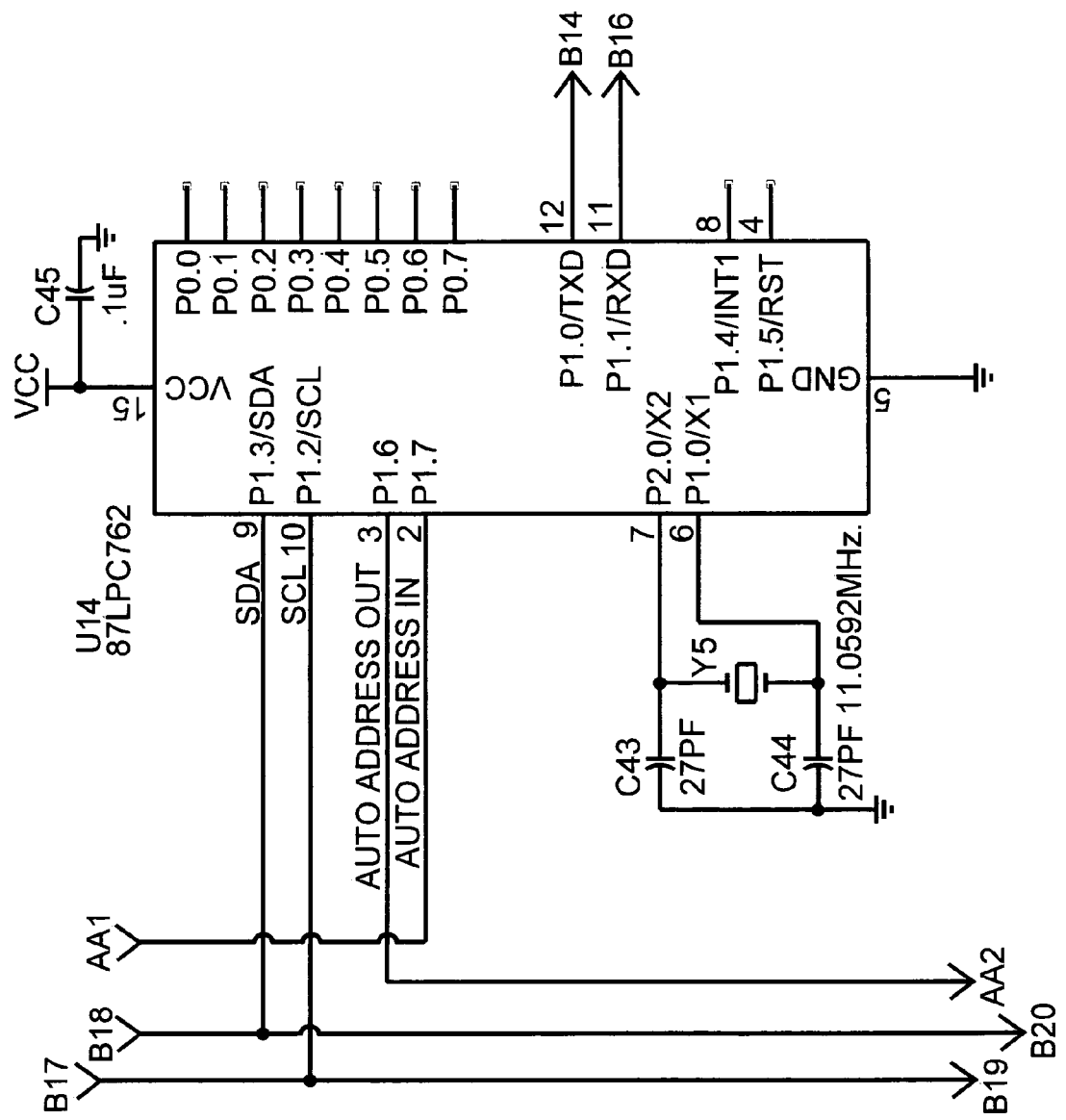
Figure 3D2

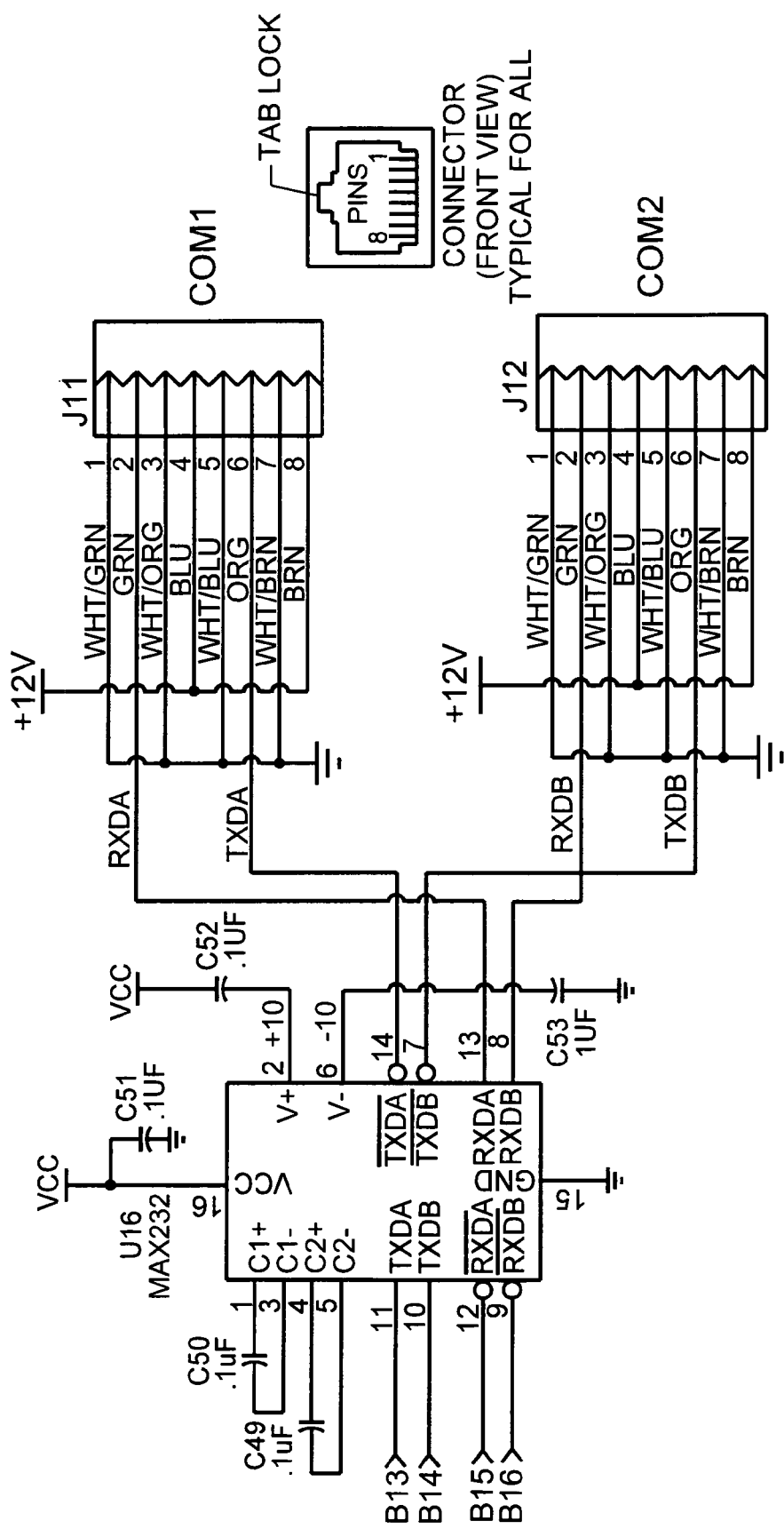
Figure 3D3

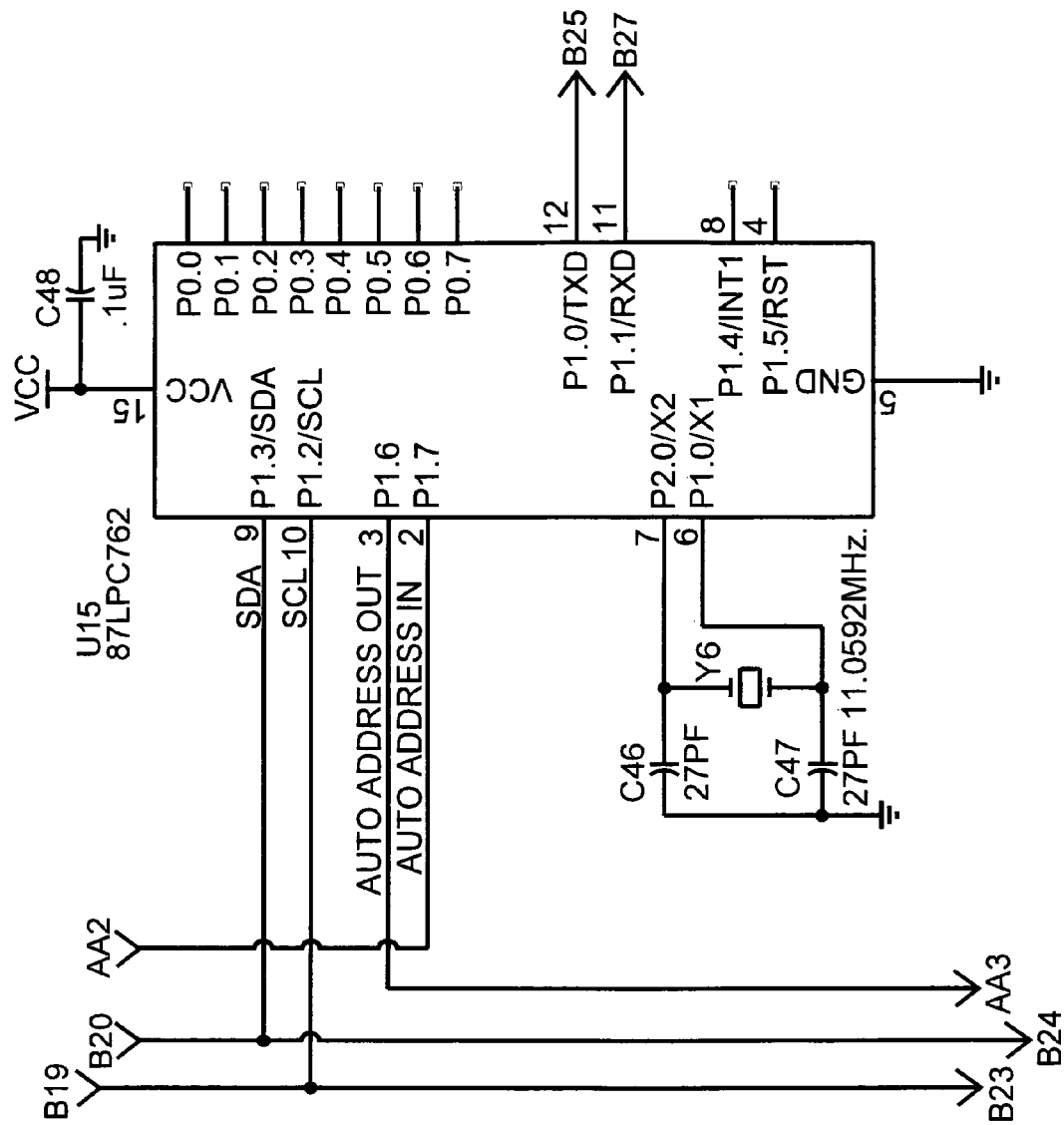
Figure 3E1

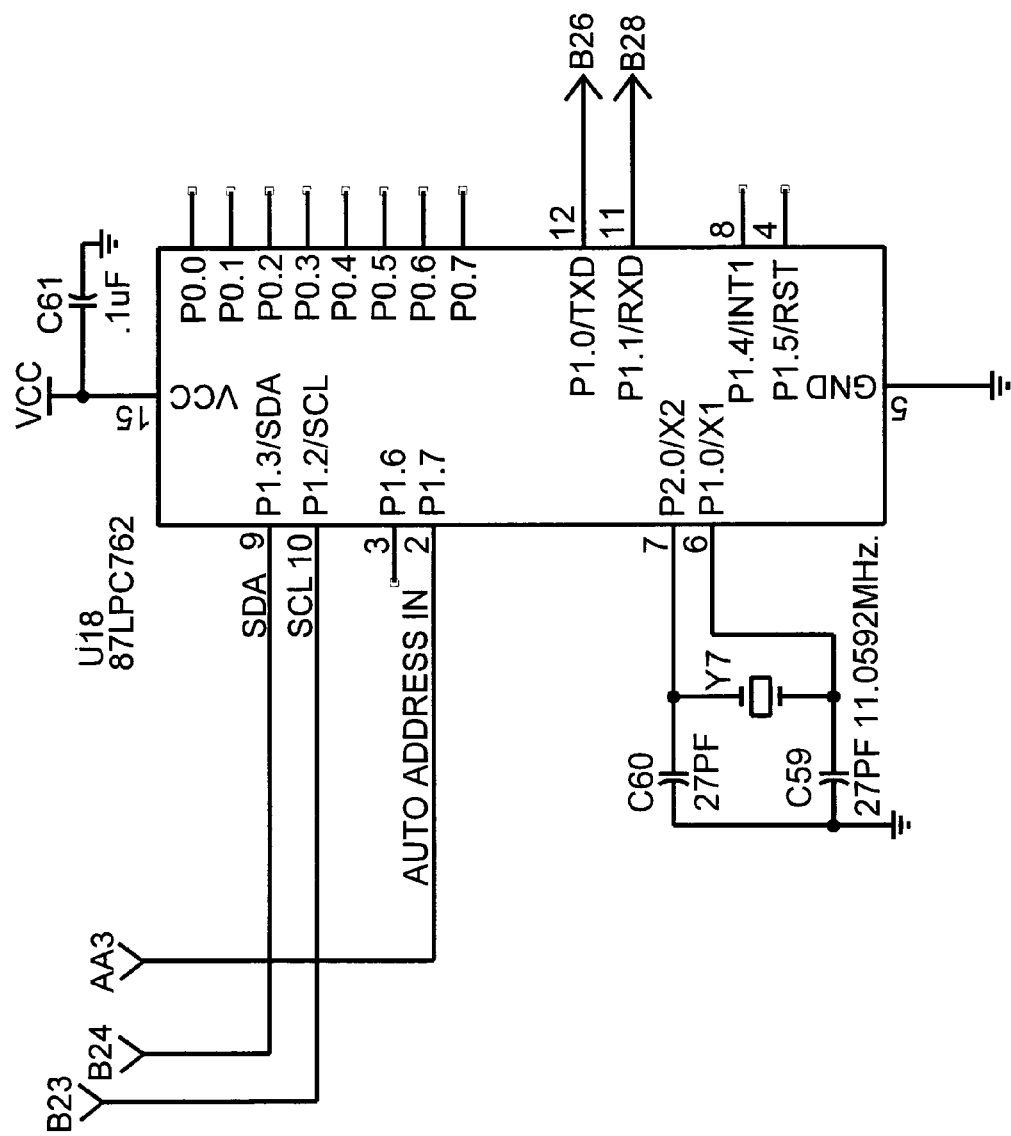
Figure 3E2

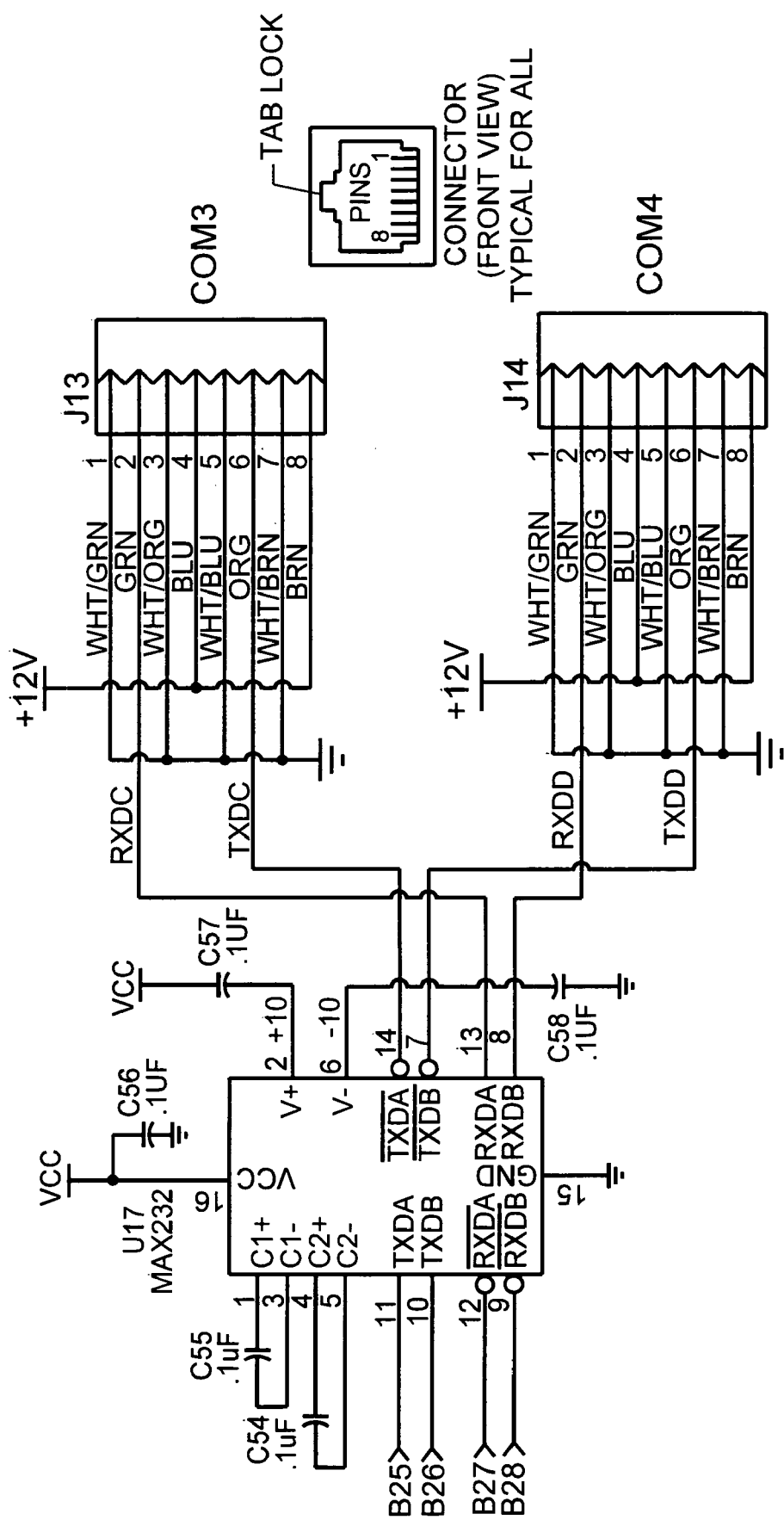
Figure 3E3

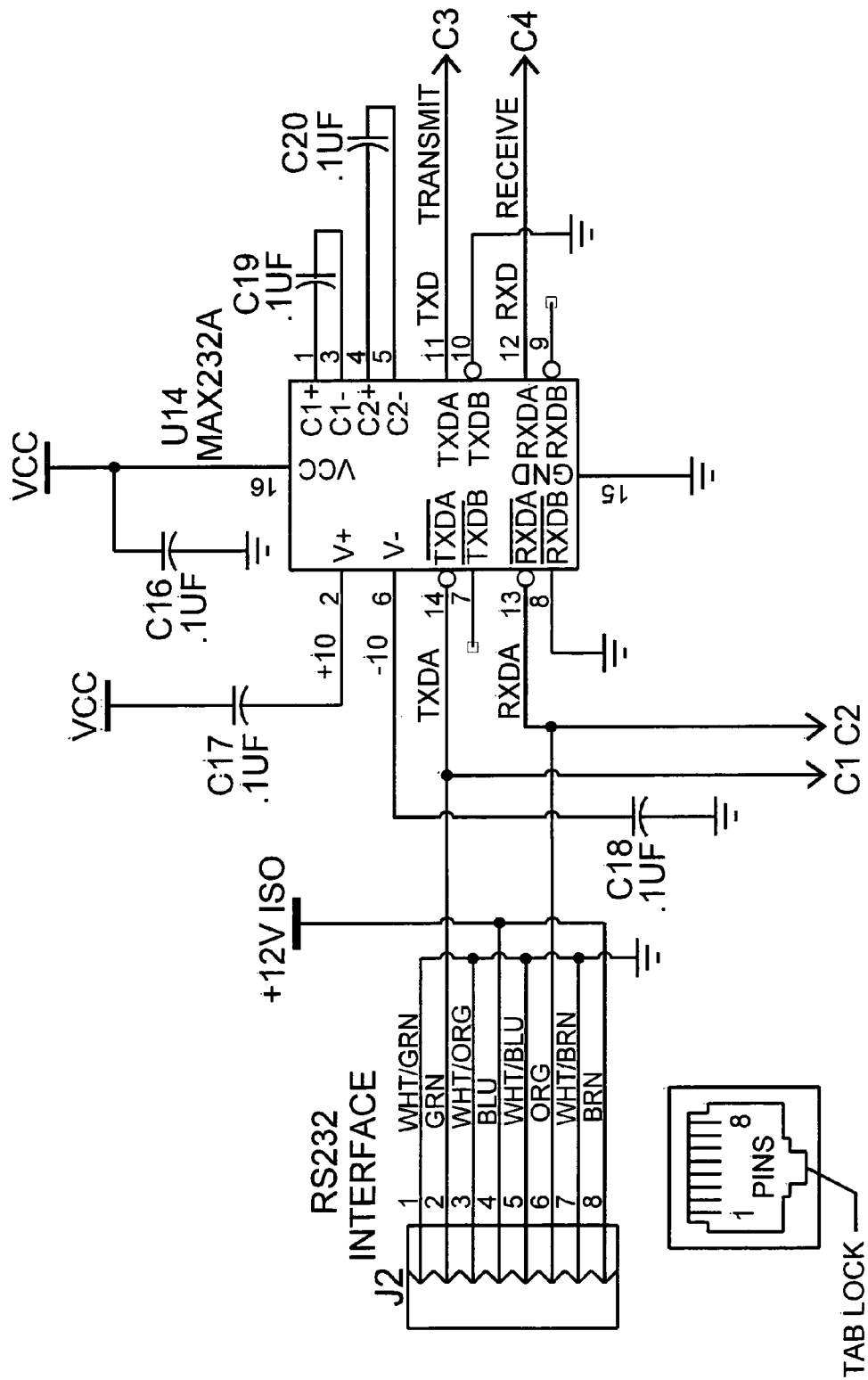
Figure 5A1

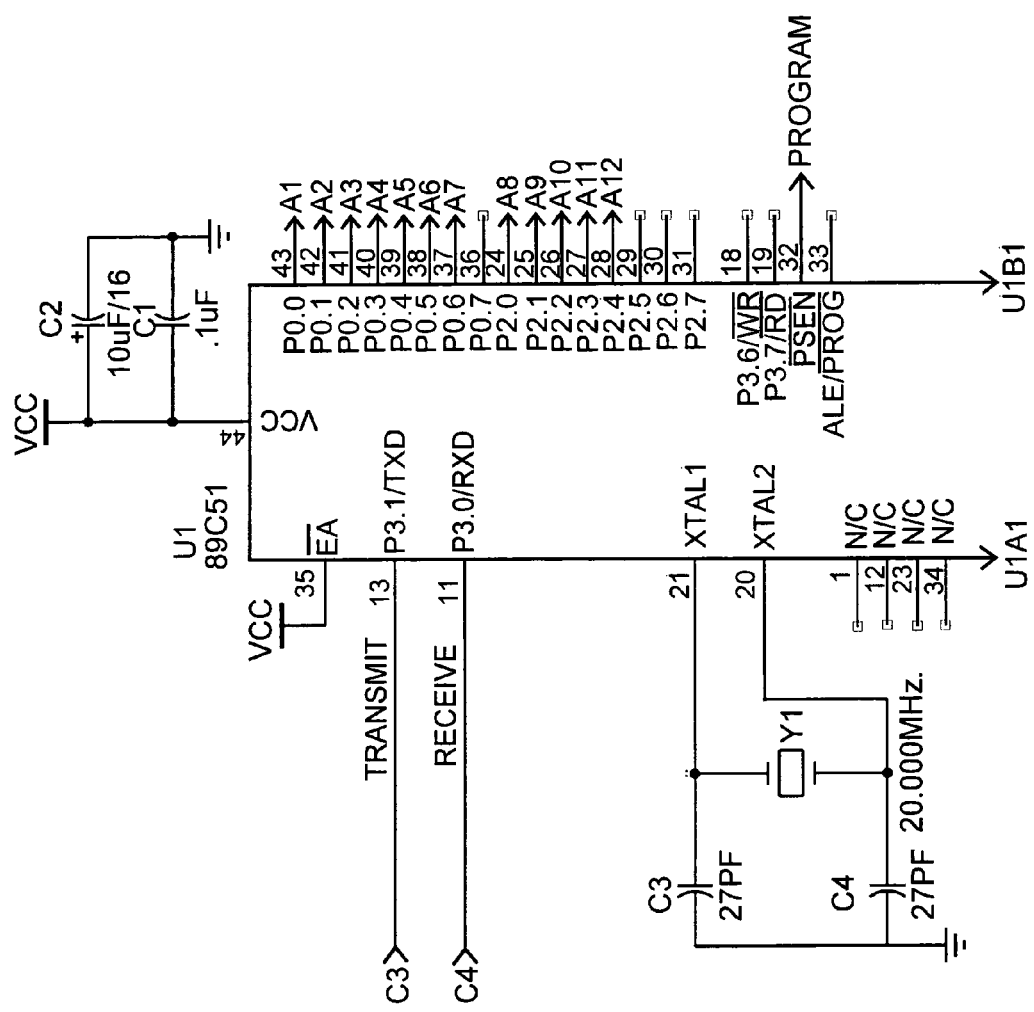
Figure 5A2

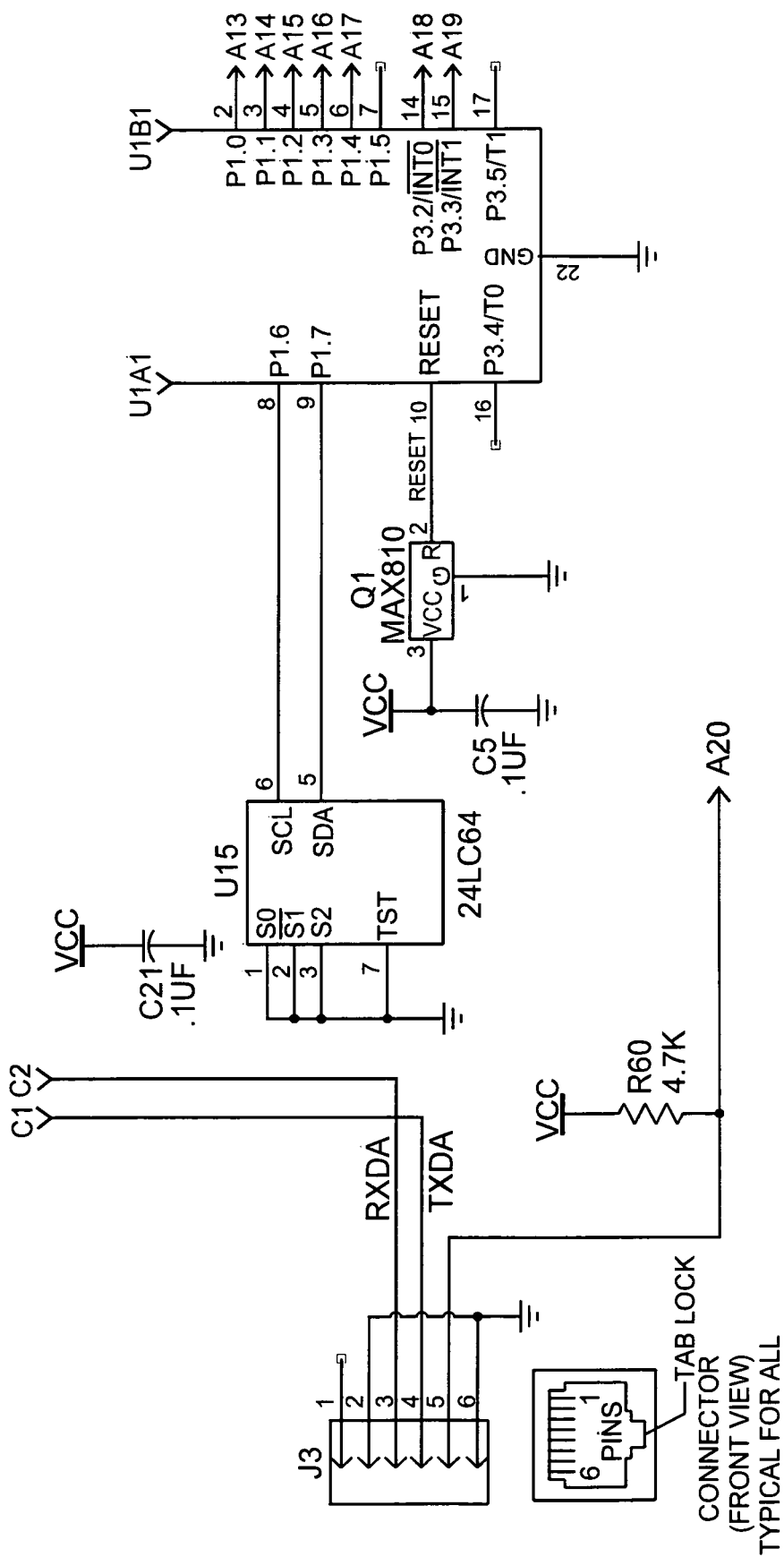
Figure 5A3

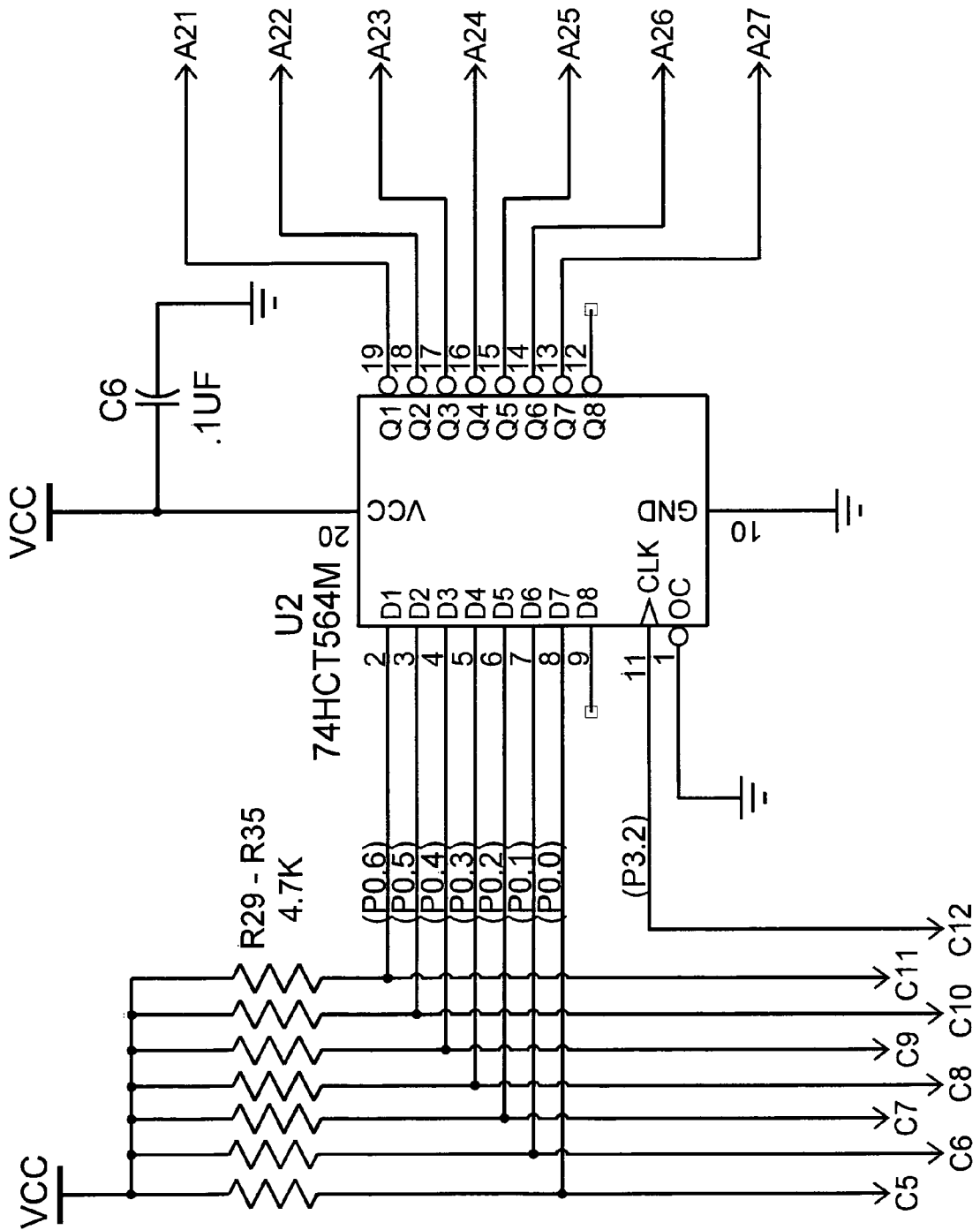
Figure 5A4

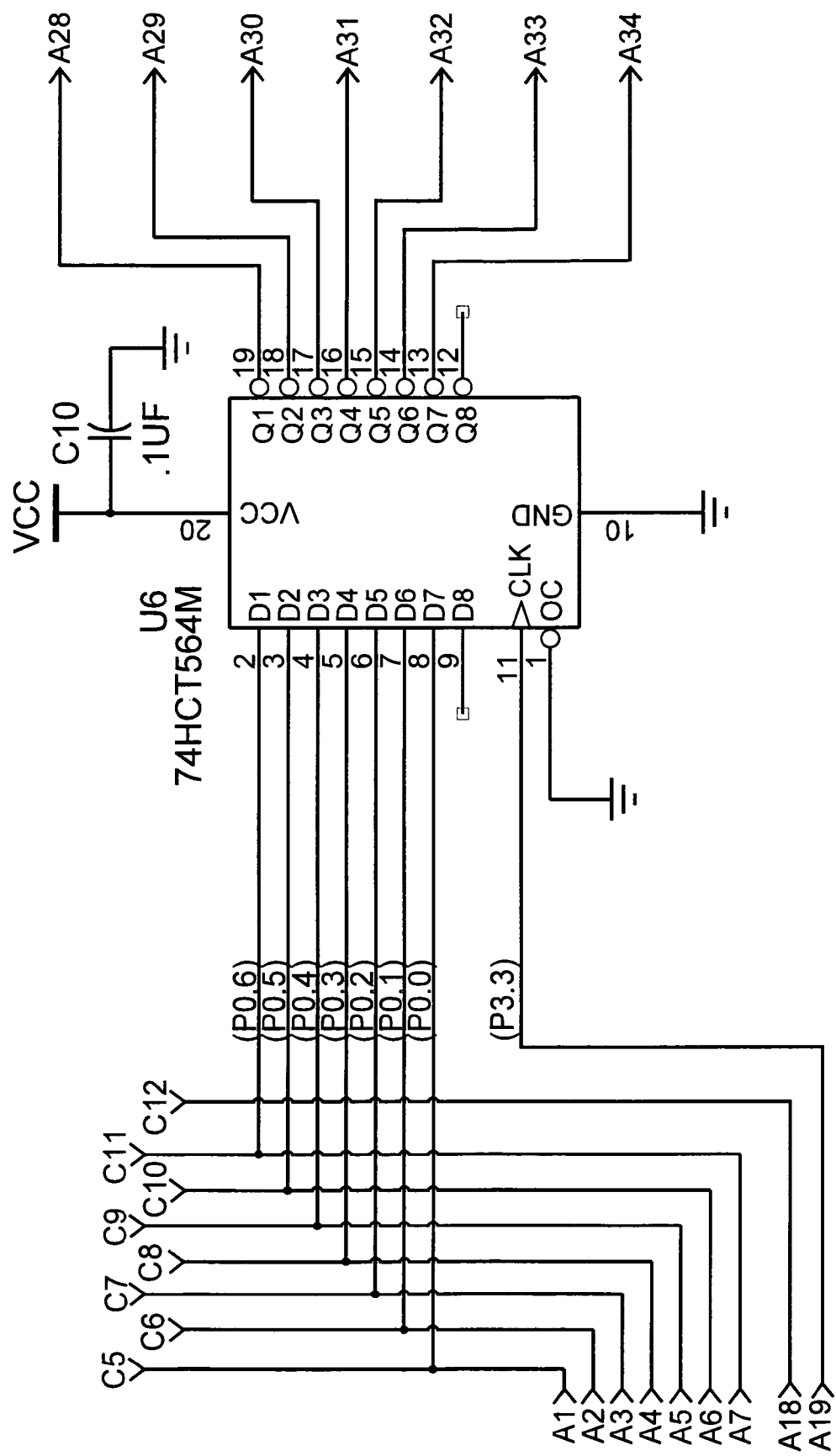
Figure 5A5

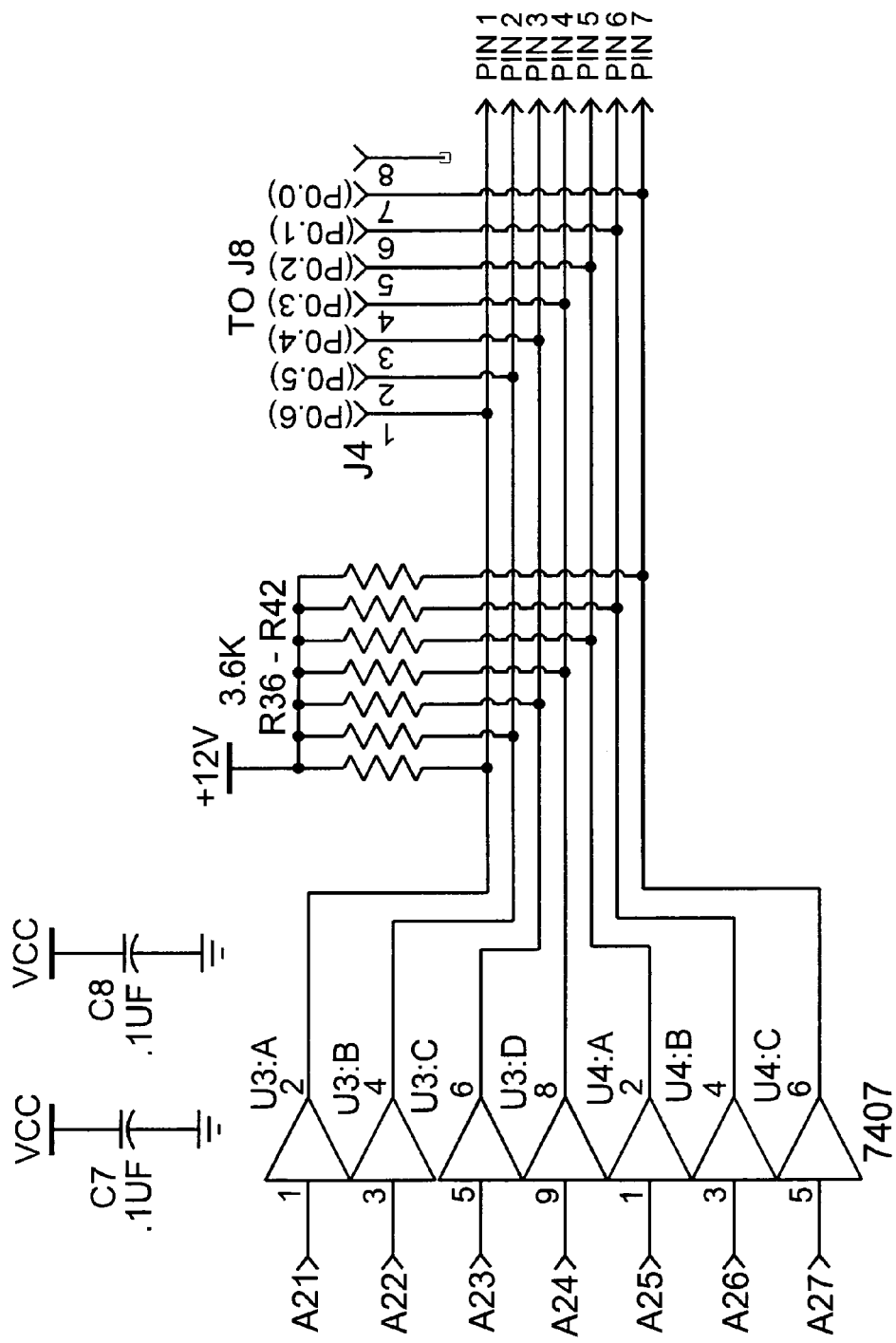
Figure 5A6

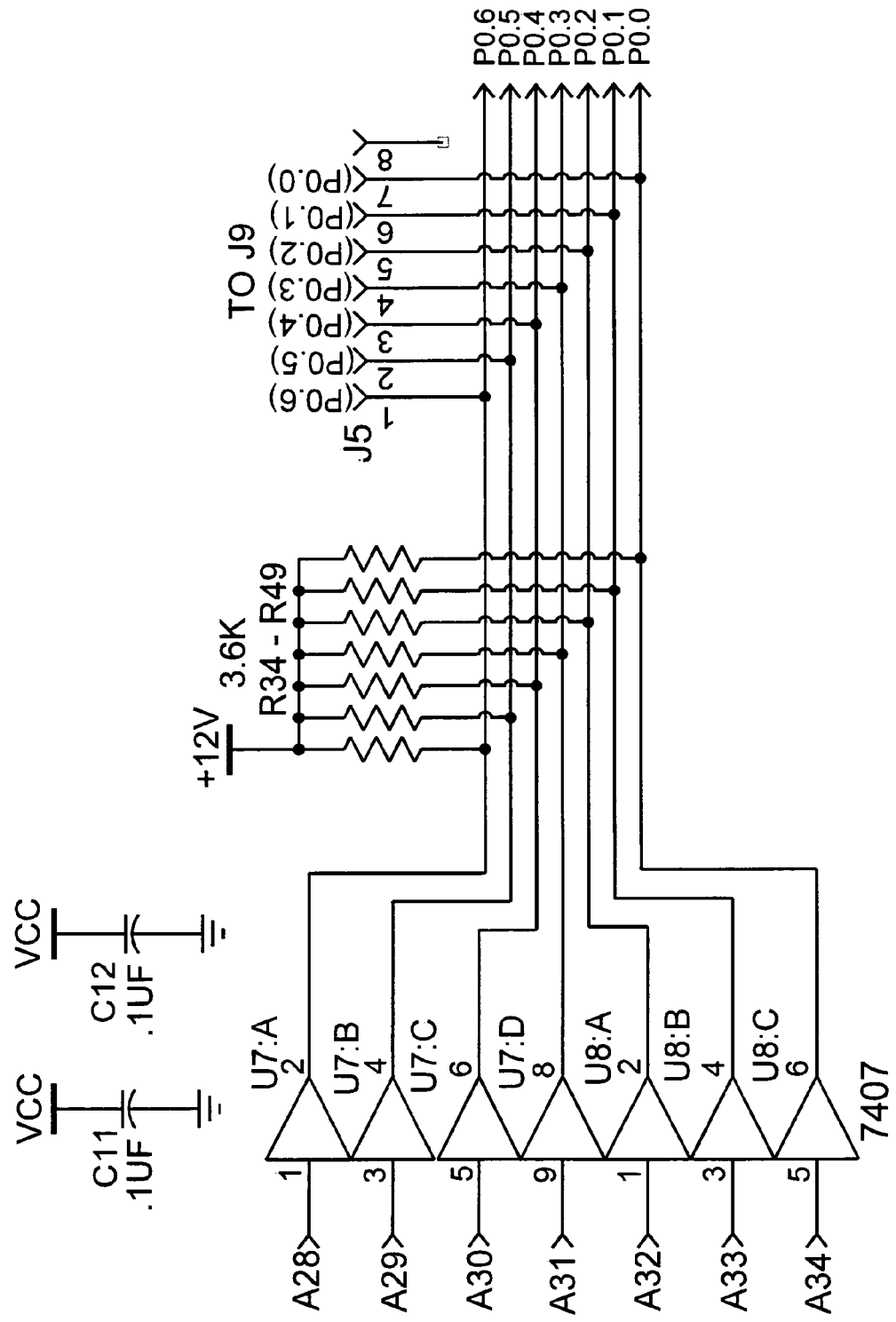
Figure 5A7

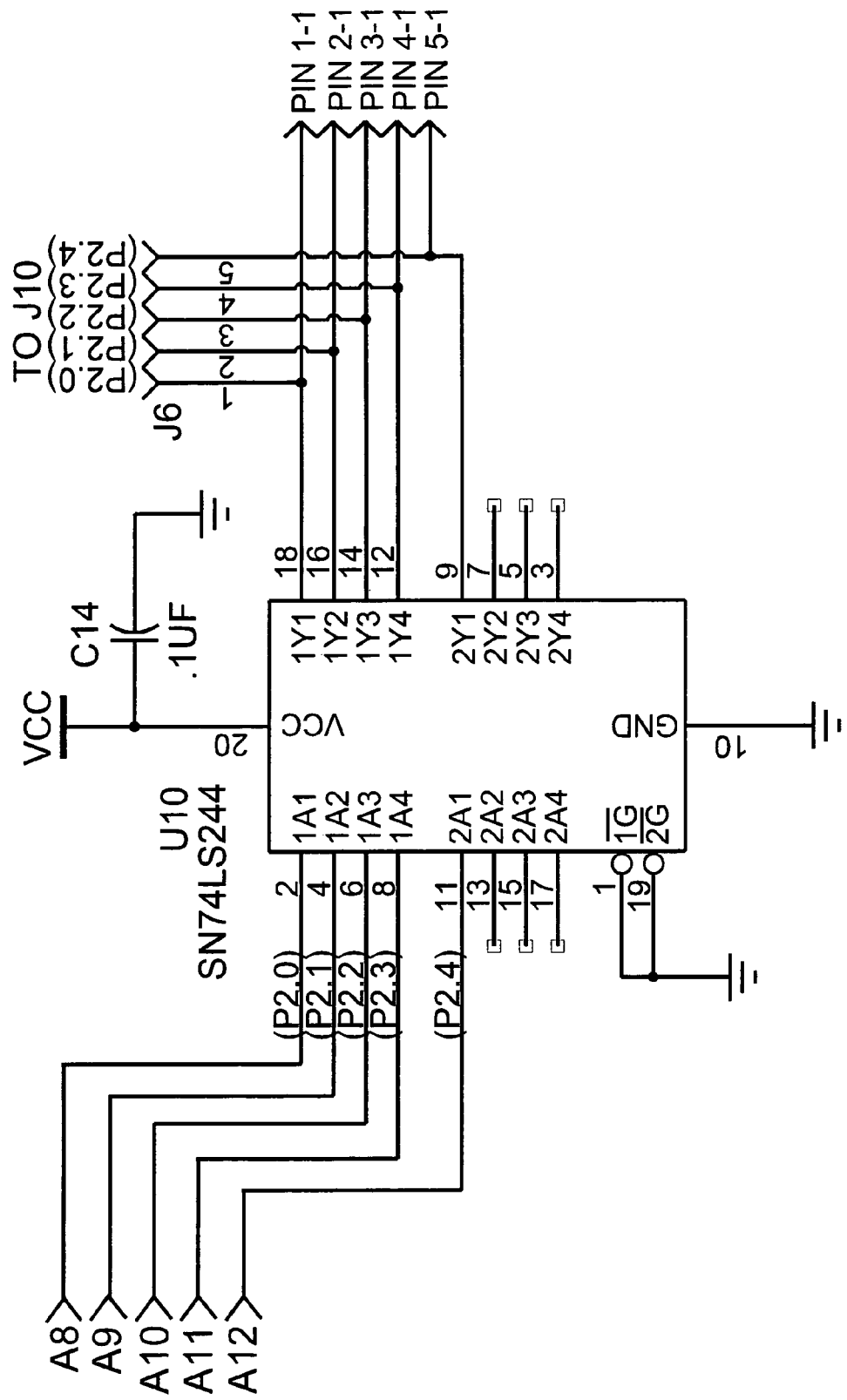
Figure 5A8

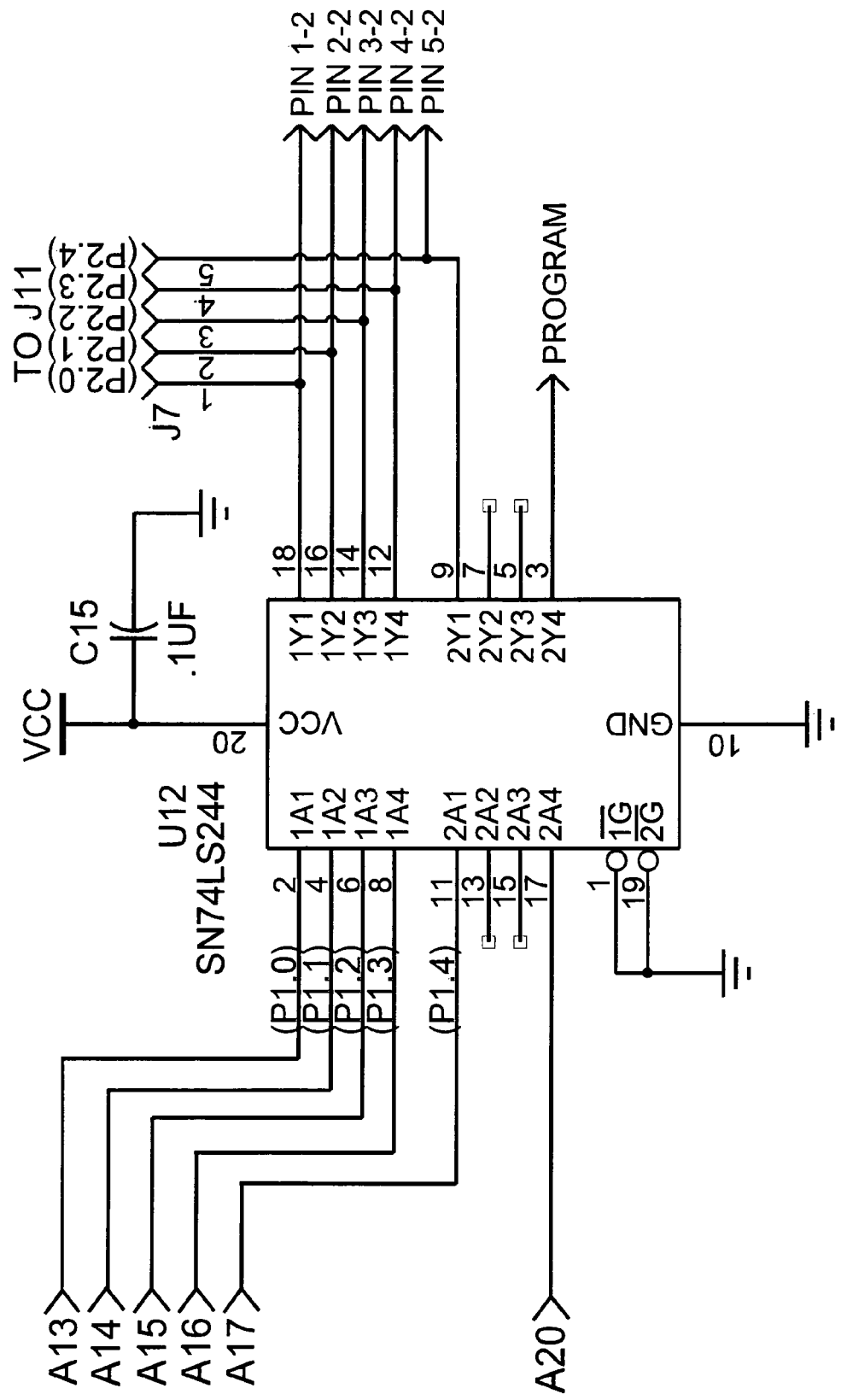
Figure 5A9

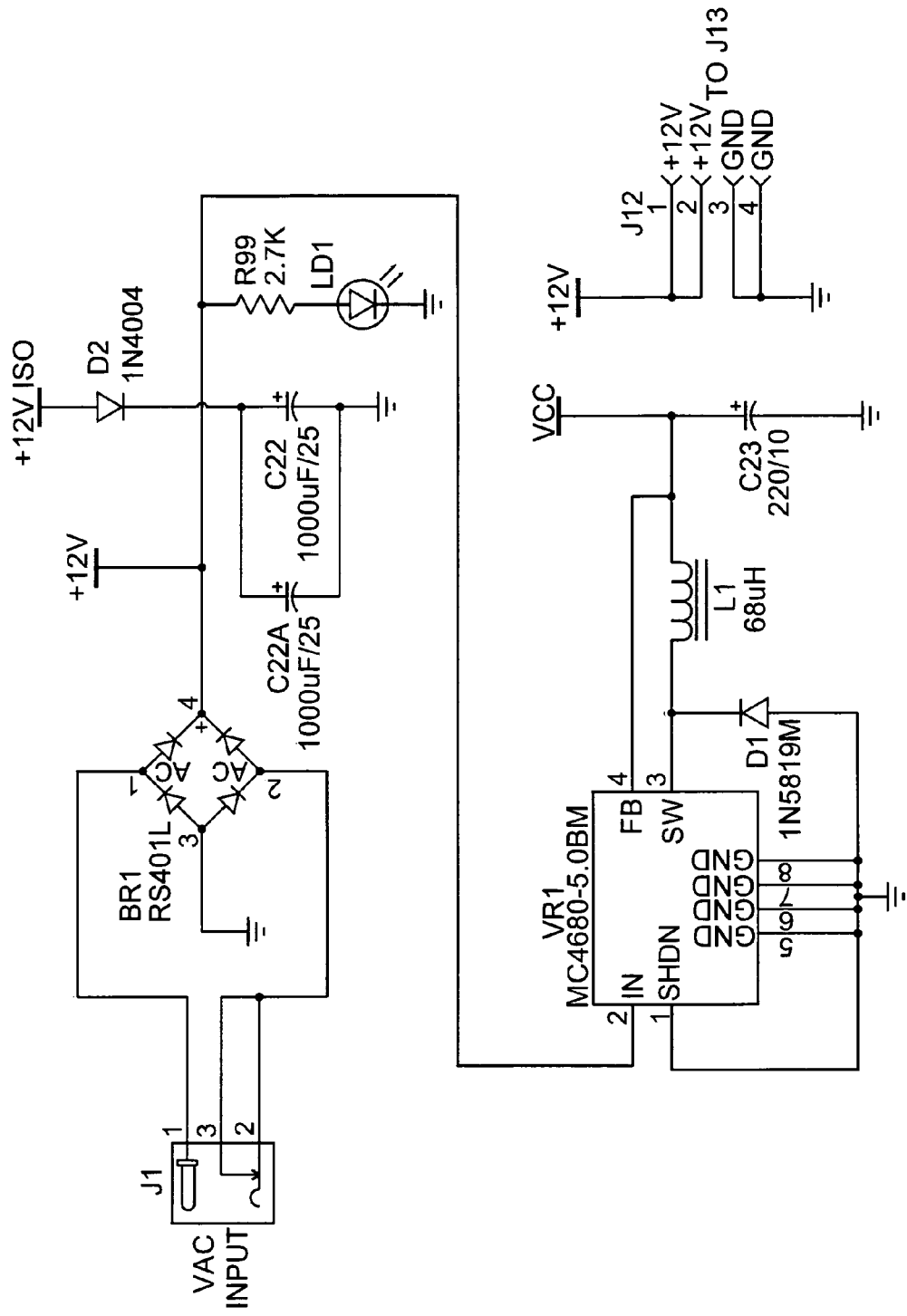
Figure 5A10

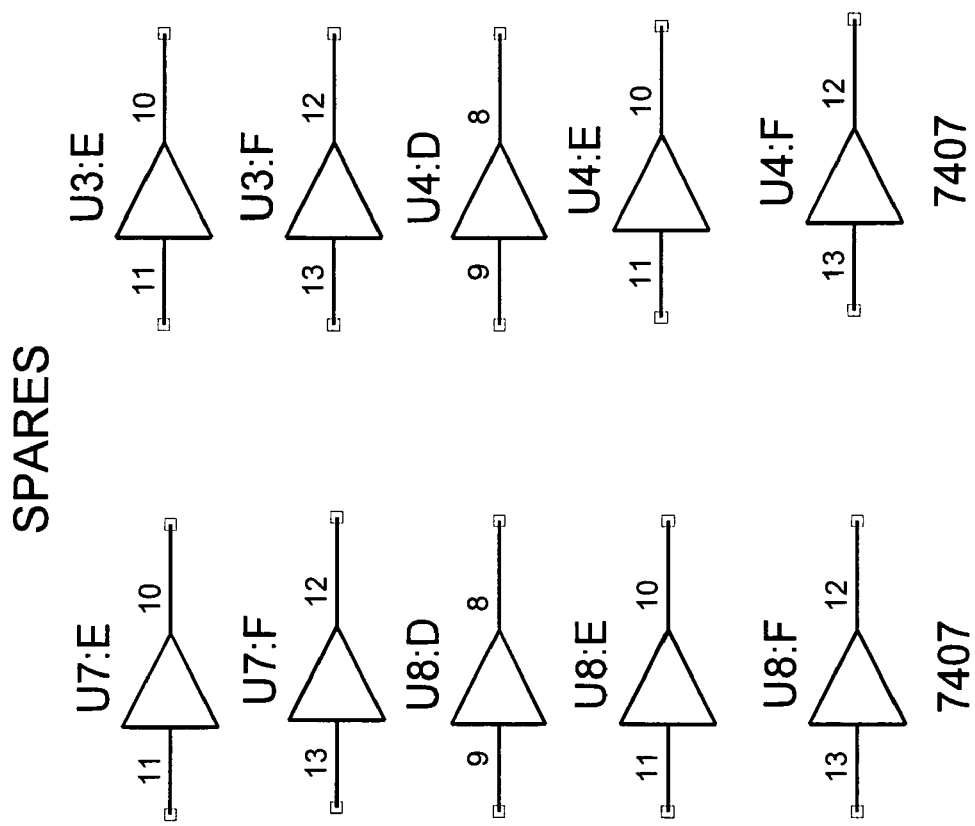
Figure 5A11

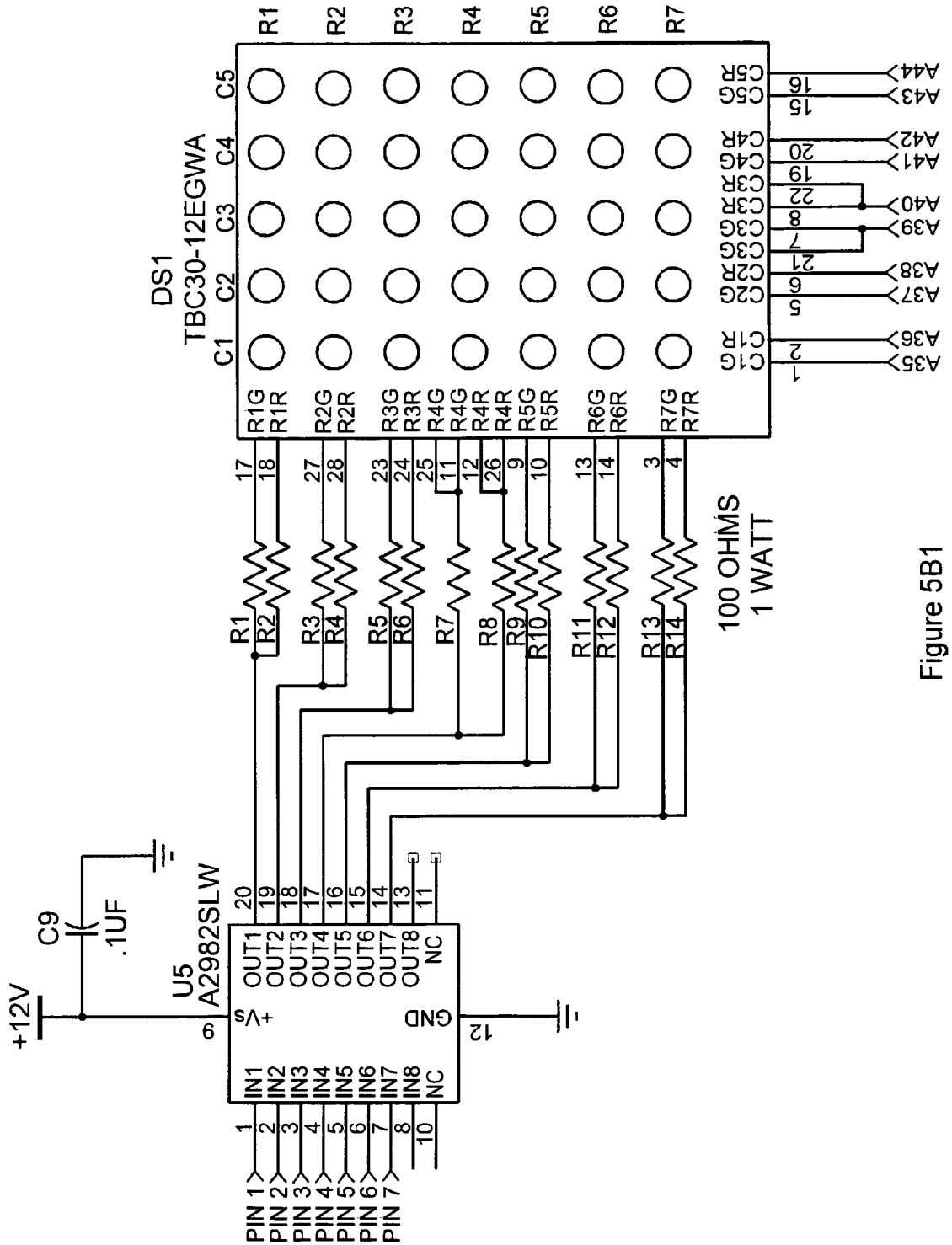
Figure 5B1

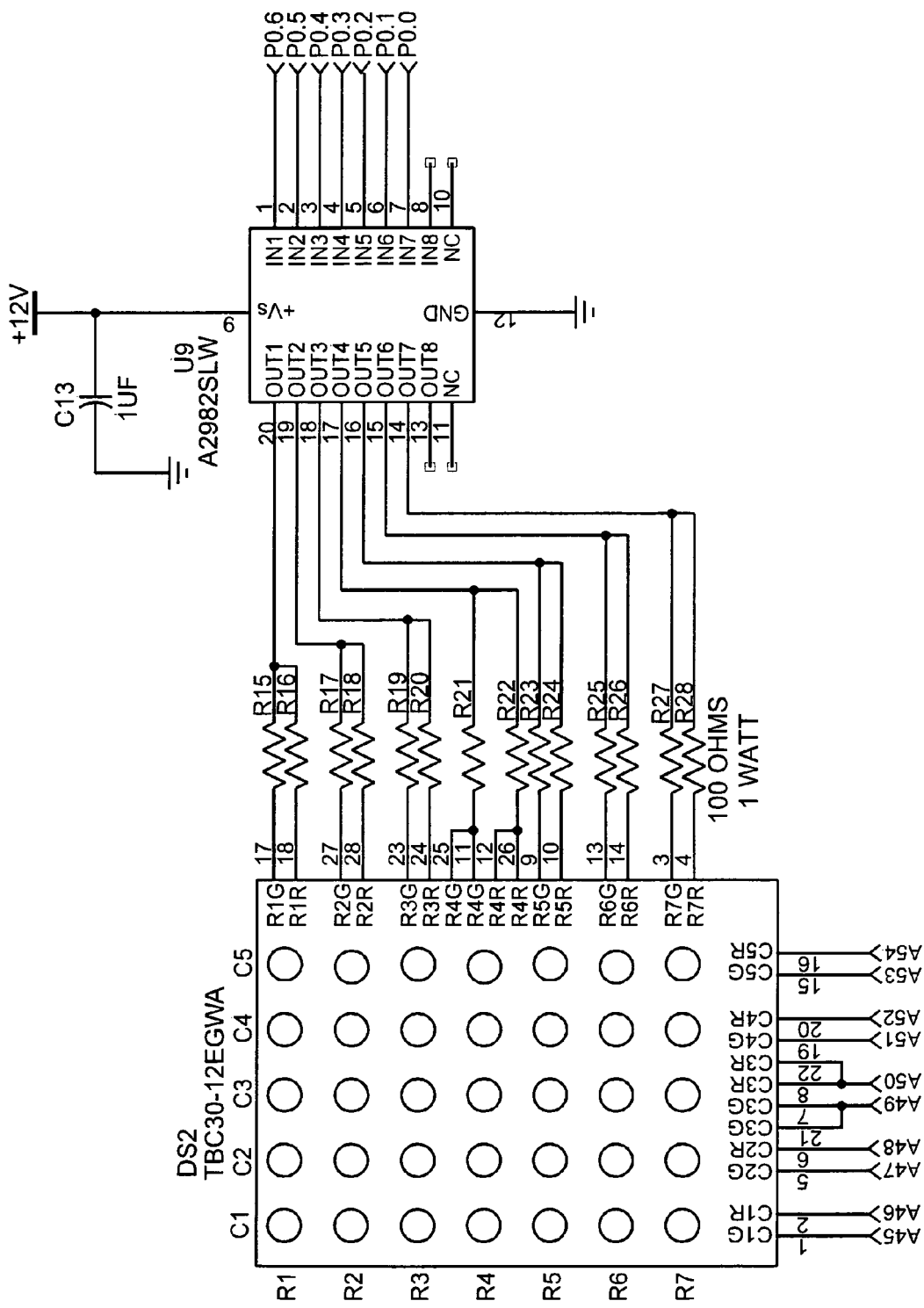
Figure 5B2

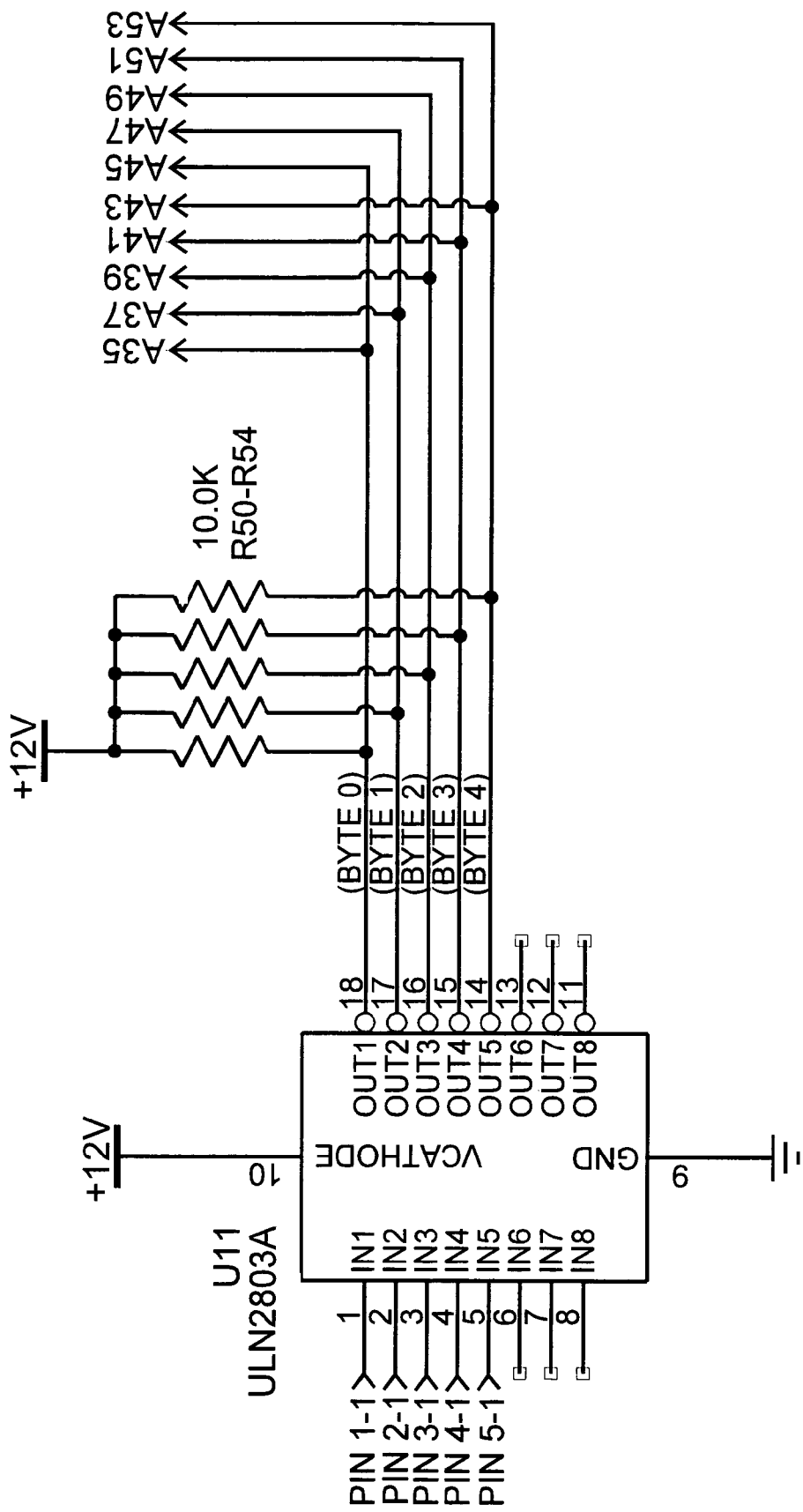
Figure 5B3

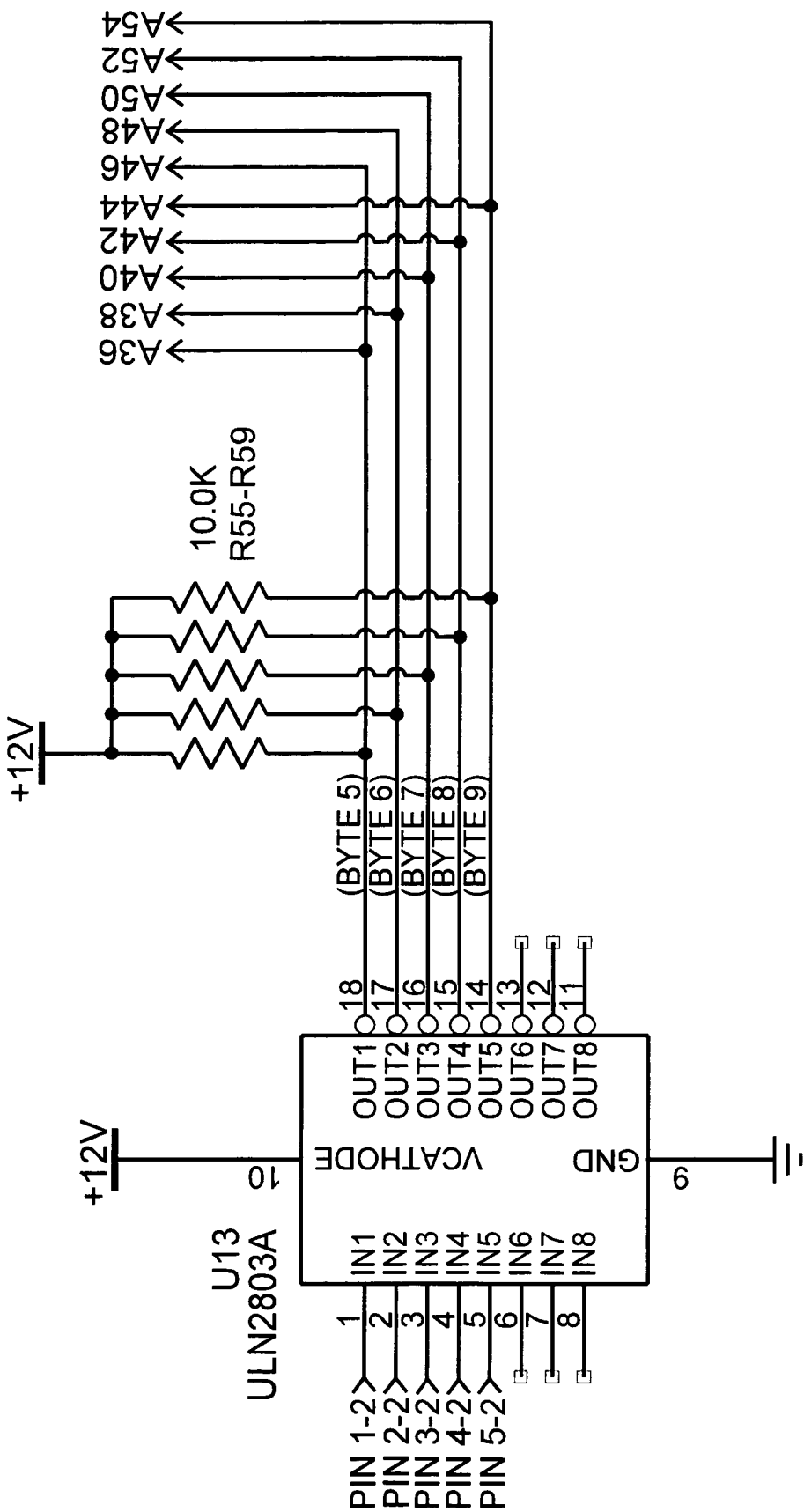
Figure 5B4

1001

| GRADE BY 15 MINUTES | | | | | | | | | | | | | | | | | | | | | | | |
|---|---|---|---|---|---|---|---|---|---|---|---|---|---|---|---|---|---|---|---|---|---|---|---|
| AM | | | | | | | PM | | | | | | | | | | | | AM | | | | |
| 6 | 7 | 8 | 9 | 10 | 11 | 12 | 1 | 2 | 3 | 4 | 5 | 6 | 7 | 8 | 9 | 10 | 11 | 12 | 1 | 2 | 3 | 4 | 5 |
| A+ | A+ | A | A- | A | A+ | C- | C- | D | F | C- | D | D+ | F | C | F | F | F | | | | | | |
| A+ | A+ | A | C+ | B+ | A+ | D+ | C+ | C+ | C | F | C+ | C | D | F | F | F | F | | | | | | |
| A+ | A+ | B | B+ | A | C+ | F | F | D- | C | F | C- | C+ | D- | B- | F | F | | | | | | | |
| A+ | A | A | A | B | C- | F | D+ | D | F | D- | F | D- | F | C | C+ | F | F | | | | | | |

1002

| ERRORS BY PRODUCT | | | | |
|---|---|---|---|---|
| PRODUCT | HOLD TIME | OVERCOOK | DELAYS | TOTAL |
| SAUS | 1 | 1 | 27 | 29 |

1003

| ERRORS BY MANAGER | | | | | | | |
|---|---|---|---|---|---|---|---|
| START TIME | END TIME | MANAGER | HOLD TIME | OVER COOK | DELAYS | TOTAL | GRADE |
| 6:00 AM | 4:00 PM | ROSANNA | 12 | 3 | 73 | 88 | B+ |
| 4:00 PM | 12:00 AM | ERIC | 16 | 0 | 113 | 129 | C+ |

Figure 9A

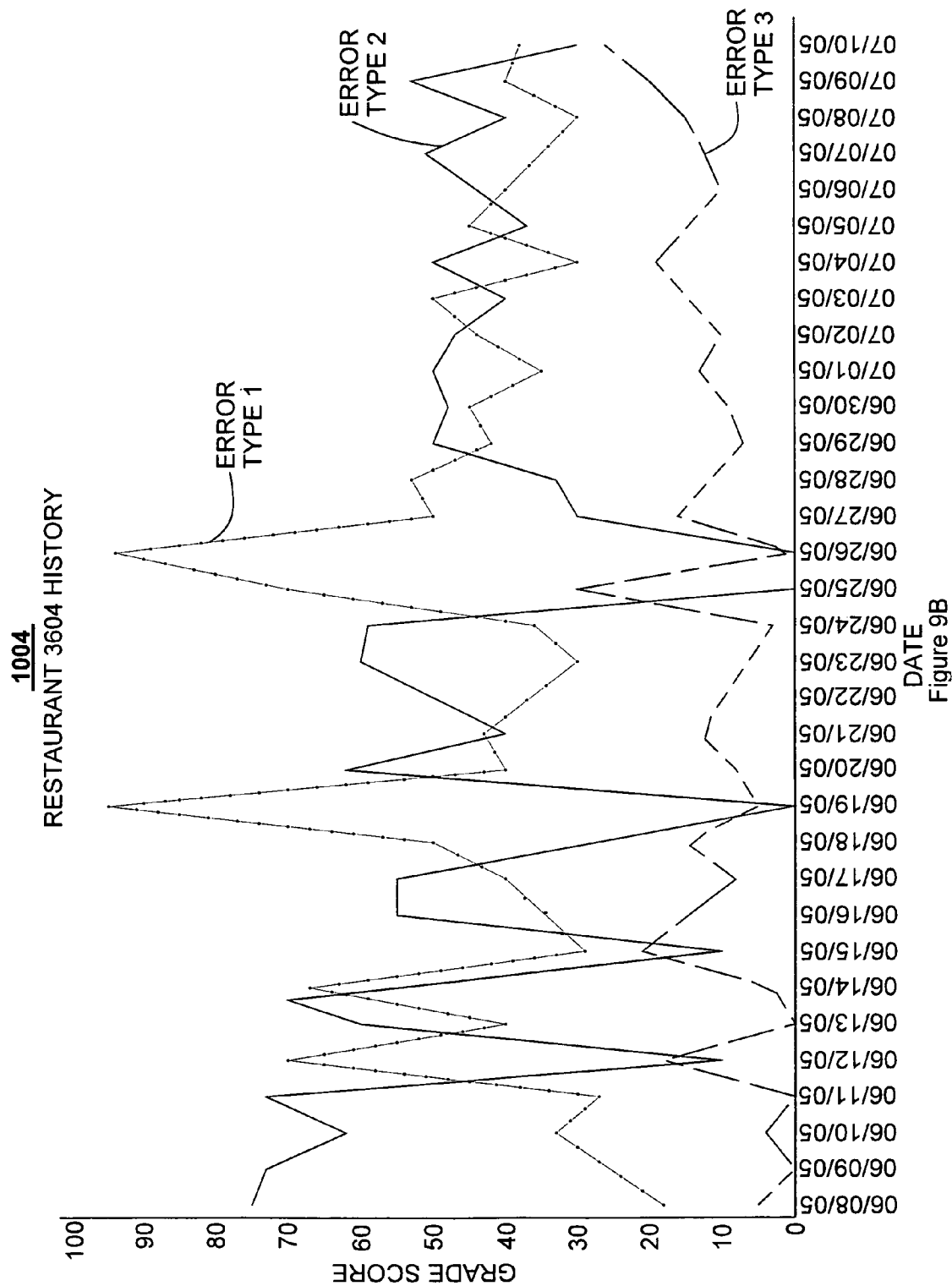

1005
ERRORS BY DAYPART

| DAYPART | HOLD TIME | OVER COOK | DELAYS | TOTAL | GRADE |
|---|---|---|---|---|---|
| 6:00 AM - 10:30 AM | 0 | 0 | 32 | 32 | A |
| 10:30 AM - 2:00 PM | 5 | 1 | 22 | 28 | B+ |
| 2:00 PM - 5:00 PM | 10 | 2 | 25 | 37 | B- |
| 5:00 PM - 8:00 PM | 7 | 0 | 52 | 59 | C |
| 8:00 PM - CLOSE | 6 | 0 | 55 | 61 | B- |
| TOTAL | 28 | 3 | 186 | 217 | |

Figure 9C

METHOD AND APPARATUS FOR MANAGING FOOD PRODUCTS IN QUICK SERVE RESTAURANTS

CROSS-REFERENCE TO RELATED APPLICATIONS

This application is related to U.S. Provisional Application Ser. No. 61/131,482, filed on Jun. 9, 2008, and entitled "Method and Apparatus For Managing Food Products In Quick Serve Restaurants", the disclosure of which is incorporated herein by reference. This application claims the benefit of priority under 35 U.S.C. 119 and/or 35 U.S.C. 120 to the aforementioned related provisional application.

BACKGROUND OF THE INVENTION

1. Field of the Invention

This invention relates generally to devices that are used in a quick serve kitchen to manage the amount of cooked product throughout the day and limit the time products are held by properly discarding expired food.

2. Description of the Prior Art

Quick serve restaurants strive to serve fresh food to customers in one to two minutes. This type of operation requires the cooked components of the finished food product to be prepared and held and then be finally assembled to the customer's orders. Current operations have multiple menu items and therefore need a device to help manage the cooking and holding operation.

A current method in the industry uses paper charts that show the kitchen staff how much food to cook throughout the day. The manager must select a sales forecast, print or prepare these charts and post them in the kitchen. Therefore, it would be advantageous if the information was displayed on an electronic display and the data was processed to show the exact information required for cooking throughout the day.

A current device in the industry uses LEDs (light emitting diodes) and has 12 fixed product locations on the display. This device looks complex and is expensive. Therefore, it would be advantageous if the information were displayed on an electronic graphic display screen to allow for many more food products to be managed by the system.

A current method in the industry is for the kitchen staff to perform the following steps throughout the day:

1—Look up a food item on a chart for the current time of day and note the food needed number;
2—Observe the amount of food already prepared;
3—Calculate "food needed"−"food cooked"=quantity of food to prepare;
4—Prepare the food and place it in the holding container; and
5—Start a product hold timer.

These steps are repeated each time the batch of food is sold or expires or the sales level increases or decreases. This method requires the staff to perform time consuming, error prone, multiple steps to insure that fresh cooked food is always available. Due to the complexity of the menu and the time consuming steps required to follow the process, the posted charts are ignored. When the charts are ignored, the staff cooks too much food for the current sales so they will not run out. This leads the staff to hold the product past the expiration time, and instead of discarding the waste, it is served to the customer. Therefore, it would be advantageous to replace the chart lookup and manual calculation with an automated device and system that monitors the hold timers and displays on a graphics screen the proper amount of product to cook. This allows the staff to perform efficiently and results in fresher food being served to the customer.

Currently, there are many algorithms that are used to calculate required products in a quick serve restaurant. Additionally, many point of sale systems only save ½ hour sales and the total of each product sold throughout the day. An improved and simplified method for calculating products required throughout the day is to use a ratiometric calculation. The calculation for a product for any time period is the ratio. The improved formula uses minimum data and is an easy method for determining the amount of food required in the restaurant for any period throughout the day.

A current device in the industry calculates the pans required to fill and illuminates an LED red to indicate to the user to cook food and fill a pan with food. This device only allows for full pans and does not display how many patties to put in a pan. Therefore, it would be advantageous to calculate the number of patties required in the restaurant and divide the patties required by max (maximum) patties per pan as adjusted by the user. The device can then display a list of products to cook with the number of patties next to them. This method allows the staff finer control over the quantity of food being cooked to maintain fresh product to the customer.

Current devices in the industry, called product hold timers, are used to time how long the food product is being held. They are generally stand-alone timers that indicate when the hold time has expired. To calculate the quantity of food to cook, the staff is required to read and count up how many timers are running to determine the present quantity of cooked food being held. Therefore, it would be advantageous for the reading of the timers to be electronically connected in a network. This would insure an accurate monitoring of the timers running and free up the staff for other work.

Currently, managers in a restaurant manually program the hold timers when new products are added or removed from the menu. Therefore, it would be advantageous for a timing system to be linked together so that the timers can be programmed from a central location. This data may include hold time, cook time and product names.

Current timer devices in the industry called product hold timers are used to time how long products are held. When the menu changes during the day, such as breakfast, lunch and dinner, the product hold timers need to be reprogrammed or additional timers are required with different hold times. Therefore, it would be advantageous for the timer system to contain multiple menus and have one key that selects a set of timers for the menu being served.

Currently, managers in a restaurant keep watch on the time to instruct the kitchen staff to begin cooking the next menu items. Therefore, it would be advantageous for a device to remind the staff to change menus at a programmed time.

Currently, managers in a restaurant use various manual or paper techniques to remember to select a sales forecast. This sales forecast called product level charts determine how much food to cook for the day. Therefore, it would be advantageous for a system to remind the manager to select a sales forecast.

Currently, managers in a restaurant use the point of sale system to run reports that they use for determining the products that they need to cook for the day. Many point of sale systems do not have this feature. Therefore, it would be advantageous for a device to hold multiple ½ hour sales and product mixes (quantity of products sold during a previous day). The manager could then select one of several ½ hour sales and product mix from a previous day that would match the coming day.

Current timing systems contain individual timers that need to be separately programmed. This is time consuming and can lead to programming errors. Therefore, it would be advantageous to have a display screen that showed all the product locations in the restaurant. This screen would depict the timer locations in the restaurant and would allow the user to select the timer desired for that location. This feature will save time and effort by the manager.

Current product level systems in quick serve restaurants cannot determine how many pans of food are required and how many pans of food are already prepared. When too much product is prepared for a given sales level, the product will expire and either waste will increase or the expired product will be served to the customer. Therefore, it would be advantageous to monitor when too many pans of food product have been cooked. This error can be stored and displayed for future corrective action.

Current food product level systems and timers in quick serve restaurants cannot determine when a pan of cooked food has exceeded its hold time (i.e., the food product is now waste) and the product continues to be served. Therefore, it would be advantageous to monitor the timers for expiration, and if the timer is reset within a short period of time, count this as a "waste served" error. This error signal is then stored and displayed for corrective action.

Current product level systems and timers in quick serve restaurants cannot determine when a pan of cooked food is required but has not been filled. This action can be caused by not cooking the food on time, which effects speed of service, or not starting the product hold timer, which leads to poor quality food being served. Therefore, it would be advantageous to monitor how long a product is on a "To be cooked" list, and if it exceeds a multiple of cook times, count this event as a "Cook delay error". This error signal can be recorded and displayed for corrective action.

Current product level systems and timers in quick serve restaurants cannot determine when a pan of cooked food has expired and has not been discarded by the user. This action can cause expired food being served, which effects food quality. Therefore, it would be advantageous to monitor how long a product is on a "To be discarded" list, and if the staff member does discard the product and stop the hold timer which removes it from the list, after a period of time, count this event as a "Discard delay error".

Current product level and timer systems do not record quality errors occurring in the kitchen of a quick serve restaurant. Additionally, the office computer is usually busy with point of sales accounting work. Therefore, it would be advantageous to collect and record these errors in a small, embedded electronic system.

Current product level and timer systems do not calculate quality errors occurring in the kitchen of a quick serve restaurant. Therefore, it would be advantageous assign a point value to each error and calculate a grade by subtracting the points from 100. A grade scale is then created for the kitchen staff. When errors are created, they bring the grade down. The errors can be counted over a period of time, such as at ½ hour increments. When errors become older than ½ hour, the points can be added back, therefore increasing the staff grade.

Current quick serve restaurants do not display to the kitchen staff the quality of the work they are performing. Therefore, it would be advantageous to create a device that displays a numeric (0-100) or a letter (A-F) quality grade directly to the staff so that the staff can monitor the quality of their work. The displayed grade then becomes a feedback device to allow the kitchen staff to know when quality is falling and to improve their work.

Current quick serve restaurants do not chart the errors that occur by the kitchen staff during the day. Therefore, it would be advantageous to relocate the error data from the embedded system to the office computer via serial, USB or network connection at the end of day. A program can then create charts and graphs for the day. This allows the store manager to review the quality of performance of the kitchen crew during the time the store manager is not present.

Current quick serve restaurants do not collect the quality errors that occur by the kitchen staff during the day. This does not allow the storeowners to view the quality of the kitchen staff over many restaurants or over a time period. Therefore, it would be advantageous for the quality error data to be transferred to a database via connection to the Internet to be used for training and coaching of the staff.

Current quick serve restaurant management does not have the ability to receive automated emails on the quality of the kitchen staff performance. Therefore, it would be advantageous for the improved product management system to automatically send emails to management on the performance of the kitchen staff.

Currently, managers in a quick serve restaurant cannot see in real time what quality errors are occurring in the restaurant. Therefore, it would be advantageous to create a display called a "Manager's Unit" that is mounted in the manager's workstation (preferably up front by the customers) to show the errors as the errors occur. This display would show the time, type and product of the quality error that occurred. This would allow the manager to immediately coach the staff to ensure that the quality of the product remains high.

Currently, managers in a quick serve restaurant cannot see errors or a history of the current day's errors broken down by shifts. This data could be used to focus future staff training. Therefore, it would be advantageous to create a display to show the history of errors broken down by shifts. This would allow the manager to focus the training on the shift that is under-performing.

Currently, managers in a restaurant cannot see what products need to be cooked by the kitchen staff and if they are performing the cooking cycles in a timely manner. Therefore, it would be advantageous to display the list of products to cook preferably up front by the manager's workstation. The manager can then coach the staff before errors occur.

Currently, managers in a restaurant become busy with customers and forget to perform recurring tasks. An example is cleaning utensils, checking temperatures of cooked products, and checking the cleanliness of the dining and restroom areas. Therefore, it would be advantageous if there were a device mounted by the manager's workstation that contained a display and timers that could be programmed to remind the manager to perform theses recurring tasks.

Currently, some quick serve restaurant kitchens are too large to have one display that shows the staff what to cook. Therefore, it would be advantageous to create a slave display that showed a second area of cooks what to cook in the restaurant.

OBJECTS AND SUMMARY OF THE INVENTION

It is an object of the present invention to provide an embedded electronic system with a text and graphics display that shows the kitchen staff the products to cook and the quantity to cook throughout the entire day.

It is another object of the present invention to provide firmware and hardware in an embedded electronic system that calculates how much food is required, detects how much food is being held and outputs to the display a list of products to cook using a sales forecast the manager has selected.

It is yet another object of the present invention to provide an electronic system which uses an improved algorithm that is based on a ratio metric approach using ½ hour sales and total products sold to calculate how much product to cook and hold in the restaurant throughout the entire day.

It is yet another object of the present invention to provide an electronic system which uses an improved algorithm that calculates the quantity of product to cook and then place into a holding pan.

It is a further object of the present invention to provide a network system that communicates from the product hold timers to the main display control device.

It is an object of the present invention to provide software in the embedded system that communicates to a central programming device, such as an office computer or a personal digital assistant (PDA).

It is another object of the present invention to provide a device that contains multiple menus for one day that may be easily recalled by the user. This allows the user to quickly change the menu from breakfast to lunch to dinner with one key.

It is yet another object of the present invention to provide a device that would display a message and may sound an audible alert, reminding the kitchen staff to begin cooking the next daypart items.

It is a further object of the present invention to provide an automated reminder displayed on the screen at the beginning of the day that prompts the manager to select a sales forecast.

It is an object of the present invention to provide a device that contains one menu selection key that selects a set of timers for the menu being served so when the menu changes during the day, such as breakfast, lunch and dinner, all the product hold timers are reprogrammed or additional timers are added with the hold times for that set of menu items.

It is another object of the present invention to provide a method to program the location of food products in individual pan locations from one central location that depects the timers in a schematic form and adjust each of theses timers using the screen and keyboard.

It is yet a further object of the present invention to provide a device that contains an algorithm that continuously monitors a timing system for food products and flags and stores an "over cook error" signal when more pans are being timed than was called for by the product management system.

It is an object of the present invention to provide a device that contains an algorithm that continuously monitors a timing system for food products and flags and stores a "waste served error" signal when a timer has expired and has been reset in a short period of time.

It is another object of the present invention to provide a device that contains an algorithm that continuously monitors the items on a display screen calling for product and a timing system for food products. The algorithm causes the device to flag and store a "cook delay error" signal when a timer has not been started after a period of time the product has appeared on the screen to cook.

It is a yet another object of the present invention to provide a device that monitors the hold timers for expired hold times and displays products to be discarded on a display screen and an algorithm that continuously monitors the amount of time the expired products are on the screen. When the products are discarded by the staff and the hold timers are stopped by pressing the hold time button on the hold timers the items are removed from the screen. If the items remain on the screen for too long the algorithm causes the device to flag and store a "Discard delay error" event.

It is a further object of the invention to provide an electronic food product management system having a nonvolatile memory to store quality error signals, such as "Waste served"—products that have expired hold times, Over cook—additional products cooked above what the system calls for and "Cook delay errors—products that are called for by the system and not cooked along with a date, time and product name.

It is an object of the invention to provide a relatively small, embedded, food product management system having an algorithm that weights the aforementioned errors in such a manner that informs the staff of their performance.

It is another object of the invention to provide a remote display of the quality grade of the kitchen staff in numeric or alphanumeric form.

It is yet another object of the invention to provide software on an office computer that collects the aforementioned quality error data and creates charts and graphs of that data.

It is a further object of the invention to provide a database of collected quality errors that occur by the kitchen staff during the day such as Waste served, Over Cook, and Cook delay that allows charts and graphs toe be created of the quality errors and to create an Internet access of the data base for all staff and management for multiple unit operators.

It is an object of the present invention to provide an automated food product management process running on a database server that automatically sends emails to management on the quality of the kitchen staff performance.

It is another object of the present invention to provide a remote display preferably located at the store manager workstation that contains a screen that shows the quality errors in real time as they occur.

It is yet another object of the present invention to provide a remote display preferably located at the store manager workstation that contains a screen that shows the history of the errors that have occurred during the day.

It is a further object of the present invention to provide a remote display preferably situated by the manager's work station that shows a screen of all the products that currently need cooking in the restaurant.

It is an object of the present invention to provide a remote display preferably situated by the manager's work station that is programmed with recurring and non-recurring tasks that display themselves at the programmed time to remind the manager of tasks throughout the day.

It is another object of the present invention to provide one or more slave displays preferably mounted by other cook stations that display the food products and quantity of food products to cook throughout the day.

In accordance with one form of the present invention, an improved electronic food product management system includes a display having a screen that shows text and graphics of various data, including how much product to cook during the day, programming of product names, hold time, cook time and the product holding device timer location and position of the restaurant that is managed by the management system of the present invention. This screen allows the user to see the data clearly and simply and allows for easier programming and set up of the management system.

The improved food product management system contains a small embedded electronic system that includes a single chip computer that calculates and displays a list of products to cook. The single chip computer contains firmware and user supplied data tables that calculates the amount of cooked food required in the quick serve restaurant for the entire day. The calculation is based on a ratio metric approach and does not require the user to calculate how much of each product to cook at any time during the day.

The improved product management system contains a simple formula that uses minimum data and a ratio metric approach to calculate the products required throughout the day. Preferably, the sales information for ½ hour periods of time is input by keyboard into a personal computer and then transferred via serial link into the product management system. The total number of food patties (e.g., meat, chicken, fish) of each type of product sold during breakfast, lunch and dinner are also input by keyboard into a personal computer and then transferred via serial link into the product management system.

In accordance with the food management process of the present invention, certain information is inputted into the electronic management system, and certain calculations are made by the system. More specifically, and in accordance with one form of the food product management process of the present invention, the ½ hour incremental sales are added, which equals the total sales for the day, as shown by the equation below:

Total (Number of) Sales=Sum of half hour sales.

Then, the total patties sold are divided by the total sales, which equals a patties per dollar number, as shown by the equation below:

Total (Number of) Patties Sold/Total Sales (Dollar Amount)=Patties/$.

For any ½ hour sales, the number of patties can be estimated by the formula:

Patties/$*(multiplied by) Half Hour Sales=Patties required for that half hour.

The patties are placed into a product holding pan after they are cooked. The number of pans can be calculated by taking patties required/(divided by) maximum patties in pan, as shown by the equation below:

Patties required/Max patties in pan=Pans Required in restaurant.

The system reads the number of pans that are being held in warmers, and then calculates how many pans of food product to cook, as shown by the equation below:

Pans Required−Pans being held=Pans to Cook.

The display will show a line of text for each pan of food product, for example, "Cook 10 Burgers".

This will allow the number of pans of food product to be displayed along with how many patties to be in the pan at that time. The number of patties can then be displayed on the screen for the user to cook. This process provides an easy way for determining the amount of food and pans required throughout the day.

The improved product management system contains a timer network that allows a main control device of the system to communicate with product hold timers. Each timer location must be programmed with product names, hold times, cook times for the timer to operate properly. The main control device can then monitor the status of the timers to determine the quantity of pans being held in warmers, or if the product is about to expire, or if the product has expired. The data is then used in the calculation to determine whether more pans of food product are required or not.

The improved product management system contains a central programming feature. This allows the user to program product names, hold times, cook times into each timer location from one point in the kitchen. The data can then be sent to the proper product hold timers via the timer network.

The improved product management system contains in its memory multiple menus called "dayparts" that can be selected using one daypart key located on the front panel of the Product Management display unit. The menus contain product names, hold time, and cook time, maximum patties per pan, quantity sold, ½ hour sales and product location. The user can then preset the system with multiple menus and, with one Daypart Selection key, select the menu for that time of day or day of week.

The improved product management system provides a daypart reminder signal. The system is programmed with the time the daypart change occurs. The improved product management system displays a screen that prompts the user to change over to the new menu items. An example is at 10:00 am, the screen would prompt the user to change from breakfast to lunch. The manager can then be assured that the proper items will be prepared at the proper time.

The improved product management system provides a forecast select reminder signal. At a programmed time before the restaurant opens, the display will alarm and prompt the user to select a sales forecast. This sales forecast contains the products that are expected to be sold for the day and the ½ hour sales that are expected to occur throughout the day. This reminder signal helps insure that the product management system will display the correct quantity of food throughout the day.

The improved product management system allows the user to preprogram a central control device of the system with multiple product mixes (e.g., meat patties, chicken strips, etc.) and preferably ½ hour sales information. The manager then selects a forecast from a list of ½ hour sales and product mix from a previous day that would likely match the coming day's sales.

The improved product management system includes a central programming display screen that shows the location of all of the products that require holding in the restaurant. This feature saves the user time by programming the product hold locations from a central screen. The screen depicts the location in a picture form via a schematic drawing of the holding unit with placement of the product and the products are selected from a list of products that may be served.

The improved product management system contains an over cook monitoring feature. The product management system calculates how much food is to be prepared for any minute during the day. The total of prepared food is broken down into batches called pans. The main display unit utilizeint the timing network, monitors how many timers are activated. When the system detects that a timer has been activated for an unneeded pan of food, the system records an over cook error. This error signal is stored in a non-volatile memory to be later downloaded and evaluated for future corrective action by the manager and/or owner.

The improved product management system contains a waste served monitoring feature. Through the timer monitoring network, the system can determine when a pan of food has expired and has become waste. When the user at the product hold timer location clears the expired food indication (flashing red light) by pressing the start/stop timer key and then restarts the timer by pressing the start/stop timer key within a short period of time, the system assumes that the restaurant employees are serving the expired waste product. This error signal is stored in a non-volatile memory to be later downloaded and evaluated for future corrective action by the manager and/or owner.

The improved product management system contains a cook delay monitoring feature. When the system determines that a pan of food is required and displays a cook command on the screen, a timer is started. If the food preparers do not cook the food and place it into a pan and start the product hold timer by pressing the start/stop key on the product hold unit within a prescribed time the system records this as a cook delay error. This error signal is stored in a non-volatile memory to be later downloaded and evaluated for future corrective action by the manager and/or owner.

The improved product management system contains a discard delay monitoring feature. When the system determines that a pan of food has expired (i.e., is held in a warmer longer than a predetermined period of time) but does not need replacement, the system prompts the user to discard the food by flashing a red led on the product hold timer keyboard at the product pan location. The system then starts an internal timer. If the user does not press the start/stop product hold timer within a prescribed time, the system records this as a discard delay error. This error signal is stored in a non-volatile memory to be later downloaded and evaluated for future corrective action by the manager and/or owner.

The improved food product management system stores the quality errors collected in the main display unit using non-volatile memory. This allows the errors to be retrieved by an office computer at convenient times. Each error record is formatted with a date and time and product reference number that caused the error and a checksum or CRC for data integrity. The data stream of errors provided to the office computer also contains a beginning of day record that serves to separate different days of data in case the data is not retrieved for several days.

The improved product management system uses an algorithm that weights each of the errors collected. As an example, a Cook Delay error or Discard Delay error=2 points, an Over Cook error=3 points and a Waste Served error=6 points. Preferably, the system starts the day with a 100 point score. Each time an error occurs, these weighted error points are subtracted from the current score. When a refresh time period has passed, such as a ½ hour period, the error points are added back into the score to reset the score to 100.

The improved product management system contains a grade display unit having a display that is mounted in the kitchen of the restaurant to give direct feedback to the kitchen staff. When the system collects and weights the quality errors, the score can be displayed on a numeric or alphanumeric display. The numeric display directly displays the score to which the kitchen staff is performing. The alphanumeric display translates the numeric score to a grade score, such as +A, A, −A, +B, B, −B, +C, C, −C, +D, D, −D, F. The grade alphanumeric display can be more motivating to staff than a numeric score display and, therefore, is the preferred embodiment.

The improved product management system includes a program that resides on the office computer. Using the computer's built-in scheduler or a memory resident program, the office computer automatically downloads the error data to a file through an RS232, USB or network connection. The error data is then converted to several charts and graphs for the day. In the morning, the manager evaluates the charts and graphs and can then schedule product quality and management training.

The improved product management system transfers the error data collected into the office computer using an application program running on the office computer. Additionally, this application program sends the data to an SQL database that is remotely located at an off site website. This data can then be viewed as charts and graphs that show the quality level trends of the restaurant. Chart examples include, but are not limited to, errors by shift, grades every 15 minutes, errors by product, errors for the last 45 days. grades over the day. The error data can then be sorted to compare restaurants by districts and multi-districts, which is especially advantageous for restaurant chains. Managers and executives can access this data and pinpoint restaurants that require training or coaching for its employees.

The improved product management system contains an Internet feature that automatically emails management weekly quality reports to a predetermined remote location, such as a website or remote computer for viewing. These emails serve to show management the quality status of the restaurants, which is again quite useful for chain restaurants.

The improved product management system contains a manager's display unit that displays the errors as the errors occur in real time. The display of the manager's unit would show the time, type of error and product name (e.g., "burger") as the error occurs. This would allow the manager to immediately coach the staff to ensure that the quality of the food product remains high.

The improved product management system contains a manager's display unit that can display a chart containing the current day's errors broken down by shifts. As the manager's device receives errors, it totals the errors by shift and displays the type of errors and the total number of errors for the shift.

The improved product management system contains a manager's unit that can display the same information of what to cook that is being shown on the main control unit of the system. This data is sent via a communication cable from the main control unit to the manager's unit, or to other units of the system, and is decoded and displayed at the manager's unit or elsewhere.

The improved product management system provides programmable recurring reminders on the managers display unit. The reminder pops onto the display screen of the managers display unit at the programmed time. Examples of some reminders are "wash hands", "inspect the dining room", and "inspect the washroom". The reminder text, start time to display the reminder and repeat time to display the reminder are programmable by the user of the system.

The improved product management system includes a slave display unit having a display that can be mounted in a separate cook area of the restaurant. The display of the slave unit shows all items to cook or can be configured to show only items to be cooked in that area.

These and other objects, features and advantages of the present invention will be apparent from the following detailed description of illustrative embodiments thereof, which is to be read in connection with the accompanying drawings.

BRIEF DESCRIPTION OF DRAWINGS

FIGS. 3A1-3A4, 3B1-3B5, 3C, 3D1-3D3 and 3E1-3E3 are schematic diagrams of the main control unit and display of the food product management system formed in accordance with the present invention.

FIG. 4 is a block diagram of the grade display unit of the food product management system formed in accordance with the present invention.

FIGS. 5A1-5A11 and 5B1-5B3 are schematic diagrams of the grade display unit of the food product management system formed in accordance with the present invention.

FIGS. 9A-9C are a series of charts generated from the web site database of the food product management system formed in accordance with the present invention.

DETAILED DESCRIPTION OF THE PREFERRED EMBODIMENTS

Figure 1A:
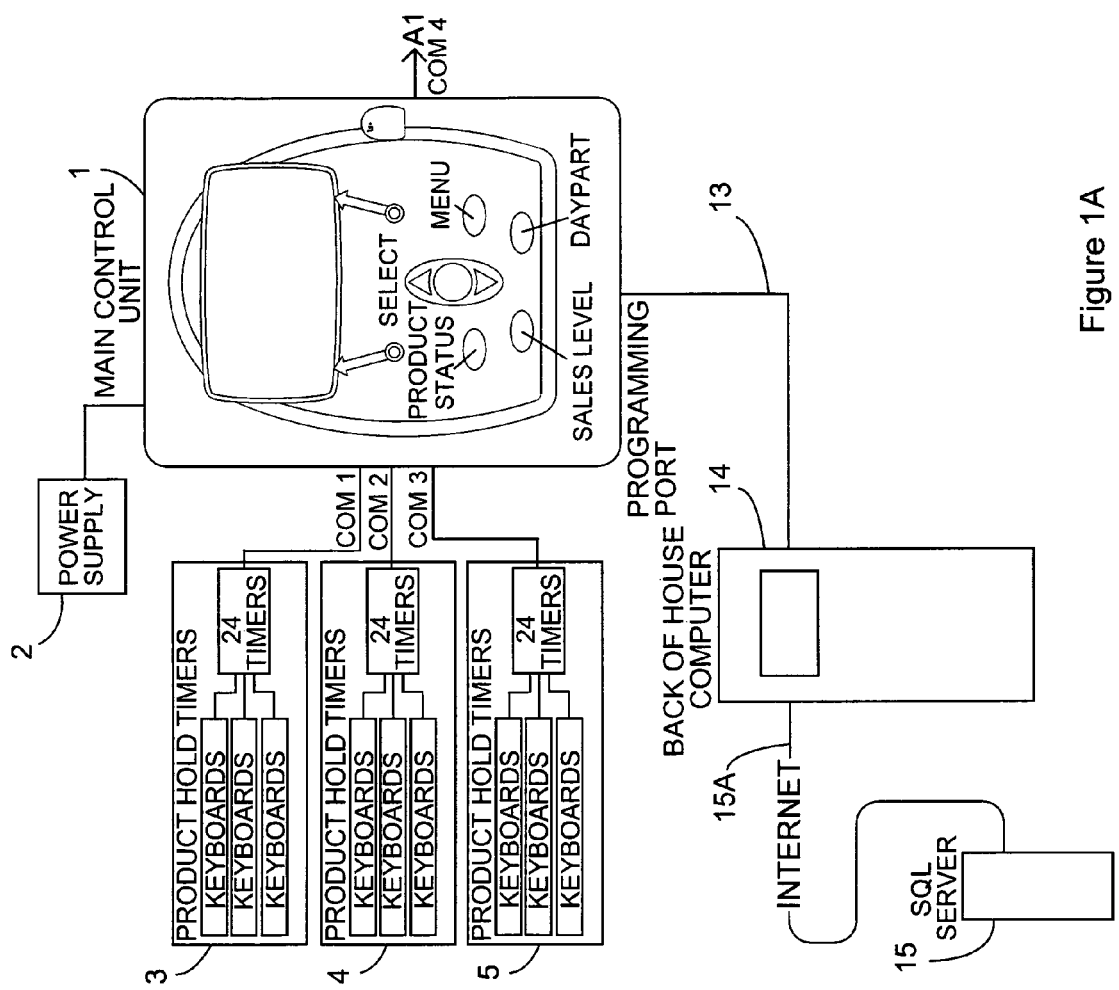
FIG. 1A and 1B are portions of a block diagram of an improved food product management system formed in accordance with the present invention.
Figure 1B:
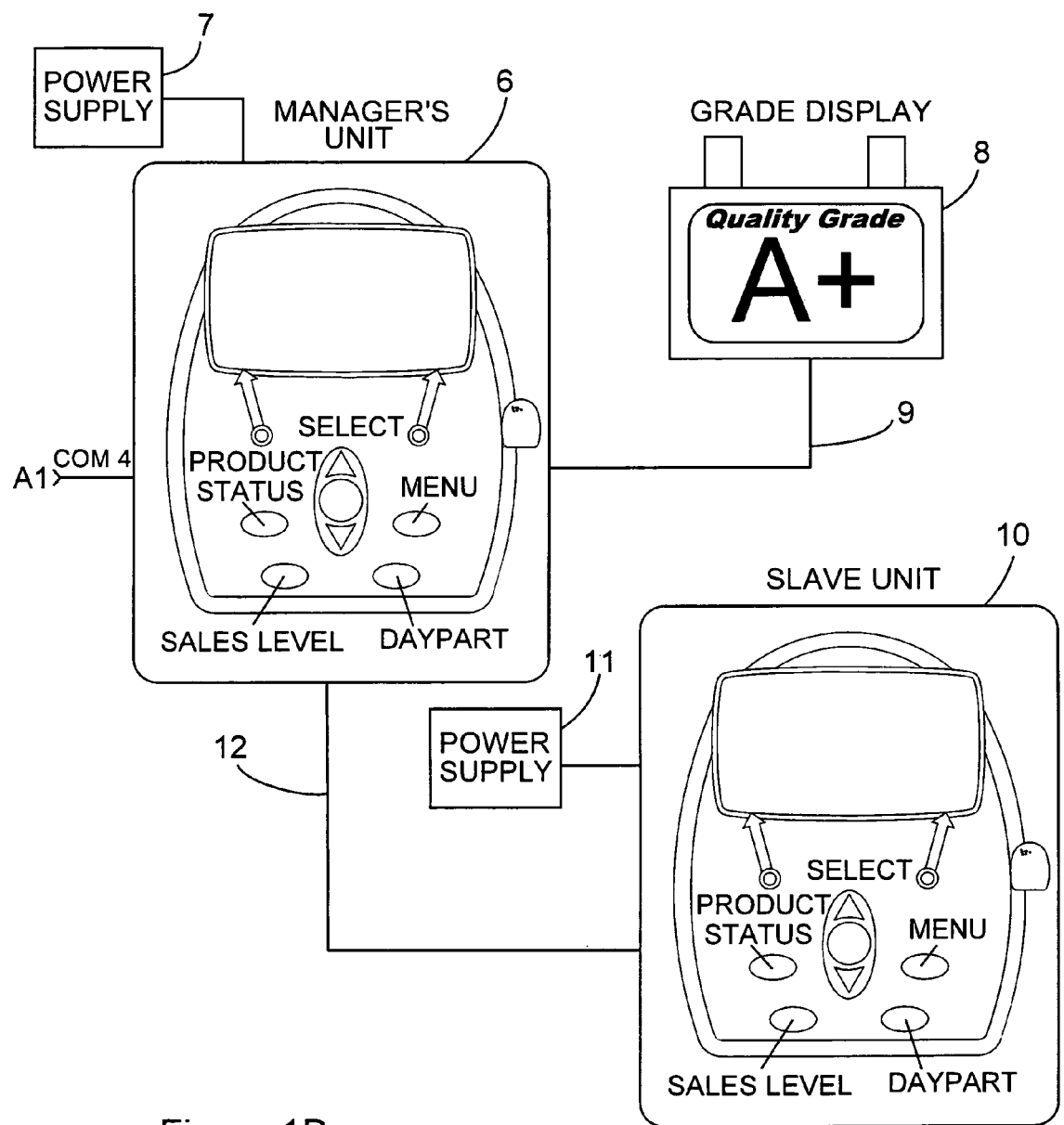

The food product management system is particularly suited for use with quick serve (fast food) restaurants having food preparation stations and food product hold timers situated at such stations, such as described in U.S. Pat. No. 7,232,062, which issued on Jun. 19, 2007, the disclosure of which is incorporated herein by reference. A block diagram of the improved food product management system of the present invention is shown in FIG. 1. (i. e., FIGS. 1A and 1B). The main control unit 1 is the master control device that initiates all commands and data requests. A standard wall plug ac transformer 2 powers it. The product hold timer devices 3, 4, and 5 are connected to the corresponding comports (communication ports) of the main control unit 1. The main control firmware in the main control unit 1 polls each product hold timer 3, 4, and 5 the status, such as stopped, running or expired of each timer. Each product hold timer unit 3, 4, and 5 preferably contains 24 individual product hold timers. The product hold timer unit 3, 4 and 5 time period that food product in a pan are being held typically in a warming holding unit at a food preparer's station in the fast food restaurant. Each product hold timer 3, 4 and 5 has associated there with a keyboard so that a food preparer may start and stop the associated product hold timer.

The manager's unit 6 connects to the main control unit 1 via COM 4 (communication port 4). The manager's unit is powered by a wall plug transformer 7. The main control firmware in main control unit 1 sends display commands to the manager's unit 6. The manager's unit 6 supplies the restaurant staff with restaurant operational data and displays errors, product names, time of errors, and products to cook, on the display of the manager's unit 6. The manager's unit 6 also calculates the quality grade (of the restaurant) and sends the grade data to the grade display unit 8. The grade display unit 8 has an associated display that shows the staff the quality grade for preferably the last ½ hour's work.

The slave unit 10 connects to the manager's unit 6 via a communication bus port 12. It is powered by a wall plug transformer 11. The slave unit 10 displays the products that need to be cooked or can be set to show the errors (e.g., cook delay, overcook or waste served) on its associated display. The slave unit 10 is powered by a standard ac wall transformer power supply 11. The system communicates through cat (category 5) cables 9, 12 and 13, Internet 15a and SQL server 15 among the main control unit 1, manager's unit 6, grade display unit 8, slave unit 10, house computer 14 and remote locations.

A standard desktop computer, referred to herein as the office computer 14, is connected via a comport to the programming port of the main control unit 1. Software that runs on the computer 14 is used to download sales forecasts into the main control unit 1. It also is used to set the cook time, hold time and product position in the product hold timers 3, 4, and 5 (i.e., which food product is located at what station in the restaurant).

Once a day, a scheduled task is run on the desktop computer 14 that starts an application that removes all of the errors collected from the main control unit 1 and sends the data to an SQL server 15 via the Internet 15a using a high-speed connection or dial up connection.

Figure 2:
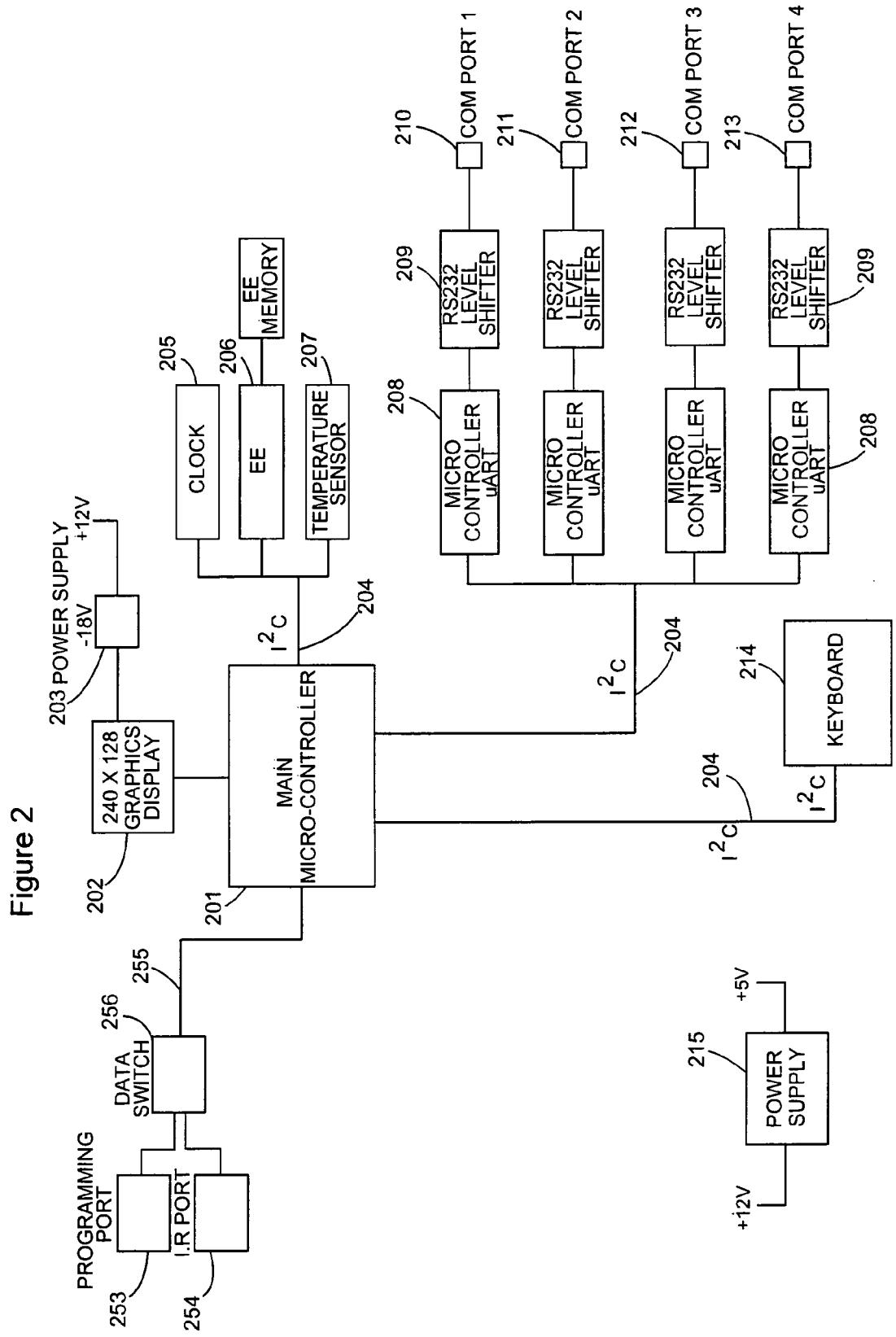
FIG. 2 is a block diagram of the main control unit and display of the food product management system formed in accordance with the present invention.

FIG. 2 is a block diagram of the main control unit 1. The manager's unit 6 and slave unit 10 include the same or similar hardware as that of the main control unit 1. The main microcontroller 201 of the main control unit 1 is preferably a single chip flash programmable device and contains the main control firmware. Each type of display unit (i.e., main control unit 1, manager's unit 6, and slave unit 8) has function specific code to perform the required tasks.

The microcontroller 201 connects to preferably a 240×128 liquid crystal graphics display 202 by an eight bit parallel bus. A twelve to eighteen volt power supply 203 is used to bias the LCD graphics display 202.

The user interacts with the main control unit 1, and in particular the main microcontroller 201 thereof, by using the keyboard 214. The keyboard 214 is read using the $i^2c$ bus 204 by the microcontroller 201.

The real time clock 205, EE PROM storage unit (with memory) 206, and PCB (printed circuit board) temperature sensor 207 is connected by $i^2c$ bus 204 to the main microcontroller 201. The real time clock 205 is used by the system to record the time and date of errors that occurred during the day and to look up the sales for the proper time of day that has been transferred from the office computer and stored into the EE PROM 206 of the device (i.e., main control unit 1).

The device (i.e., main control unit 1) preferably has four comports 210-213 (i.e., COM PORTS 1-4 as also labeled in FIG. 2) that communicate with the product hold timers 3, 4, and 5 and the manager's unit 6. The comports 210-213 are implemented by four microcontrollers 208 and four level shifters 209. More specifically, each microcontroller 208 is connected to an RS232 level shifter 209. The comports 210-213 are connected to RJ45 jacks (not shown).

The power supply 215 supplies five volt power to the system.

The device (i.e., main control unit 1) preferably contains an IR (infrared) port 254 and an RS232 port 253 for programming the main control unit 1. The inputs 253, 254 are shared using a data switch 256 which is controlled by the microcontroller 201 connected to the data switch 256 via bus 255. Point of sale information, such as from the customer ordering terminal or cash register terminal, may be inputted through ports 253, 254.

Figure 3C:
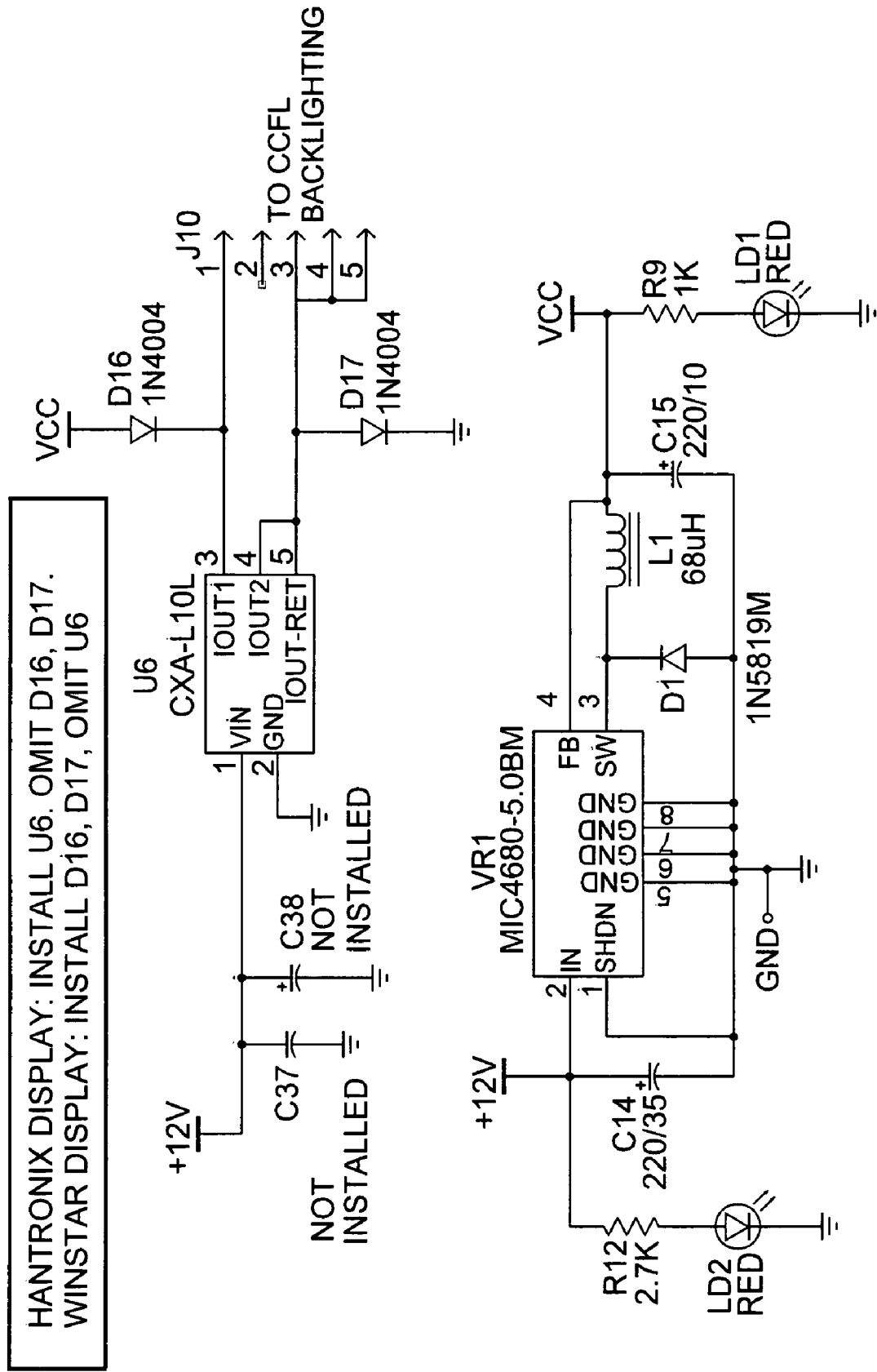

Reference should now be had to FIGS. 3A1-3A4, 3B1-3B5, 3C, 3D1-3D3 and 3E1-3E3, which together present a schematic diagram of a preferred form of the electronic circuit of the main control unit 1 of the present invention. FIGS. 3A (i.e., FIGS. 3A1-3A4) and 3B (i.e., FIGS. 3B1-3B5) are partial schematic diagrams of the main control unit 1, and will now be described.

The main microcontroller U1 (201 in FIG. 2) contains the main control firmware inside the chip within its 128K flash memory. The microcontroller U1 is connected to the 240×128 LCD 1 (202 in FIG. 2) through connector J5.

The 12 volt DC power is connected to connector J9. Diode D10, capacitor C36 and diode D9 are used to filter the incoming 12 volt (VCC) and for circuit protection.

Integrated circuits U3 and U4 are non-volatile EE PROMs (electrically erasable programmable read only memories) connected to an i²c bus. The temperature of the main control unit's display LCD1 is monitored through the LM75 integrated circuit U8. The real time clock circuit (205 in FIG. 2) comprised of integrated circuit U5, crystal Y2 and capacitor C16.

Connector J1 and integrated circuit U2 are the programming port and level shifter, respectively, that allow an external computer to communicate data and programs to the microcontroller U1. Integrated circuit U9 is a digital signal switch that allows the device to switch the IR port IR1.

The IR port IR1, and integrated circuits U10, U11 and U9, are used to communicate serial IR (infrared) data to the microcontroller U1 from handheld devices (e.g., a PDA), or other external devices.

As can be seen from FIG. 3B, transistor Q3, and voltage regulators VR3, VR4 and VR2, make up the LCD—18 Volt supply. LCD1 is the graphics display that shows user information. It is connected via a data bus to the microcontroller U1 shown in FIG. 3A.

Integrated circuits U7A and U7B are i²c drivers that communicate to the 4 serial ports shown in FIG. 3C and FIG. 3D (i.e., FIGS. 3D1-3D3).

As shown in FIG. 3C, which is a partial schematic diagram of the main control unit 1 of the present invention, integrated circuit U6 is an inverter chip that converts 12 volts to 300 VAC for the cold cathode florescent back lighting of the LCD display LCD1. Voltage regulator VR1 is the main power supply generating VCC at the 5 volt level.

As shown in FIGS. 3D and 3E, (i.e., FIGS. 3E1-3E3), which are partial schematic diagrams of the main control unit 1 of the present invention, the main control unit 1 contains 4 channels of serial universal asynchronous receiver/transmitters (UARTs) (208 in FIG. 2). The UARTs 208 are formed by integrated circuits U13, U14 on FIG. 3D and U15, U16 on FIG. 3E, which are microcontrollers (87LPC762) with built-in i²c ports. The i²c data is translated and sent out by the serial UARTs operating preferably at 19,200 bps. Integrated circuits U16 on FIG. 3D and U17 on FIG. 3E are standard charge pump devices that convert the 5 volt TTL (transistor-transistor logic) levels to ±9 volt RS232 voltage levels (RS232 level shifters 209 in FIG. 2).

Connectors J11, J12 on FIG. 3D and J13, J14 on FIG. 3E are RJ45 connectors for COM PORTS 1-4 (210-213 in FIG. 2) that are used to connect the external product timers 3, 4, and 5 and the manager's unit 6 with the main control unit 1, as shown in the block diagram of FIG. 1.

Figure 4:
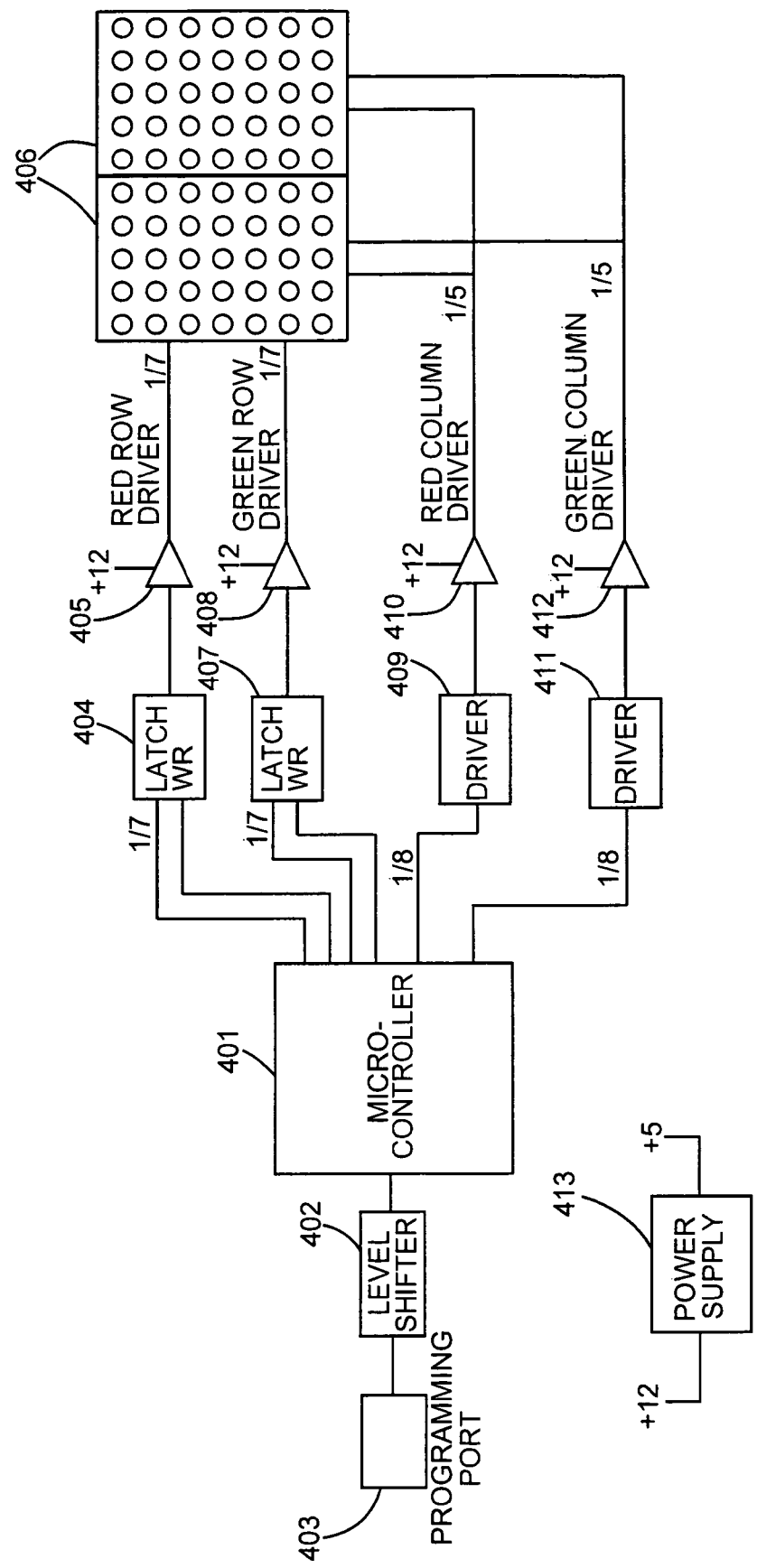

FIG. 4 is a block diagram of the grade display unit 8. In the grade display unit 8, the main microcontroller 401 contains the firmware inside the chip within its 64K of flash memory that runs the system. The microcontroller 401 communicates data and through the programming port 403 and level shifter 402. The microcontroller 401 converts the data to a letter grade that is shown on the tricolor dot matrix display 406. Display 406 is preferably formed from two LED display modules arranged in a 10×7 matrix. The LEDs are turned on and off using a standard matrix-multiplexing scheme. Display output signals from microcontroller 401 are provided to row latch circuits 404, 407 and column driver circuits 409, 411, the outputs of which are respectively connected to red and green row drivers 405, 408 and red and green column drivers 410, 412. When the row drivers 405 and 408 apply twelve volts to the row of LEDs and the column drivers 410 and 412 drive the column low, the LED at the intersecting point is lit. The firmware in the microcontroller 401 multiplexes the LED at preferably a 70 Hz rate. The power supply 413 converts the 12 volts to 5 volts that powers the digital circuitry.

A schematic diagram of a preferred form of the electronic circuit of the grade display unit 8 is shown in FIGS. 5A (i.e., FIGS. 5A1-5A11) and 5B (i.e., FIGS. 5B1-5B3).

The main microcontroller U1 of the grade display unit circuit contains the firmware inside the chip within its 64K of flash memory. The microcontroller U1 communicates data and through the programming port 403, connector J2 and level shifter integrated circuit U14. The microcontroller U1 converts the data to a letter grade that is shown on the dot matrix displays DS1 and DS2. Each of displays DS1 and DS2 is a tricolor LED display module arranged in a 7×5 matrix. The LEDs of the displays DS1, DS2 are turned on and off using a standard matrix-multiplexing scheme. The microcontroller U1 latches the row data in integrated circuits U2 and U6 that use buffers in integrated circuits U3 and U7 to drive the high power transistors of integrated circuits U5 and U9. The transistors apply twelve volts to the row of LEDs. The microcontroller U1 sends a signal to the buffers in integrated circuits U10 and U12 that drives the transistors of integrated circuits U11 and U13 low, causing the LED at the intersecting point to light. The firmware in the microcontroller U1 multiplexes the LEDs at preferably a 70 Hz rate. The switching power supply, including voltage regulator circuit VR1, converts the 12 volts to 5 volts to power the microcontroller U1 and digital circuitry.

Figure 6A:
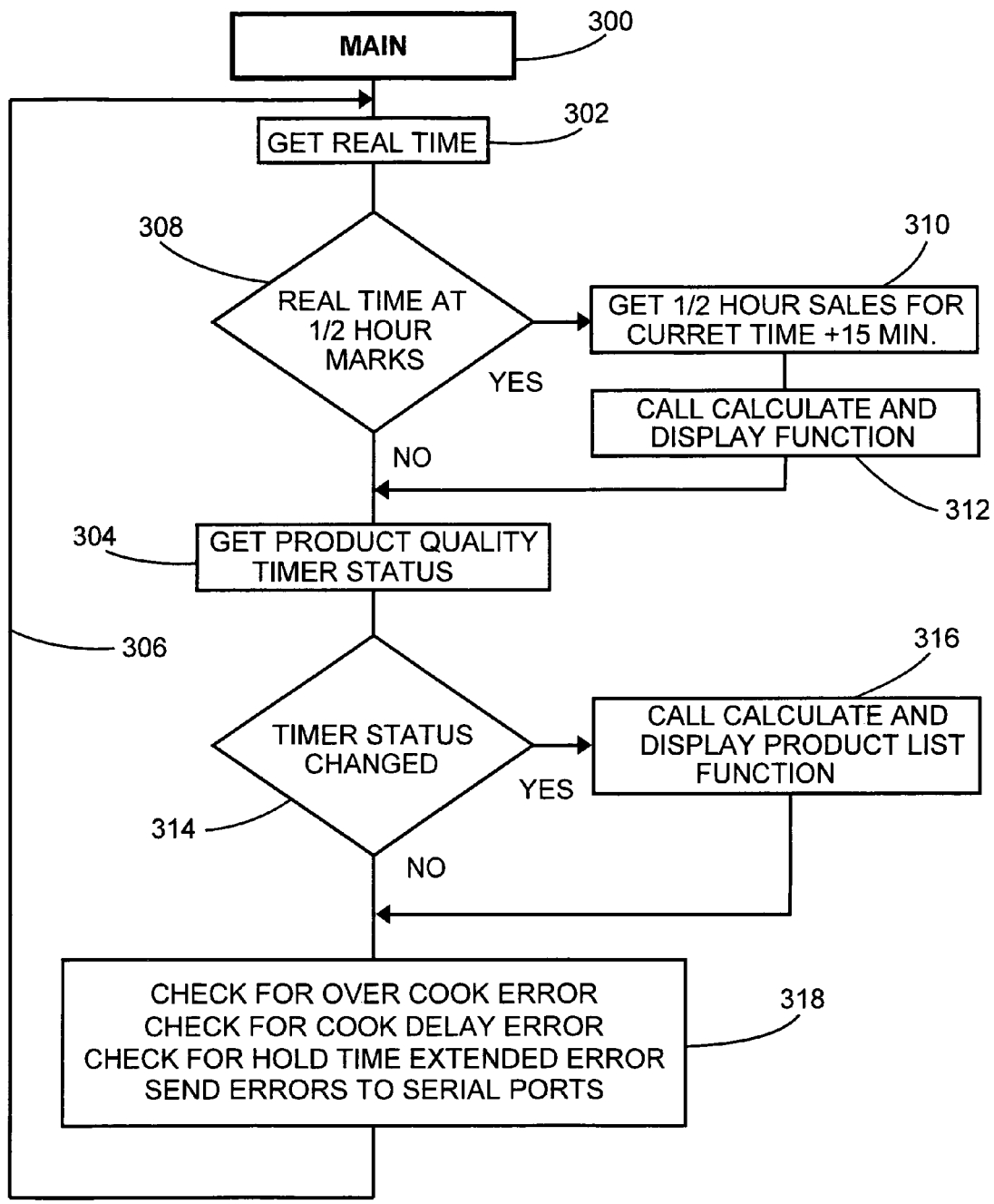
FIGS. 6A and 6B are flow charts of the normal operation of the food product management system formed in accordance with the present invention.
Figure 6B:
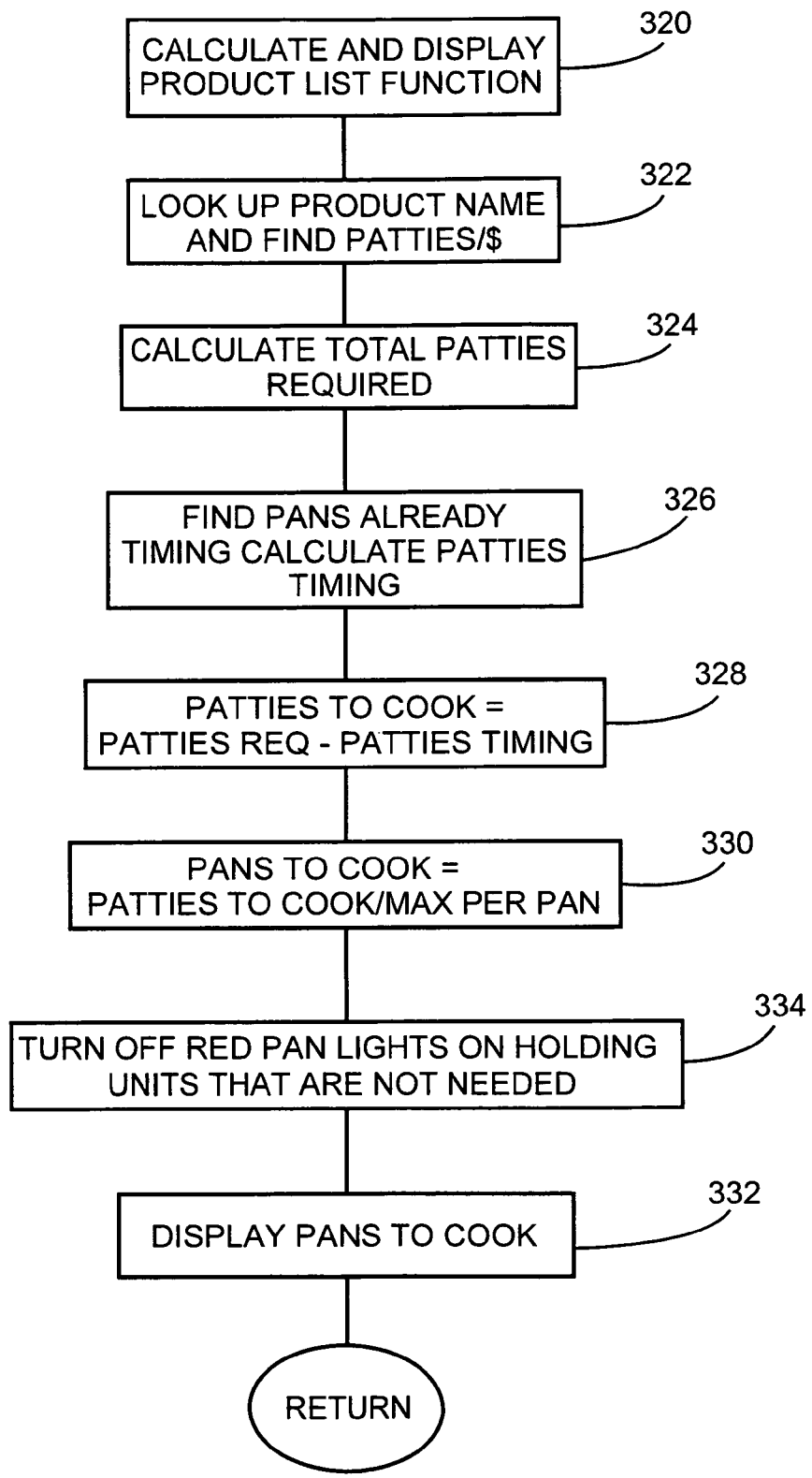

Flow charts of the normal operation of the food product management system of the present invention are shown in FIGS. 6A and 6B.

The box entitled "Main" 300 refers to the main loop of the food product management system. The food product management system uses the real time clock 205 ("Get Real Time"—Box 302) and product quality timer status ("Get Product Quality Timer Status"—Box 304) to determine when to recalculate and display products to cook. The loop 306 continually checks for the time to go past preferably the hour or ½ hour status time increment ("Real Time at ½ Hour marks—Decision Box 308), and if "Yes", then looks ahead preferably 15 minutes in sales and obtains the sales information ("Get ½ Hour Sales for Current time+15 Min"—Box 310). This allows time for the food to be prepared. Then, the routine "Calculate and Display Product List Function" is called (Box 312). Also, the timer status is monitored ("Timer Status Changed"—Box 314) from the timer status information (Box 304), and if the timer status has changed, such as product timer stopped due to the pan being emptied, or the product expired, then the routine "Calculate and Display Product List Function" is called (Box 316).

The main loop 306 also checks for errors (Box 318), including, but not limited to:

1—Too many pans are filled, called "Over Cook", by calculating if there are too many product timers running of the same product This error signal is sent to the manager's display unit 6 and the grade display unit 8. The error is also stored in an error log in the non-volatile memory of integrated circuits U3 and U4 of the main control unit 1;

2—Pans of food product that the product timers have not been started in a specified amount of time called "Cook Delay" When a batch or pan of product is required and displayed on the screen a timer is started, and if the time goes over the limit, an error signal is generated. This error signal is sent to the grade display unit 8 and the manager's display unit 6. The error is also stored in an error log in memory circuits U3 and U4 of the main control unit 1; and 3—When the product hold timer for a product is started at the product hold unit, the time status light at the pan flashes RED. This is an indication for the user to remove the remaining product and press the start/stop timer key at the pan location which stops the timer. If the user presses the start/stop key twice quickly (within 3 seconds) which restarts the timer, the system detects this as a "Hold Time Extended Error". This error signal is sent to the grade display unit 8 and the manager's display unit 6. The error is also stored in an error log in memory circuits U3 and U4 of the main control unit 1.

The errors are assigned points, and the grade is calculated and sent out to the manager's display unit 6 and the grade display unit 8 and are displayed on the manager's unit display and/or the grade unit's display.

The box entitled "Calculate and Display Product List Function" 320 refers to a software routine executed in the main display unit of the present invention which calculates and displays the food to cook for the current sales level. Multiple products with the hold time, cook time, and associated data held in the EE prom memory that has been loaded through the keyboard of the office computer. One product of the multiple products is found by looking in a table in the EE prom memory of the system and the variable patties/$ amount is placed into the computer ram memory as a variable using standard programming practices(Box 322) The routine performs the following calculations:

1—"Total Patties Required"="Patties/$" multiplied by "Sales For The Period" (Box 324);

2—The system interrogates the timer network to find the number of pans of food that is timing and calculates the total number of patties by "Pans holding"*"patties per pan"="Patties Already timing" (Box 326);

3—"Patties To Cook"="Total Patties Required"−"Patties Already Timing" (Box 328); and 4—"Pans To Cook"="Patties To Cook"/"Maximum Number Of Patties Per Pan" (Box 330).

The number of pans of food product (e.g., meat patties) to cook are then displayed on the display screen on at least one of the main control unit 1, the manager's unit 6 and the slave unit or units 10 (Box 332) and a red LED is lit indication that there is a pan of food required and not present at the pan location.

If patties are not required the final step is to turn off the solid red LEDs on the cooked food warmer of the fast food restaurant, indicating to the user that the pans are empty and no food is required in the pans (Box 334).

Figure 7:
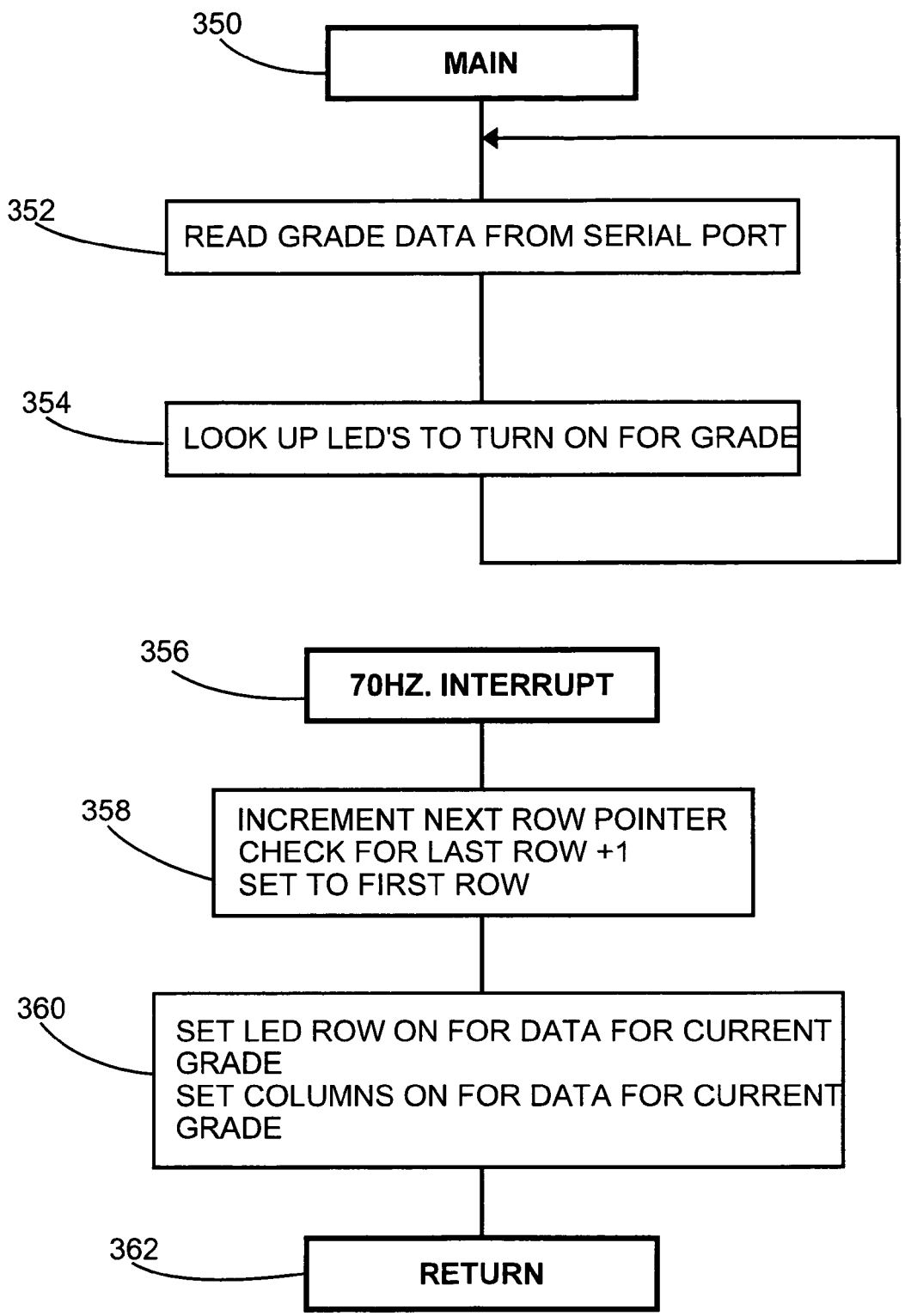
FIG. 7 is a flow chart of the grade display unit firmware of the food product management system formed in accordance with the present invention.

A flow chart of the operation of the firmware of the grade display unit 8 is shown in FIG. 7 and will now be described. The box entitled "Main" 350 shown in FIG. 7 refers to this operational routine.

The firmware inside the grade sign interrogates the serial port for grade data (Box 352) and looks up the LED pattern of the grade unit's display that represents the letter grade (Box 354). An interrupt is set for preferably 70 Hz (Box 356) that moves the LED pattern onto the output row with each interrupt. At each interrupt, the row pointer is incremented (Box 358) and the grade data is then sent to the LED row for illuminating the display in red and green colors (Box 360) that can be used to indicated good and bad grades. The end of the function allows the grade display unit 8 to return to its data reading task (Box 362). At the next interrupt, the process starts again.

Figure 8:
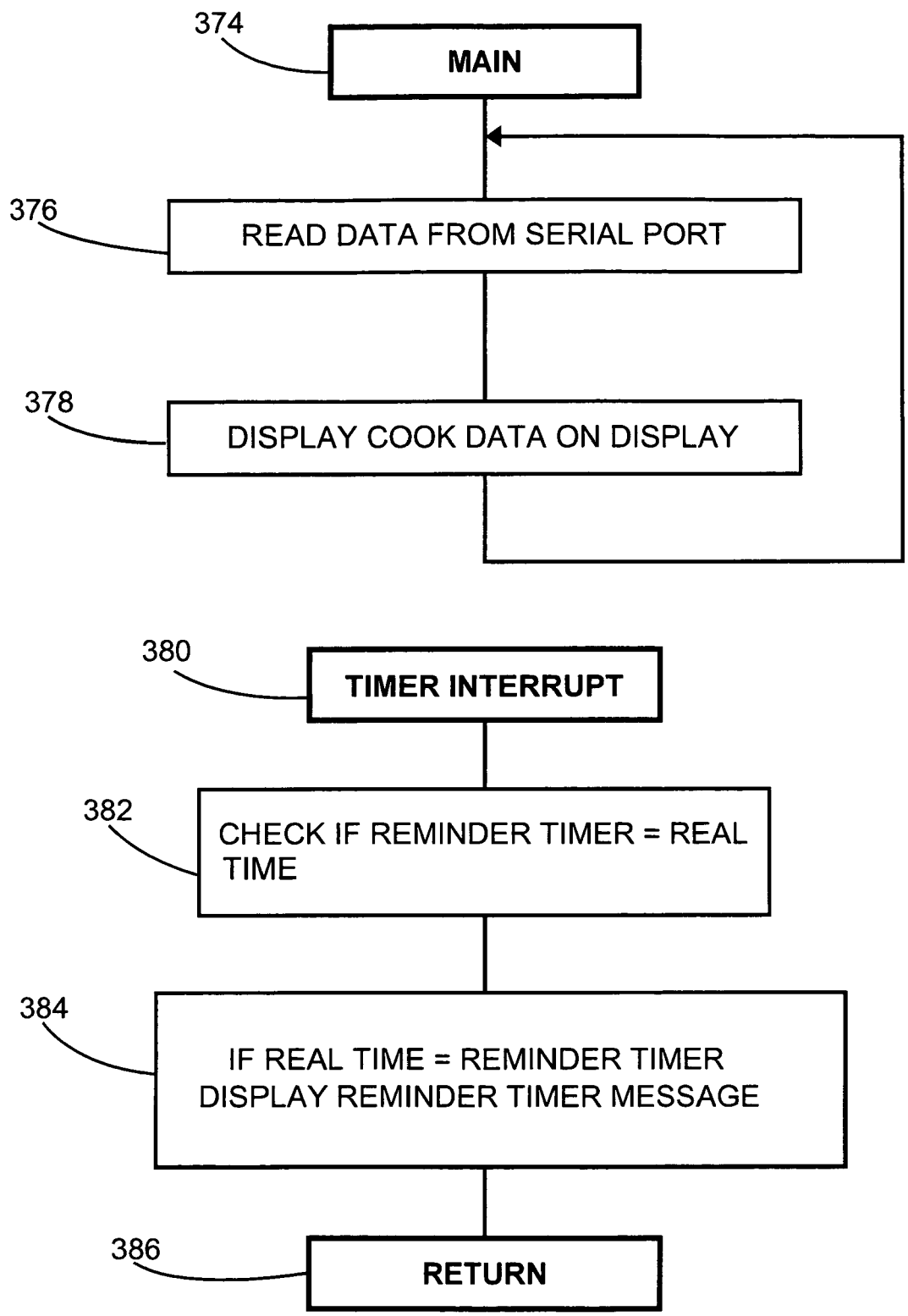
FIG. 8 is a flow chart of the manager's display unit firmware of the food product management system formed in accordance with the present invention.

A flow chart of the operation of the firmware of the manager's display unit 6 is shown in FIG. 8 and will now be described. The box entitled "Main" 374 shown in FIG. 8 refers to this operational routine.

The firmware reads the grade computer internal serial port (Box 376) and displays the data that is sent from the main product management system's grade comport 4 (Box 378).

The Timer Interrupt (Box 380) checks the time for each of the alert messages. (Box 382), If the alert message time equals or exceeds meets the real time as read from the real time clock (Box 382), the display on the manager's unit 6 will show the alert message on the screen (Box 384). At the next interrupt, the process starts again (Box 386).

Preferably, each day, the errors collected by the food product management system of the present invention are sent to a designated web site. The error data is charted and graphed so that the user can improve food product quality and service in the restaurant. Exemplary charts are described below and are shown in FIGS. 9A-9C:

Chart 1001 shows the grades that a site (i.e., restaurant) received for every 15 minutes;

Chart 1002 shows the total errors by product that a site received for the day;

Chart 1003 shows the errors associated with a particular manager of a fast food restaurant for the day;

Chart 1004 graphs the grades of a particular fast food restaurant for each day for 30 days; and Chart 1005 shows the errors for each shift or daypart for the day.

Thus, in accordance with the present invention, a system for managing food products is especially adapted for use in a quick serve restaurant. The quick serve restaurant has stations which receive food products, at least some of the stations having food product hold timers which determine the period of hold time a food product is located at a respective station, the food product hold timers generating food product hold signals indicative of the hold time that a food product is located at a respective station. Such hold timers and stations are disclosed in the aforementioned U.S. Pat. No. 7,232,062 incorporated herein by reference. The system preferably includes at least one control unit, the at least one control unit having a microcontroller and a display operatively coupled to the microcontroller. At least one control unit is operatively coupled to the food product hold timers of the quick serve restaurant and receives food product hold signals there from. The microcontroller of the at least one control unit determines food product quantity and quality parameters at least partially in response to the food product hold signals and generates food product condition signals and instruction signals in response to the food product quantity and quality parameters. The display receives the food product condition signals and instruction signals and displays visible indications corresponding to the food product condition signals and instruction signals.

Usually, the quick serve restaurant includes a terminal which generates food product sales information signals indicative of at least one of the dollar amount of food product sold by the quick serve restaurant and the number of items of food product sold by the quick serve restaurant. The at least one control unit is operatively coupled to the terminal of the quick serve restaurant and receives the food product sales information signal. The at least one control unit further includes a real time clock. The real time clock generates a real time clock signal. The microcontroller is operatively coupled to the real time clock and receives the real time clock signal. The microcontroller determines an incremental period of time and a time incremental number of food product sold by the quick serve restaurant in response to the food product sales information signal and the real time clock signal.

Preferably, the microcontroller of the at least one control unit determines the total dollar amount of food product sold for a predetermined period of time by summing the time incremental number of food product sold by the quick serve restaurant within the predetermined period of time. Also, the microcontroller of the control unit determines a dollar amount for each food product sold by the quick serve restaurant by dividing the total number of food products sold by the quick serve restaurant within the predetermined period of time by the total dollar amount of food product sold by the quick serve restaurant within the predetermined period of time.

Even more preferably, the microcontroller of the at least one control unit determines the number of food product required to be prepared for the incremental period of time by multiplying the dollar amount for each food product sold by the quick serve restaurant and the time incremental number of food product sold by the quick serve restaurant.

Most quick serve restaurants hold a predetermined maximum number of food product in pans. The microcontroller of the at least one control unit receives a signal corresponding to the predetermined maximum number of food product held in pans by the quick serve restaurant. The microcontroller of the at least one control unit determines the number of pans of food product required for the incremental period of time by dividing the number of food product required to be prepared for the incremental period of time by the predetermined maximum number of food product held in the pans.

Preferably, the microcontroller of the at least one control unit determines the number of pans holding food product currently in use by the quick serve restaurant based on the number of food product hold signals received by the at least one control unit from the food product hold timers of the quick serve restaurant. Furthermore, the microcontroller of the at least one control unit determines a number of pans of food product to cook for the incremental period of time by subtracting the number of pans holding food product currently in use by the quick serve restaurant from the number of pans of food product required for the incremental period of time.

Preferably, the microcontroller of the at least one control unit generates a signal corresponding to the number of pans of food product to cook. The display of the at least one control unit receives the signal corresponding to the number of pans of food product to cook from the microcontroller and displays a visible indication corresponding to the signal corresponding to the number of pans of food product to cook.

In a preferred form, the microcontroller of the at least one control unit determines by a ratiometric calculation the quantity of food product which must be prepared by the quick serve restaurant for a predetermined period of time. Also preferably, the at least one control unit includes a programmable memory for storing at least one of programming instructions and data, and the memory being operatively coupled to the microprocessor of the at least one control unit.

The at least one control unit further preferably includes at least one of a programming port for receiving the at least one of programming instructions and data, an infrared port for receiving the at least one of programming instructions and data, and a keyboard for receiving the at least one of programming instructions and data. The programmable memory is operatively coupled to the at least one programming port, the infrared port and the keyboard. Also, the at least one of programming instructions and data includes sales forecast information.

The microcontroller of the at least one control unit preferably generates a signal to prompt the user of the system to select a sales forecast based on the sales forecast information. The display receives the signal to prompt the user to select a sales forecast and displays a visible indication corresponding to the signal to prompt the user to select a sales forecast.

Preferably, the at least one of programming instructions and data includes recurring and non-recurring tasks information to be performed by the user of the system. The microcontroller of the at least one control unit generates signals based on the recurring and non-recurring tasks information. The display receives the signals based on the recurring and non-recurring tasks information and displays visible indications corresponding to the signals based on the recurring and non-recurring tasks.

The microcontroller of the at least one control unit preferably determines from the number of pans holding food product currently in use by the quick serve restaurant and the number of pans of food product required an over cook error condition and generates an over cook error signal in response thereto. The display receives the over cook error signal from the microcontroller and displays in response thereto a visible indication corresponding to the over cook error condition.

Preferably, the microcontroller of the at least one control unit determines from the food product hold signals and from the real time clock signal when a respective food product hold timer has an associated period of hold time that has exceeded a first predetermined period of time and that the respective food product hold timer has been restarted with another associated period of hold time within a second predetermined period of time a waste served error condition, the microcontroller generating a waste served error signal in response thereto. The display receives the waste served error signal from the microcontroller and displays in response thereto a visible indication corresponding to the waste served error condition.

Preferably, the microcontroller of the at least one control unit determines from the real time clock signal and from the food product hold signals a cook delay error condition in which a respective food product hold timer has not been started to generate an associated period of hold time within a predetermined period of time started from the time when the visible indication corresponding to the signal corresponding to the number of pans of food product to cook is displayed, the microcontroller generating a cook delay error signal in response thereto. The display receives the cook delay error signal from the microcontroller and displays in response thereto a visible indication corresponding to the cook delay error condition.

Preferably, the microcontroller of the at least one control unit determines from the real time clock signal and from the food product hold signals a food product discard condition in which the food product hold signal of a respective food product hold timer indicates a period of hold time of a food product that has exceeded a first predetermined time period set by the real time clock, the microcontroller generating a food product discard signal in response thereto. The display receives the food product discard signal from the microcontroller and displays in response thereto a visible indication corresponding to the food product discard condition.

In another preferred form, the microcontroller of the at least one control unit determines from the real time clock signal, the food product discard signal and the food product hold signal of the respective food product hold timer a discard delay error condition in which the respective timer is continuing to provide a food product hold signal indicating a period of hold time that exceeds a second predetermined period of time set by the real time clock started from the time when the visible indication corresponding to the food product discard condition is displayed, the microcontroller generating a discard delay error signal in response thereto. The display receives the discard delay error signal from the microcontroller and displays in response thereto a visible indication corresponding to the discard delay error condition.

It should be understood herein that when references made to the at least one control unit, this means that it may include either the master control unit, the manager's unit or the at least one slave unit, or all of these units. Either unit may act to control the operation of the food product management system. It should be further noted that, in a preferred form of the invention, the manager's unit and the at least one slave unit are operatively coupled to the master control unit. Furthermore, the food product management system may further include a computer. The computer is operatively coupled to the at least one control unit. In addition, the food product management system may further include a server. The server is operatively coupled to the computer.

In a preferred form of the present invention, the food product management system further includes a grade display unit. The grade display unit is operatively coupled to the at least one control unit. The grade display unit has a display for displaying visible indications of performance quality and error grades, and a microcontroller that is operatively coupled to the display of the grade display unit. The grade display unit receives performance quality and error data signals. The microcontroller of the grade display unit converts the performance quality and error data signals to at least one of a numeric grade signal and a letter grade signal. The at least one of a numeric grade signal and a letter grade signal is provided to the display of the grade display unit. The display of the grade display unit displays visible indications in response to the numeric grade signal and the letter grade signal.

In an even more preferred embodiment, the food product management system applies a multiplication factor to the error to the performance quality and error data signals by assigning a pre-selected grade thereto prior to the grade display unit displaying the visible indications of performance quality and error grades.

In a preferred form of the present invention, the system generates at least one of a chart signal and a graph signal in response to the performance quality and error data signals. The at least one of a chart signal and a graph signal is transmitted to a website where at least one of a chart and a graph of the performance quality and error data is viewable in response to the at least one of a chart signal and a graph signal.

A method for managing food products in a quick serve restaurant is also disclosed. The quick serve restaurant has stations which receive food products. At least some of the stations having food product hold timers which determine the period of hold time a food product is located at a respective station. The food product hold timers generate food product hold signals indicative of the hold time that a food product is located at a respective station. The method of the present invention includes the steps of receiving by at least one control unit of a food product management system the food product hold signals, determining by the at least one control unit of the food product management system food product quantity and quality parameters at least partially in response to the food product hold signals, generating by the at least one control unit of the food product management system food product condition signals and instruction signals in response to the food product quantity and quality parameters, and displaying by the at least one control unit of the food product management system visible indications corresponding to the food product condition signals and instruction signals.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. Apparatus for managing food products in a quick serve restaurant, the quick serve restaurant having stations which receive food products, at least some of the stations having food product hold timers which determine the period of hold time a food product is located at a respective station, the food product hold timers generating food product hold signals indicative of the hold time that a food product is located at a respective station, the apparatus comprising:

at least one control unit, the at least one control unit having a microcontroller and a display operatively coupled to the microcontroller, the at least one control unit being operatively coupled to the food product hold timers of the quick serve restaurant and receiving food product hold signals therefrom, the microcontroller of the at least one control unit determining food product quantity and quality parameters at least partially in response to the food product hold signals and generating food product condition signals and instruction signals in response to the food product quantity and quality parameters, the display receiving the food product condition signals and instruction signals and displaying visible indications corresponding to the food product condition signals and instruction signals;

wherein the quick serve restaurant includes a terminal which generates food product sales information signals indicative of at least one of the dollar amount of food product sold by the quick serve restaurant and the number of items of food product sold by the quick serve restaurant;

wherein the at least one control unit is operatively coupled to the terminal of the quick serve restaurant and receives the food product sales information signal;

wherein the at least one control unit further includes a real time clock, the real time clock generating a real time clock signal, the microcontroller being operatively coupled to the real time clock and receiving the real time clock signal, the microcontroller determining an incremental period of time and a time incremental number of food product sold by the quick serve restaurant in response to the food product sales information signal and the real time clock signal;

and wherein the microcontroller of the at least one control unit determines by a ratiometric calculation the quantity of food product which must be prepared by the quick serve restaurant for a predetermined period of time.

2. Apparatus for managing food products in a quick serve restaurant, the quick serve restaurant having stations which receive food products, at least some of the stations having food product hold timers which determine the period of hold time a food product is located at a respective station, the food product hold timers generating food product hold signals indicative of the hold time that a food product is located at a respective station, the apparatus comprising:

at least one control unit, the at least one control unit having a microcontroller and a display operatively coupled to the microcontroller, the at least one control unit being operatively coupled to the food product hold timers of the quick serve restaurant and receiving food product hold signals therefrom, the microcontroller of the at least one control unit determining food product quantity and quality parameters at least partially in response to the food product hold signals and generating food product condition signals and instruction signals in response to the food product quantity and quality parameters, the display receiving the food product condition signals and instruction signals and displaying visible indications corresponding to the food product condition signals and instruction signals;

wherein the quick serve restaurant includes a terminal which generates food product sales information signals indicative of at least one of the dollar amount of food product sold by the quick serve restaurant and the number of items of food product sold by the quick serve restaurant;

wherein the at least one control unit is operatively coupled to the terminal of the quick serve restaurant and receives the food product sales information signal;

wherein the at least one control unit further includes a real time clock, the real time clock generating a real time clock signal, the microcontroller being operatively coupled to the real time clock and receiving the real time clock signal, the microcontroller determining an incremental period of time and a time incremental number of food product sold by the quick serve restaurant in response to the food product sales information signal and the real time clock signal;

wherein the microcontroller of the at least one control unit determines the total dollar amount of food product sold for a predetermined period of time by summing the time incremental number of food product sold by the quick serve restaurant within the predetermined period of time;

wherein the microcontroller of the control unit determines a dollar amount for each food product sold by the quick serve restaurant by dividing the total number of food products sold by the quick serve restaurant within the predetermined period of time by the total dollar amount of food product sold by the quick serve restaurant within the predetermined period of time;

wherein the microcontroller of the at least one control unit determines the number of food product required to be prepared for the incremental period of time by multiplying the dollar amount for each food product sold by the quick serve restaurant and the time incremental number of food product sold by the quick serve restaurant;

wherein the quick serve restaurant holds a predetermined maximum number of food product in pans;

wherein the microcontroller of the at least one control unit receives a signal corresponding to the predetermined maximum number of food product held in pans by the quick serve restaurant;

wherein the microcontroller of the at least one control unit determines the number of pans of food product required for the incremental period of time by dividing the number of food product required to be prepared for the incremental period of time by the predetermined maximum number of food product held in the pans;

wherein the microcontroller of the at least one control unit determines the number of pans holding food product currently in use by the quick serve restaurant based on the number of food product hold signals received by the at least one control unit from the food product hold timers of the quick serve restaurant;

wherein the microcontroller of the at least one control unit determines a number of pans of food product to cook for the incremental period of time by subtracting the number of pans holding food product currently in use by the quick serve restaurant from the number of pans of food product required for the incremental period of time;

and wherein the microcontroller of the at least one control unit determines from the number of pans holding food product currently in use by the quick serve restaurant and the number of pans of food product required an over cook error condition and generates an over cook error signal in response thereto.

3. Apparatus for managing food products in a quick serve restaurant as defined by claim 2, wherein the display receives the over cook error signal from the microcontroller and displays in response thereto a visible indication corresponding to the over cook error condition.

4. Apparatus for managing food products in a quick serve restaurant, the quick serve restaurant having stations which receive food products, at least some of the stations having food product hold timers which determine the period of hold time a food product is located at a respective station, the food product hold timers generating food product hold signals indicative of the hold time that a food product is located at a respective station, the apparatus comprising:

at least one control unit, the at least one control unit having a microcontroller and a display operatively coupled to the microcontroller, the at least one control unit being operatively coupled to the food product hold timers of the quick serve restaurant and receiving food product hold signals therefrom, the microcontroller of the at least one control unit determining food product quantity and quality parameters at least partially in response to the food product hold signals and generating food product condition signals and instruction signals in response to the food product quantity and quality parameters, the display receiving the food product condition signals and instruction signals and displaying visible indications corresponding to the food product condition signals and instruction signals;

wherein the quick serve restaurant includes a terminal which generates food product sales information signals indicative of at least one of the dollar amount of food product sold by the quick serve restaurant and the number of items of food product sold by the quick serve restaurant;

wherein the at least one control unit is operatively coupled to the terminal of the quick serve restaurant and receives the food product sales information signal;

wherein the at least one control unit further includes a real time clock, the real time clock generating a real time clock signal, the microcontroller being operatively coupled to the real time clock and receiving the real time clock signal, the microcontroller determining an incremental period of time and a time incremental number of food product sold by the quick serve restaurant in response to the food product sales information signal and the real time clock signal;

and wherein the microcontroller of the at least one control unit determines from the food product hold signals and from the real time clock signal when a respective food product hold timer has an associated period of hold time that has exceeded a first predetermined period of time and that the respective food product hold timer has been restarted with another associated period of hold time within a second predetermined period of time a waste served error condition, the microcontroller generating a waste served error signal in response thereto.

5. Apparatus for managing food products in a quick serve restaurant as defined by claim 4, wherein the display receives the waste served error signal from the microcontroller and displays in response thereto a visible indication corresponding to the waste served error condition.

6. Apparatus for managing food products in a quick serve restaurant, the quick serve restaurant having stations which receive food products, at least some of the stations having food product hold timers which determine the period of hold time a food product is located at a respective station, the food product hold timers generating food product hold signals indicative of the hold time that a food product is located at a respective station, the apparatus comprising:

at least one control unit, the at least one control unit having a microcontroller and a display operatively coupled to the microcontroller, the at least one control unit being operatively coupled to the food product hold timers of the quick serve restaurant and receiving food product hold signals therefrom, the microcontroller of the at least one control unit determining food product quantity and quality parameters at least partially in response to the food product hold signals and generating food product condition signals and instruction signals in response to the food product quantity and quality parameters, the display receiving the food product condition signals and instruction signals and displaying visible indications corresponding to the food product condition signals and instruction signals;

wherein the quick serve restaurant includes a terminal which generates food product sales information signals indicative of at least one of the dollar amount of food product sold by the quick serve restaurant and the number of items of food product sold by the quick serve restaurant;

wherein the at least one control unit is operatively coupled to the terminal of the quick serve restaurant and receives the food product sales information signal;

wherein the at least one control unit further includes a real time clock, the real time clock generating a real time clock signal, the microcontroller being operatively coupled to the real time clock and receiving the real time clock signal, the microcontroller determining an incremental period of time and a time incremental number of food product sold by the quick serve restaurant in response to the food product sales information signal and the real time clock signal;

wherein the microcontroller of the at least one control unit determines the total dollar amount of food product sold for a predetermined period of time by summing the time incremental number of food product sold by the quick serve restaurant within the predetermined period of time;

wherein the microcontroller of the control unit determines a dollar amount for each food product sold by the quick serve restaurant by dividing the total number of food products sold by the quick serve restaurant within the predetermined period of time by the total dollar amount of food product sold by the quick serve restaurant within the predetermined period of time;

wherein the microcontroller of the at least one control unit determines the number of food product required to be prepared for the incremental period of time by multiplying the dollar amount for each food product sold by the quick serve restaurant and the time incremental number of food product sold by the quick serve restaurant;

wherein the quick serve restaurant holds a predetermined maximum number of food product in pans;

wherein the microcontroller of the at least one control unit receives a signal corresponding to the predetermined maximum number of food product held in pans by the quick serve restaurant;

wherein the microcontroller of the at least one control unit determines the number of pans of food product required for the incremental period of time by dividing the number of food product required to be prepared for the incremental period of time by the predetermined maximum number of food product held in the pans;

wherein the microcontroller of the at least one control unit determines the number of pans holding food product currently in use by the quick serve restaurant based on the number of food product hold signals received by the at least one control unit from the food product hold timers of the quick serve restaurant;

wherein the microcontroller of the at least one control unit determines a number of pans of food product to cook for the incremental period of time by subtracting the number of pans holding food product currently in use by the quick serve restaurant from the number of pans of food product required for the incremental period of time;

wherein the microcontroller of the at least one control unit generates a signal corresponding to the number of pans of food product to cook;

wherein the display of the at least one control unit receives the signal corresponding to the number of pans of food product to cook from the microcontroller and displays a visible indication corresponding to the signal corresponding to the number of pans of food product to cook;

and wherein the microcontroller of the at least one control unit determines from the real time clock signal and from the food product hold signals a cook delay error condition in which a respective food product hold timer has not been started to generate an associated period of hold time within a predetermined period of time started from the time when the visible indication corresponding to the signal corresponding to the number of pans of food product to cook is displayed, the microcontroller generating a cook delay error signal in response thereto.

7. Apparatus for managing food products in a quick serve restaurant as defined by claim 6, wherein the display receives the cook delay error signal from the microcontroller and displays in response thereto a visible indication corresponding to the cook delay error condition.

8. Apparatus for managing food products in a quick serve restaurant, the quick serve restaurant having stations which receive food products, at least some of the stations having food product hold timers which determine the period of hold time a food product is located at a respective station, the food product hold timers generating food product hold signals indicative of the hold time that a food product is located at a respective station, the apparatus comprising:

at least one control unit, the at least one control unit having a microcontroller and a display operatively coupled to the microcontroller, the at least one control unit being operatively coupled to the food product hold timers of the quick serve restaurant and receiving food product hold signals therefrom, the microcontroller of the at least one control unit determining food product quantity and quality parameters at least partially in response to the food product hold signals and generating food product condition signals and instruction signals in response to the food product quantity and quality parameters, the display receiving the food product condition signals and instruction signals and displaying visible indications corresponding to the food product condition signals and instruction signals;

wherein the quick serve restaurant includes a terminal which generates food product sales display operatively coupled to the microcontroller, the at least one control unit being operatively coupled to the food product hold timers of the quick serve restaurant and receiving food product hold signals therefrom, the microcontroller of the at least one control unit determining food product quantity and quality parameters at least partially in response to the food product hold signals and generating food product condition signals and instruction signals in response to the food product quantity and quality parameters, the display receiving the food product condition signals and instruction signals and displaying visible indications corresponding to the food product condition signals and instruction signals; and a grade display unit, the grade display unit being operatively coupled to the at least one control unit, the grade display unit having a display for displaying visible indications of performance quality and error grades, and a microcontroller operatively coupled to the display of the grade display unit, the grade display unit receiving performance quality and error data signals, the microcontroller of the grade display unit converting the performance quality and error data signals to at least one of a numeric grade signal and a letter grade signal, the at least one of a numeric grade signal and a letter grade signal being provided to the display of the grade display unit, the display of the grade display unit displaying visible indications in response thereto.

9. Apparatus for managing food products in a quick serve restaurant as defined by claim 8, wherein the display receives the food product discard signal from the microcontroller and displays in response thereto a visible indication corresponding to the food product discard condition.

10. Apparatus for managing food products in a quick serve restaurant as defined by claim 9, wherein the microcontroller of the at least one control unit determines from the real time clock signal, the food product discard signal and the food product hold signal of the respective food product hold timer a discard delay error condition in which the respective timer is continuing to provide a food product hold signal indicating a period of hold time that exceeds a second predetermined period of time set by the real time clock started from the time when the visible indication corresponding to the food product discard condition is displayed, the microcontroller generating a discard delay error signal in response thereto.

11. Apparatus for managing food products in a quick serve restaurant as defined by claim 10, wherein the display receives the discard delay error signal from the microcontroller and displays in response thereto a visible indication corresponding to the discard delay error condition.

12. Apparatus for managing food products in a quick serve restaurant, the quick serve restaurant having stations which receive food products, at least some of the stations having food product hold timers which determine the period of hold time a food product is located at a respective station, the food product hold timers generating food product hold signals indicative of the hold time that a food product is located at a respective station, the apparatus comprising:

at least one control unit, the at least one control unit having a microcontroller and a information signals indicative of at least one of the dollar amount of food product sold by the quick serve restaurant and the number of items of food product sold by the quick serve restaurant;

wherein the at least one control unit is operatively coupled to the terminal of the quick serve restaurant and receives the food product sales information signal;

wherein the at least one control unit further includes a real time clock, the real time clock generating a real time clock signal, the microcontroller being operatively coupled to the real time clock and receiving the real time clock signal, the microcontroller determining an incremental period of time and a time incremental number of food product sold by the quick serve restaurant in response to the food product sales information signal and the real time clock signal;

and wherein the microcontroller of the at least one control unit determines from the real time clock signal and from the food product hold signals a food product discard condition in which the food product hold signal of a respective food product hold timer indicates a period of hold time of a food product that has exceeded a first predetermined time period set by the real time clock, the microcontroller generating a food product discard signal in response thereto.

13. Apparatus for managing food products in a quick serve restaurant as defined by claim 12, wherein the quick serve restaurant includes a terminal which generates food product sales information signals indicative of at least one of the dollar amount of food product sold by the quick serve restaurant and the number of items of food product sold by the quick serve restaurant; wherein the at least one control unit is operatively coupled to the terminal of the quick serve restaurant and receives the food product sales information signal; and wherein the at least one control unit further includes a real time clock, the real time clock generating a real time clock signal, the microcontroller being operatively coupled to the real time clock and receiving the real time clock signal, the microcontroller determining an incremental period of time and a time incremental number of food product sold by the quick serve restaurant in response to the food product sales information signal and the real time clock signal.

14. Apparatus for managing food products in a quick serve restaurant as defined by claim 12, wherein the microcontroller of the at least one control unit determines the total dollar amount of food product sold for a predetermined period of time by summing the time incremental number of food product sold by the quick serve restaurant within the predetermined period of time.

15. Apparatus for managing food products in a quick serve restaurant as defined by claim 14, wherein the microcontroller of the control unit determines a dollar amount for each food product sold by the quick serve restaurant by dividing the total number of food products sold by the quick serve restaurant within the predetermined period of time by the total dollar amount of food product sold by the quick serve restaurant within the predetermined period of time.

16. Apparatus for managing food products in a quick serve restaurant as defined by claim 15, wherein the microcontroller of the at least one control unit determines the number of food product required to be prepared for the incremental period of time by multiplying the dollar amount for each food product sold by the quick serve restaurant and the time incremental number of food product sold by the quick serve restaurant.

17. Apparatus for managing food products in a quick serve restaurant as defined by claim 16, wherein the quick serve restaurant holds a predetermined maximum number of food product in pans; wherein the microcontroller of the at least one control unit receives a signal corresponding to the predetermined maximum number of food product held in pans by the quick serve restaurant; and wherein the microcontroller of the at least one control unit determines the number of pans of food product required for the incremental period of time by dividing the number of food product required to be prepared for the incremental period of time by the predetermined maximum number of food product held in the pans.

18. Apparatus for managing food products in a quick serve restaurant as defined by claim 17, wherein the microcontroller of the at least one control unit determines the number of pans holding food product currently in use by the quick serve restaurant based on the number of food product hold signals received by the at least one control unit from the food product hold timers of the quick serve restaurant; and wherein the microcontroller of the at least one control unit determines a number of pans of food product to cook for the incremental period of time by subtracting the number of pans holding food product currently in use by the quick serve restaurant from the number of pans of food product required for the incremental period of time.

19. Apparatus for managing food products in a quick serve restaurant as defined by claim 18, wherein the microcontroller of the at least one control unit generates a signal corresponding to the number of pans of food product to cook; and wherein the display of the at least one control unit receives the signal corresponding to the number of pans of food product to cook from the microcontroller and displays a visible indication corresponding to the signal corresponding to the number of pans of food product to cook.

20. Apparatus for managing food products in a quick serve restaurant as defined by claim 12, wherein the at least one control unit includes a programmable memory for storing at least one of programming instructions and data, and the memory being operatively coupled to the microprocessor of the at least one control unit.

21. Apparatus for managing food products in a quick serve restaurant as defined by claim 20, wherein the at least one control unit further includes at least one of a programming port for receiving the at least one of programming instructions and data, an infrared port for receiving the at least one of programming instructions and data, and a keyboard for receiving the at least one of programming instructions and data, the programmable memory being operatively coupled to the at least one programming port, the infrared port and the keyboard.

22. Apparatus for managing food products in a quick serve restaurant as defined by claim 21, wherein the at least one of programming instructions and data includes recurring and non-recurring tasks information to be performed by the user of the system; wherein the microcontroller of the at least one control unit generates signals based on the recurring and non-recurring tasks information; and wherein the display receives the signals based on the recurring and non-recurring tasks information and displays visible indications corresponding to the signals based on the recurring and non-recurring tasks.

23. Apparatus for managing food products in a quick serve restaurant as defined by claim 20, wherein the at least one of programming instructions and data includes sales forecast information.

24. Apparatus for managing food products in a quick serve restaurant as defined by claim 23, wherein the microcontroller of the at least one control unit generates a signal to prompt the user of the system to select a sales forecast based on the sales forecast information; and wherein the display receives the signal to prompt the user to select a sales forecast and displays a visible indication corresponding to the signal to prompt the user to select a sales forecast.

25. Apparatus for managing food products in a quick serve restaurant as defined by claim 12, wherein the at least one control unit includes a master control unit, a manager's unit and at least one slave unit, the manager's unit and the at least one slave unit being operatively coupled to the master control unit.

26. Apparatus for managing food products in a quick serve restaurant as defined by claim 12, which further comprises:
a computer, the computer being operatively coupled to the at least one control unit.

27. Apparatus for managing food products in a quick serve restaurant as defined by claim 26, which further comprises:
a server, the server being operatively coupled to the computer.

28. Apparatus for managing food products in a quick serve restaurant as defined by claim 12, wherein the system applies a multiplication factor to each of the kinds of errors so the performance quality and error data signals by assigning a pre-selected grade thereto prior to the grade display unit displaying the visible indications of performance quality and error grades.

29. Apparatus for managing food products in a quick serve restaurant as defined by claim 28, wherein the system generates at least one of a chart signal and a graph signal in response to the performance quality and error data signals, the at least one of a chart signal and a graph signal being transmitted to a website where at least one of a chart and a graph of the performance quality and error data is viewable in response to the at least one of a chart signal and a graph signal.

30. A method for managing food products in a quick serve restaurant, the quick serve restaurant having stations which receive food products, at least some of the stations having food product hold timers which determine the period of hold time a food product is located at a respective station, the food product hold timers generating food product hold signals indicative of the hold time that a food product is located at a respective station, the method comprising the steps of:
receiving by at least one control unit of a food product management system the food product hold signals;
determining by the at least one control unit of the food product management system food product quantity and quality parameters at least partially in response to the food product hold signals;
generating by the at least one control unit of the food product management system food product condition signals and instruction signals in response to the food product quantity and quality parameters;
displaying by the food product management system visible indications corresponding to the food product condition signals and instruction signals;
determining by the food product management system performance quality and error grades and generating performance quality and error data signals therefrom;
converting by the food product management system the performance quality and error data signals to at least one of a numeric grade signal and a letter grade signal; and
displaying by the food product management system visible indications of the at least one of the numeric grade signal and the letter grade signal.

* * * * *